United States Patent
Desberg et al.

(10) Patent No.: US 12,011,654 B2
(45) Date of Patent: Jun. 18, 2024

(54) POWERED MOBILITY SYSTEMS

(71) Applicant: Razor USA LLC, Cerritos, CA (US)

(72) Inventors: Ian Desberg, Cerritos, CA (US); Robert Hadley, Yorba Linda, CA (US); Joey Chih-Wei Huang, Temple City, CA (US)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 15/650,097

(22) Filed: Jul. 14, 2017

(65) Prior Publication Data

US 2018/0015355 A1  Jan. 18, 2018

Related U.S. Application Data

(60) Provisional application No. 62/362,772, filed on Jul. 15, 2016, provisional application No. 62/445,148, filed on Jan. 11, 2017, provisional application No. 62/448,835, filed on Jan. 20, 2017.

(51) Int. Cl.
*A63C 17/12* (2006.01)
*A63C 17/00* (2006.01)
*A63C 17/26* (2006.01)
*B62D 51/02* (2006.01)

(52) U.S. Cl.
CPC .......... *A63C 17/12* (2013.01); *A63C 17/0046* (2013.01); *A63C 17/006* (2013.01); *A63C 17/0073* (2013.01); *A63C 17/262* (2013.01); *A63C 17/0033* (2013.01); *B62D 51/02* (2013.01)

(58) Field of Classification Search
CPC .......... A63C 17/10; A63C 17/12; A63C 17/04
USPC .......................................................... 180/181
See application file for complete search history.

(56) References Cited

U.S. PATENT DOCUMENTS

| | | | |
|---|---|---|---|
| 213,546 | A | 3/1879 | Cornelius |
| 215,081 | A | 5/1879 | Turnbull |
| 252,970 | A | 1/1882 | Price et al. |
| 253,735 | A | 2/1882 | Marshall |
| 304,949 | A | 9/1884 | Mitchell |
| 311,936 | A | 2/1885 | Wisewell |
| 319,839 | A | 6/1885 | Nelson |

(Continued)

FOREIGN PATENT DOCUMENTS

| | | |
|---|---|---|
| AU | 2005100475 | 6/2005 |
| CH | 598051 | 4/1978 |

(Continued)

OTHER PUBLICATIONS

International Preliminary Report on Patentability in corresponding Application No. PCT/US2017/042249, dated Oct. 4, 2018, in 13 pages.

(Continued)

*Primary Examiner* — Jeffrey J Restifo
(74) *Attorney, Agent, or Firm* — Knobbe, Martens, Olson & Bear, LLP

(57) ABSTRACT

Various powered mobility systems for users are described. The powered mobility system can include at least one powered skate. The powered skate can include a platform, a plurality of wheels, and a motor assembly. The motor assembly can include a motor. The motor can be powered by a power supply. A motor control can be implemented to determine when power is supplied to the motor from the power supply.

22 Claims, 42 Drawing Sheets

(56) References Cited

U.S. PATENT DOCUMENTS

| | | | |
|---|---|---|---|
| 321,434 A | 7/1885 | Hanson | |
| 321,466 A | 7/1885 | Wall | |
| 329,927 A | 11/1885 | Mendenhall | |
| 1,018,512 A | 2/1912 | Mees | |
| 1,075,250 A | 10/1913 | Gingold | |
| 1,194,102 A | 8/1916 | Webb | |
| 1,387,091 A | 8/1921 | Woolley et al. | |
| 1,550,985 A | 8/1925 | Schluesselburg | |
| 1,603,529 A | 10/1926 | Faust | |
| 1,632,997 A | 6/1927 | Connolly | |
| 1,728,063 A | 9/1929 | James | |
| 1,784,761 A * | 12/1930 | Smith | A63C 17/12 |
| | | | 280/11.115 |
| 1,854,188 A | 4/1932 | Gregory | |
| 1,935,187 A | 11/1933 | Kitselman | |
| 2,051,762 A | 8/1936 | Vincent | |
| 2,077,274 A | 4/1937 | Silkman | |
| 2,126,359 A | 8/1938 | Vogt | |
| 2,136,306 A | 11/1938 | McCloy | |
| 2,216,359 A | 10/1940 | Spencer | |
| 2,413,530 A | 12/1946 | Taylor | |
| 2,430,037 A | 11/1947 | Vincent | |
| 2,474,082 A | 6/1949 | Wutz | |
| 2,509,324 A | 5/1950 | Horn | |
| 2,857,008 A | 10/1958 | Antonio | |
| 3,087,739 A | 4/1963 | Ware | |
| 3,252,713 A | 5/1966 | Heller | |
| 3,288,251 A | 11/1966 | Sakwa | |
| 3,331,612 A | 7/1967 | Tietge | |
| D214,252 S | 5/1969 | Andersen | |
| 3,476,399 A | 11/1969 | Finn | |
| 3,570,620 A | 3/1971 | Fischer et al. | |
| 3,671,055 A | 6/1972 | Aarup | |
| D226,440 S | 3/1973 | Bentley | |
| 4,003,582 A | 1/1977 | Maurer | |
| 4,037,852 A | 7/1977 | Bayer et al. | |
| 4,043,566 A | 8/1977 | Johnson | |
| 4,061,350 A | 12/1977 | Schmidt, Jr. et al. | |
| 4,094,372 A | 6/1978 | Notter | |
| 4,127,282 A | 11/1978 | Gorlach | |
| 4,152,001 A | 5/1979 | Christianson | |
| 4,168,076 A | 9/1979 | Johnson | |
| 4,180,278 A | 12/1979 | Gottlieb | |
| 4,185,847 A | 1/1980 | Johnson | |
| 4,272,091 A * | 6/1981 | Reid, Jr. | A63C 17/04 |
| | | | 280/11.19 |
| 4,398,735 A | 8/1983 | Evans et al. | |
| 4,402,521 A | 9/1983 | Mongeon | |
| 4,403,784 A | 9/1983 | Gray | |
| 4,417,737 A | 11/1983 | Suroff | |
| 4,504,072 A | 3/1985 | Klawitter | |
| 4,508,187 A * | 4/1985 | Wenzel | A63C 17/26 |
| | | | 180/181 |
| 4,523,767 A | 6/1985 | Le Page | |
| 4,546,841 A | 10/1985 | Sipiano | |
| 4,681,333 A | 1/1987 | Rouge et al. | |
| 4,645,223 A | 2/1987 | Grossman | |
| 4,708,352 A | 11/1987 | Vullierme | |
| 4,709,937 A | 12/1987 | Lin et al. | |
| 4,738,456 A | 4/1988 | Creason | |
| D299,260 S | 1/1989 | Vullierme | |
| 4,842,091 A | 6/1989 | Badsey | |
| 4,844,491 A | 7/1989 | Wheelwright | |
| 4,930,794 A | 6/1990 | Chan | |
| 4,955,626 A | 9/1990 | Smith et al. | |
| 4,998,358 A | 3/1991 | Girardelli | |
| 5,046,747 A | 9/1991 | Nielsen | |
| 5,062,630 A | 11/1991 | Nelson | |
| 5,092,614 A | 3/1992 | Malewicz | |
| D326,290 S | 5/1992 | Badsey | |
| 5,143,388 A | 9/1992 | Chen | |
| 5,232,235 A | 8/1993 | Brooks | |
| 5,236,058 A * | 8/1993 | Yamet | A63C 17/12 |
| | | | 180/181 |
| 5,263,725 A | 11/1993 | Gesmer et al. | |
| 5,330,026 A * | 7/1994 | Hsu | A63C 17/01 |
| | | | 180/181 |
| 5,347,681 A | 9/1994 | Wattron et al. | |
| 5,513,863 A | 5/1996 | Klamer et al. | |
| 5,513,865 A | 5/1996 | Brooks et al. | |
| 5,547,204 A | 8/1996 | Gamzo | |
| 5,662,187 A | 9/1997 | McGovern | |
| 5,730,241 A * | 3/1998 | Shyr | A63C 17/10 |
| | | | 180/181 |
| 5,741,018 A | 4/1998 | Huang | |
| D395,479 S | 6/1998 | Gamzo | |
| 5,797,466 A * | 8/1998 | Gendle | A63C 17/265 |
| | | | 180/181 |
| 5,829,543 A | 11/1998 | Diaz | |
| 5,848,660 A | 12/1998 | McGreen | |
| 5,860,657 A | 1/1999 | Kroher | |
| D410,268 S | 5/1999 | Yung | |
| 5,915,707 A | 6/1999 | Steffen | |
| 5,950,754 A | 9/1999 | Ondrish, Jr. | |
| 5,971,411 A | 10/1999 | Jones et al. | |
| 5,997,018 A | 12/1999 | Lee | |
| D421,282 S | 2/2000 | Orr | |
| 6,029,763 A | 2/2000 | Swisher | |
| 6,050,357 A * | 4/2000 | Staelin | A63C 17/004 |
| | | | 180/65.1 |
| D424,979 S | 5/2000 | Hanagan et al. | |
| 6,059,062 A * | 5/2000 | Staelin | A63C 17/12 |
| | | | 180/181 |
| 6,070,885 A * | 6/2000 | Ferone | A63C 17/04 |
| | | | 280/11.19 |
| 6,079,724 A | 6/2000 | Lin | |
| 6,139,035 A | 10/2000 | Tsai | |
| D433,718 S | 11/2000 | Mcgreen | |
| 6,158,752 A | 12/2000 | Kay | |
| D435,873 S | 1/2001 | Lee | |
| D435,874 S | 1/2001 | Cheng | |
| 6,179,307 B1 | 1/2001 | Mao | |
| 6,189,898 B1 | 2/2001 | Benoit | |
| D438,911 S | 3/2001 | Chen | |
| D438,912 S | 3/2001 | Barrera | |
| D439,623 S | 3/2001 | Barrera | |
| 6,199,652 B1 | 3/2001 | Mastroianni et al. | |
| 6,206,387 B1 | 3/2001 | Tsai | |
| 6,206,388 B1 | 3/2001 | Ouboter | |
| 6,227,324 B1 | 5/2001 | Sauve | |
| 6,234,501 B1 | 5/2001 | Chen | |
| 6,241,264 B1 | 6/2001 | Page | |
| D444,824 S | 7/2001 | Udwin et al. | |
| D445,145 S | 7/2001 | Yang | |
| D446,259 S | 8/2001 | Udwin et al. | |
| D447,187 S | 8/2001 | Powers | |
| D447,188 S | 8/2001 | Lan | |
| 6,270,095 B1 | 8/2001 | Chang | |
| 6,273,205 B1 | 8/2001 | Tsai | |
| 6,283,485 B1 | 9/2001 | Tsai | |
| 6,286,632 B1 | 9/2001 | Chai | |
| 6,286,843 B1 | 9/2001 | Lin | |
| 6,296,082 B1 | 10/2001 | Tsai | |
| 6,298,952 B1 | 10/2001 | Tsai | |
| 6,299,186 B1 | 10/2001 | Kao et al. | |
| 6,302,415 B1 | 10/2001 | Wang et al. | |
| D450,355 S | 11/2001 | Chan | |
| D452,284 S | 12/2001 | McGinnis | |
| D453,198 S | 1/2002 | Dudley | |
| 6,406,039 B1 | 1/2002 | Chen | |
| D453,804 S | 2/2002 | Robinson | |
| 6,345,678 B1 | 2/2002 | Chang | |
| 6,345,827 B1 | 2/2002 | Benoit | |
| D454,377 S | 3/2002 | Hsu et al. | |
| 6,352,270 B1 | 3/2002 | Wu | |
| D456,460 S | 4/2002 | Tseng | |
| 6,378,880 B1 | 4/2002 | Lin | |
| 6,382,366 B1 | 5/2002 | Chang | |
| 6,386,330 B1 | 5/2002 | Wei | |
| 6,394,213 B1 | 5/2002 | Tsai | |
| 6,409,190 B1 | 6/2002 | Tsai | |
| D459,761 S | 7/2002 | Chen | |
| 6,416,060 B1 | 7/2002 | Chen | |
| 6,416,063 B1 | 7/2002 | Stillinger et al. | |

(56) References Cited

U.S. PATENT DOCUMENTS

| | | |
|---|---|---|
| 6,428,021 B1 | 8/2002 | Tung |
| 6,428,050 B1 | 8/2002 | Brandley et al. |
| 6,435,528 B1 | 8/2002 | Tsai |
| 6,443,470 B1 | 9/2002 | Ulrich et al. |
| D464,379 S | 10/2002 | Lin |
| 6,462,493 B2 | 10/2002 | Lan |
| 6,467,560 B1 | 10/2002 | Anderson |
| 6,481,728 B2 | 11/2002 | Chen |
| 6,481,729 B2 | 11/2002 | Herman et al. |
| 6,481,913 B2 | 11/2002 | Chen |
| D468,236 S | 1/2003 | Pollitzer et al. |
| D471,597 S | 3/2003 | Chen |
| D471,598 S | 3/2003 | Chen |
| 6,533,054 B1 | 3/2003 | Fey |
| D472,596 S | 4/2003 | Schnuckle et al. |
| D473,905 S | 4/2003 | Schnuckle et al. |
| D475,093 S | 5/2003 | Furter et al. |
| 6,557,861 B2 | 5/2003 | Saylor |
| 6,557,873 B2 | 5/2003 | Nardone |
| D476,532 S | 7/2003 | Edwards |
| 6,604,593 B1 | 8/2003 | Mullet |
| 6,612,592 B1 | 9/2003 | Soo |
| 6,619,416 B2 | 9/2003 | Lan |
| 6,619,679 B2 | 9/2003 | Lan |
| D482,750 S | 11/2003 | Magerer et al. |
| 6,672,607 B2 | 1/2004 | Chung |
| 6,676,138 B1 | 1/2004 | Rosso |
| 6,679,505 B2 | 1/2004 | Yang |
| 6,739,421 B1 | 5/2004 | Miya |
| D492,367 S | 6/2004 | Dennis |
| 6,796,394 B1 * | 9/2004 | Lin ................. A63C 17/12 180/180 |
| D497,397 S | 10/2004 | Sramek |
| 6,832,660 B2 | 12/2004 | Dodd |
| D505,469 S | 5/2005 | Joung et al. |
| D513,629 S | 1/2006 | Sramek |
| 6,981,711 B2 | 1/2006 | Seta |
| D516,132 S | 2/2006 | Sramek |
| 7,007,977 B1 | 3/2006 | Gallagher |
| D527,536 S | 9/2006 | Mcoy |
| 7,150,461 B2 * | 12/2006 | Schnuckle ........... A63C 11/023 280/87.05 |
| 7,156,405 B1 | 1/2007 | Ming |
| 7,163,210 B1 * | 1/2007 | Rehkemper ........... A63C 17/12 280/11.221 |
| 7,204,330 B1 * | 4/2007 | Lauren ............... A63C 17/12 180/181 |
| 7,214,337 B2 | 5/2007 | Grande |
| 7,226,063 B2 | 6/2007 | Paddock |
| 7,232,139 B2 | 6/2007 | Cole |
| 7,351,265 B2 | 4/2008 | Vitale et al. |
| D569,447 S | 5/2008 | Thomas |
| D574,296 S | 8/2008 | Keski-Luopa |
| 7,419,171 B1 | 9/2008 | Ka |
| 7,431,110 B2 | 10/2008 | Greenwood et al. |
| D579,987 S | 11/2008 | Hong |
| D581,991 S | 12/2008 | Armand et al. |
| 7,584,974 B2 | 9/2009 | Jackman et al. |
| D603,463 S | 11/2009 | Jessie, Jr. |
| 7,610,972 B2 * | 11/2009 | Adams ................. A63C 17/008 180/180 |
| 7,654,356 B2 | 2/2010 | Wu |
| D623,701 S | 9/2010 | Dalgard et al. |
| 7,900,731 B2 * | 3/2011 | McKinzie ............ A63C 17/008 180/181 |
| 7,976,035 B2 | 7/2011 | Chan |
| 7,980,567 B2 | 7/2011 | Yu et al. |
| 7,988,159 B2 | 8/2011 | Chen |
| D645,522 S | 9/2011 | Powers et al. |
| 8,025,300 B1 | 9/2011 | Jordan |
| D654,963 S | 2/2012 | Powers et al. |
| D656,560 S | 3/2012 | Patterson et al. |
| 8,146,947 B2 | 4/2012 | Hadley |
| 8,186,693 B2 | 5/2012 | Kortschot |
| 8,251,377 B2 * | 8/2012 | Green ................ A63C 17/0086 280/11.231 |
| 8,292,018 B2 | 10/2012 | Huang |
| 8,292,308 B2 * | 10/2012 | Green ................ A63C 17/0086 280/11.26 |
| D671,600 S | 11/2012 | Horne |
| D672,400 S | 12/2012 | Pizzi |
| 8,348,284 B2 * | 1/2013 | Green ................ A63C 17/0086 280/11.26 |
| D678,124 S | 3/2013 | Canni et al. |
| D681,759 S | 5/2013 | Treadway et al. |
| D684,217 S | 6/2013 | Hadley |
| D686,674 S | 6/2013 | Hadley et al. |
| D687,499 S | 7/2013 | Horne |
| 8,490,985 B2 | 7/2013 | Landau |
| D691,671 S | 8/2013 | Chen et al. |
| D692,963 S | 10/2013 | Radtke et al. |
| D693,414 S | 11/2013 | Hadley et al. |
| D695,644 S | 12/2013 | Timonen |
| D698,868 S | 2/2014 | Chan |
| 8,668,039 B2 * | 3/2014 | Tuli ................. A43B 3/0005 180/180 |
| 8,672,074 B2 * | 3/2014 | Ganeous ............. A63C 17/10 180/181 |
| 8,684,121 B2 | 4/2014 | Treadway |
| 8,727,359 B2 * | 5/2014 | Green ................ A63C 17/0086 280/11.231 |
| D710,949 S | 8/2014 | Huang |
| 8,813,892 B2 | 8/2014 | Hadley et al. |
| D714,396 S | 9/2014 | Talios |
| D715,870 S | 10/2014 | Talios |
| 8,870,200 B2 | 10/2014 | Chen |
| D717,881 S | 11/2014 | Radtke et al. |
| 8,925,935 B2 | 1/2015 | Powers et al. |
| 8,985,602 B2 | 3/2015 | Chan |
| D727,833 S | 4/2015 | Talios et al. |
| 9,027,690 B2 * | 5/2015 | Chavand ............ A63C 17/12 180/181 |
| 9,045,189 B2 | 6/2015 | Lovely, II et al. |
| 9,056,241 B2 * | 6/2015 | Green ................ A63C 17/004 |
| D736,324 S | 8/2015 | Lu et al. |
| 9,114,821 B1 | 8/2015 | Xu |
| D738,435 S | 9/2015 | O'Connell |
| D741,969 S | 10/2015 | Green |
| D748,738 S | 2/2016 | Hadley et al. |
| D750,180 S | 2/2016 | Edlauer |
| 9,321,504 B2 | 4/2016 | Hadley et al. |
| D755,899 S | 5/2016 | Castrucci et al. |
| D756,464 S | 5/2016 | Edlauer |
| D756,465 S | 5/2016 | Byrne et al. |
| 9,339,720 B2 | 5/2016 | Kortschot |
| D764,615 S | 8/2016 | Treadway et al. |
| 9,452,345 B2 * | 9/2016 | Doerksen ........... A63C 17/01 |
| D772,990 S | 11/2016 | Allais |
| D774,145 S | 12/2016 | Hadley et al. |
| D774,601 S | 12/2016 | Mizrahi et al. |
| D777,844 S | 1/2017 | Connell |
| D778,806 S | 2/2017 | Welford |
| 9,592,876 B2 | 3/2017 | Lovely, II et al. |
| 9,616,318 B2 * | 4/2017 | Rogers ............... A63C 17/12 |
| 9,630,085 B2 | 4/2017 | Treadway et al. |
| 9,660,500 B2 | 5/2017 | Huang |
| 9,682,309 B2 | 6/2017 | Huang |
| 9,764,218 B2 | 9/2017 | Treadway et al. |
| 9,808,705 B2 | 11/2017 | Treadway et al. |
| D806,176 S | 12/2017 | Peng |
| D810,623 S | 2/2018 | Adcock |
| D810,836 S | 2/2018 | Hadley |
| D811,489 S | 2/2018 | Hadley et al. |
| 9,919,200 B2 * | 3/2018 | Mo ..................... A63C 17/12 |
| D815,215 S | 4/2018 | Desberg |
| D817,228 S | 5/2018 | Kroll et al. |
| D818,541 S | 5/2018 | Huang |
| 9,956,473 B2 * | 5/2018 | Chiu .................. A63C 17/12 |
| 9,987,547 B2 * | 6/2018 | Ruschkowski ........ A63C 17/12 |
| D824,805 S | 8/2018 | Karka |
| 10,071,303 B2 * | 9/2018 | Pikulski ............ A63C 17/12 |
| D829,826 S | 10/2018 | Liu et al. |
| D830,468 S | 10/2018 | Liu |

(56) References Cited

U.S. PATENT DOCUMENTS

| | | |
|---|---|---|
| 10,099,745 B2 | 10/2018 | Hadley et al. |
| D834,097 S | 11/2018 | Lin et al. |
| 10,124,851 B2 | 11/2018 | Lovely, II et al. |
| 10,137,356 B2 | 11/2018 | Kortschot |
| D836,727 S | 12/2018 | Wilson et al. |
| 10,144,480 B2 | 12/2018 | Tan et al. |
| D837,303 S | 1/2019 | Desberg |
| D839,358 S | 1/2019 | Cao |
| D839,359 S | 1/2019 | Hadley |
| 10,189,533 B2 | 1/2019 | Lovely, II et al. |
| D842,409 S | 3/2019 | Novick |
| D842,758 S | 3/2019 | Hall et al. |
| D849,601 S | 5/2019 | Li et al. |
| D858,646 S | 9/2019 | Yang |
| D861,538 S | 10/2019 | Frahm |
| D866,675 S | 11/2019 | Desberg |
| D872,192 S | 1/2020 | Hadley |
| D873,349 S | 1/2020 | Huang |
| 10,737,743 B2 | 8/2020 | Hadley et al. |
| D910,766 S | 2/2021 | Hadley |
| D911,455 S | 2/2021 | Huang |
| D912,180 S | 3/2021 | Desberg et al. |
| D914,102 S | 3/2021 | Hadley et al. |
| 10,933,299 B2 | 3/2021 | Zhang et al. |
| 11,033,799 B2 | 6/2021 | Korschot |
| 11,084,550 B2 | 8/2021 | Aguilar Ruelas et al. |
| D941,928 S | 1/2022 | Hadley |
| D941,929 S | 1/2022 | Hadley |
| D941,930 S | 1/2022 | Hadley |
| 11,338,883 B2 | 5/2022 | Hadley et al. |
| 11,565,169 B2 | 1/2023 | Korschot |
| D977,602 S | 2/2023 | Desberg et al. |
| 11,707,666 B2 | 7/2023 | Zhang et al. |
| 2001/0030405 A1 | 10/2001 | Wu et al. |
| 2002/0005309 A1 | 1/2002 | Patmont et al. |
| 2002/0066610 A1 | 6/2002 | Tsai |
| 2002/0066614 A1 | 6/2002 | Heringer et al. |
| 2002/0074756 A1 | 6/2002 | Tsai |
| 2002/0079662 A1 | 6/2002 | Lee |
| 2002/0079855 A1 | 6/2002 | Parks |
| 2002/0093161 A1 | 7/2002 | Udwin et al. |
| 2002/0096843 A1 | 7/2002 | Wei |
| 2002/0096850 A1 | 7/2002 | Lu |
| 2002/0105152 A1 | 8/2002 | Miller |
| 2002/0105157 A1 | 8/2002 | Chen |
| 2002/0108798 A1 | 8/2002 | Huntsberger et al. |
| 2002/0109313 A1 | 8/2002 | Johnsen |
| 2002/0117825 A1 | 8/2002 | Ho |
| 2002/0134604 A1 | 9/2002 | Lan |
| 2002/0140194 A1 | 10/2002 | Shaw |
| 2002/0145264 A1 | 10/2002 | Hung |
| 2002/0149165 A1 | 10/2002 | Lin |
| 2002/0158437 A1 | 10/2002 | Carbonero |
| 2002/0167146 A1 | 11/2002 | Chang |
| 2002/0170763 A1 | 11/2002 | Townsend |
| 2002/0180169 A1 | 12/2002 | Kwok |
| 2003/0020244 A1 | 1/2003 | Sung |
| 2003/0042058 A1 | 3/2003 | Chen |
| 2003/0127816 A1 | 7/2003 | Schnuckle et al. |
| 2003/0168273 A1 | 9/2003 | Ducharme et al. |
| 2003/0221888 A1 | 12/2003 | McKinney, Jr. et al. |
| 2004/0041359 A1 | 3/2004 | Im |
| 2004/0129472 A1 | 7/2004 | Cheng |
| 2004/0217562 A1 | 11/2004 | Haugen et al. |
| 2005/0006859 A1 | 1/2005 | Farrelly et al. |
| 2005/0006866 A1 | 1/2005 | Chen |
| 2005/0012289 A1 | 1/2005 | Wang et al. |
| 2005/0012290 A1 | 1/2005 | McClain |
| 2005/0116430 A1 | 6/2005 | Chen |
| 2005/0121866 A1 | 6/2005 | Kamen et al. |
| 2005/0127629 A1 | 6/2005 | Nelson et al. |
| 2005/0173175 A1 | 8/2005 | Lee |
| 2005/0194759 A1 | 9/2005 | Chen |
| 2006/0049595 A1 | 3/2006 | Crigler et al. |
| 2006/0125200 A1 | 6/2006 | Cole |
| 2006/0279055 A1 | 12/2006 | Morabito |
| 2007/0045976 A1 | 3/2007 | Wu |
| 2007/0126191 A1 | 6/2007 | Kay, III |
| 2008/0197594 A1 | 8/2008 | Ling |
| 2008/0203691 A1 | 8/2008 | Hsu |
| 2009/0071740 A1 | 3/2009 | Palmer |
| 2009/0160150 A1 | 6/2009 | Johnson |
| 2009/0200768 A1 | 8/2009 | Armand et al. |
| 2009/0273152 A1 | 11/2009 | Chung |
| 2009/0321193 A1 | 12/2009 | Jackman et al. |
| 2010/0090422 A1 | 4/2010 | Chan et al. |
| 2010/0123295 A1 | 5/2010 | Landau |
| 2010/0133765 A1 | 6/2010 | Chen |
| 2011/0011657 A1 | 1/2011 | Donnell et al. |
| 2011/0031711 A1 | 2/2011 | Grossman |
| 2011/0056177 A1 | 3/2011 | Goto |
| 2012/0086181 A1 | 4/2012 | Kinnaman |
| 2013/0026734 A1 | 1/2013 | Zhang et al. |
| 2013/0081891 A1 | 4/2013 | Ulmen et al. |
| 2013/0087983 A1 | 4/2013 | Ngai |
| 2013/0186698 A1 | 7/2013 | Sarokhan |
| 2013/0270016 A1 | 10/2013 | Donnell et al. |
| 2013/0282216 A1 | 10/2013 | Edney |
| 2013/0320648 A1 | 12/2013 | Eckert et al. |
| 2014/0090916 A1 | 4/2014 | Lovley, II et al. |
| 2014/0158446 A1 | 6/2014 | Treadway |
| 2014/0332297 A1 | 11/2014 | Kortschot |
| 2015/0196831 A1 | 7/2015 | Treadway et al. |
| 2015/0306511 A1 | 10/2015 | Norman et al. |
| 2015/0352430 A1 | 12/2015 | Treadway et al. |
| 2016/0129963 A1* | 5/2016 | Ying .................... B62D 51/001 180/6.5 |
| 2016/0213999 A1 | 7/2016 | Treadway et al. |
| 2016/0256767 A1 | 9/2016 | Cerboneschi |
| 2016/0311322 A1 | 10/2016 | Lagant et al. |
| 2016/0332061 A1 | 11/2016 | Kortschot |
| 2017/0182397 A1 | 6/2017 | Zhang |
| 2017/0182398 A1 | 6/2017 | Garcia Elena |
| 2017/0240239 A1 | 8/2017 | Huang et al. |
| 2017/0259162 A1 | 9/2017 | Mo |
| 2018/0029659 A1 | 2/2018 | Desberg |
| 2019/0263468 A1 | 8/2019 | Huang |
| 2019/0314709 A1 | 10/2019 | Kortschot |
| 2019/0367116 A1 | 12/2019 | Desberg et al. |
| 2022/0348284 A1 | 11/2022 | Hadley et al. |

FOREIGN PATENT DOCUMENTS

| | | |
|---|---|---|
| CN | 2273210 Y | 1/1998 |
| CN | 2448414 Y | 9/2001 |
| CN | 2452879 Y | 10/2001 |
| CN | 1143702 C | 3/2004 |
| CN | 2619503 Y | 6/2004 |
| CN | 2717494 Y | 8/2005 |
| CN | 2785659 Y | 6/2006 |
| CN | 2915189 Y | 6/2007 |
| CN | 200966900 Y | 10/2007 |
| CN | 204021174 U | 12/2014 |
| CN | 104787183 | 7/2015 |
| CN | 104941171 A | 9/2015 |
| CN | 105148496 A | 12/2015 |
| CN | 303684781 | 5/2016 |
| CN | 106422285 A | 2/2017 |
| CN | 205952205 | 2/2017 |
| CN | 205952219 U | 2/2017 |
| CN | 206138715 U | 5/2017 |
| CN | 108295457 A | 7/2018 |
| CN | 108325204 A | 7/2018 |
| CN | 304753393 | 7/2018 |
| DE | 4424297 | 1/1996 |
| DE | 4424297 A1 | 1/1996 |
| DE | 201 07 388 U1 | 7/2001 |
| EP | 0 995 468 | 4/2000 |
| GB | 2 441 394 | 9/2008 |
| JP | 56085381 | 7/1981 |
| JP | 2001-225775 A | 8/2001 |
| JP | 3081197 U | 10/2001 |
| KR | 200378761 Y1 | 3/2005 |
| WO | WO 96/20762 | 7/1996 |

(56) References Cited

FOREIGN PATENT DOCUMENTS

| WO | WO 2000/03773 | 1/2000 |
| WO | WO 2002/089933 | 11/2002 |
| WO | WO 2008/006275 | 1/2008 |
| WO | WO 2008/019482 | 2/2008 |
| WO | WO 2015/095368 | 6/2015 |
| WO | WO 2015/114614 A2 | 8/2015 |
| WO | WO 2016/128488 | 8/2016 |
| WO | WO 2017/050247 | 3/2017 |
| WO | WO 2017/127464 A1 | 7/2017 |
| WO | WO 2018/013994 A1 | 1/2018 |
| WO | WO 2018/0191456 A1 | 2/2018 |
| WO | WO 2019/0232248 | 12/2019 |
| WO | WO 2020/069299 A1 | 4/2020 |

OTHER PUBLICATIONS

International Search Report and Written Opinion in corresponding International Patent Application No. PCT/US2017/042249, dated Sep. 13, 2017, in 7 pages.
https://www.amazon.com/Razor-Turbo-Jetts-Electric-Wheels/dp/BK07H6RB4MX?th=1 (Year: 2018).

\* cited by examiner

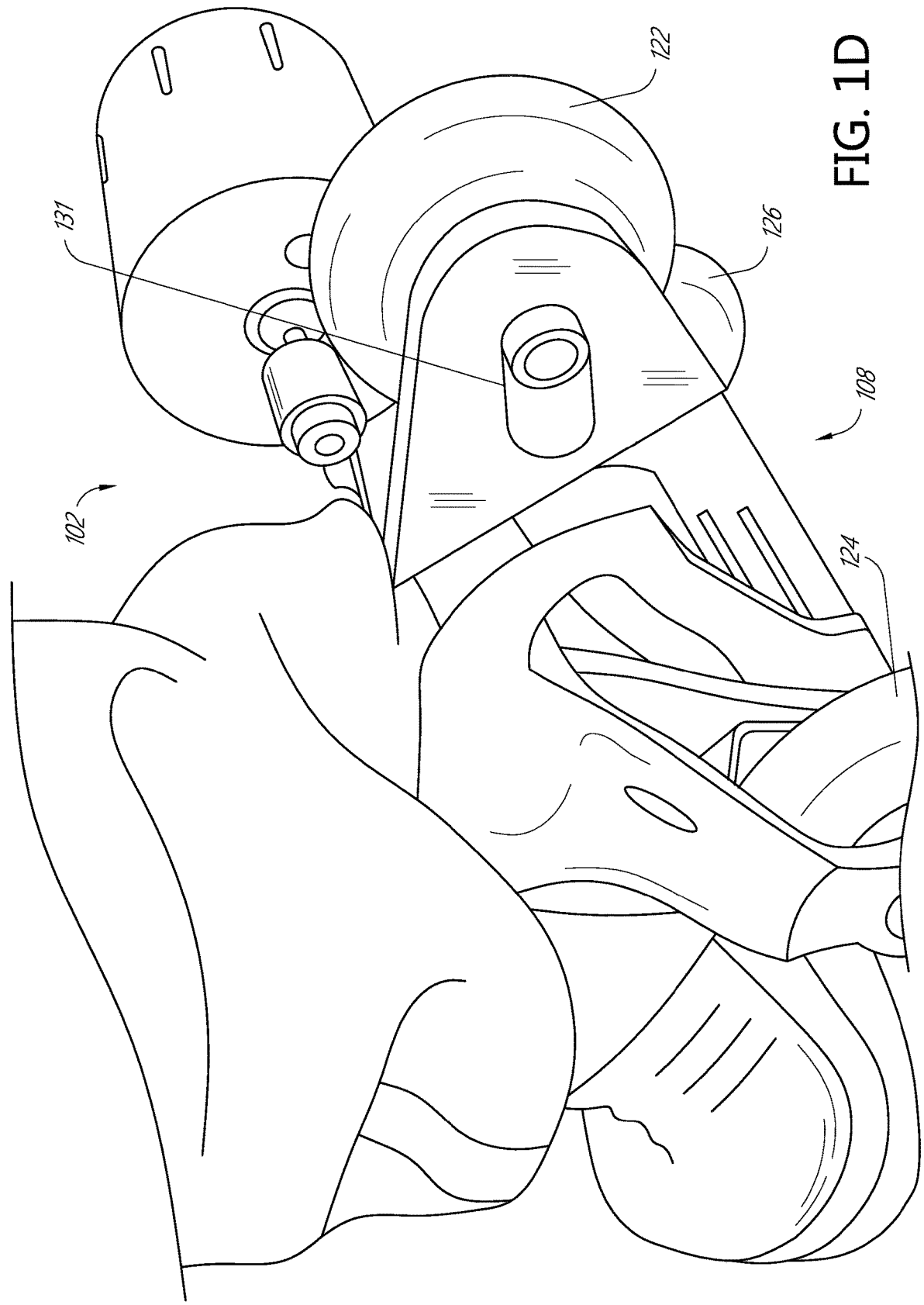

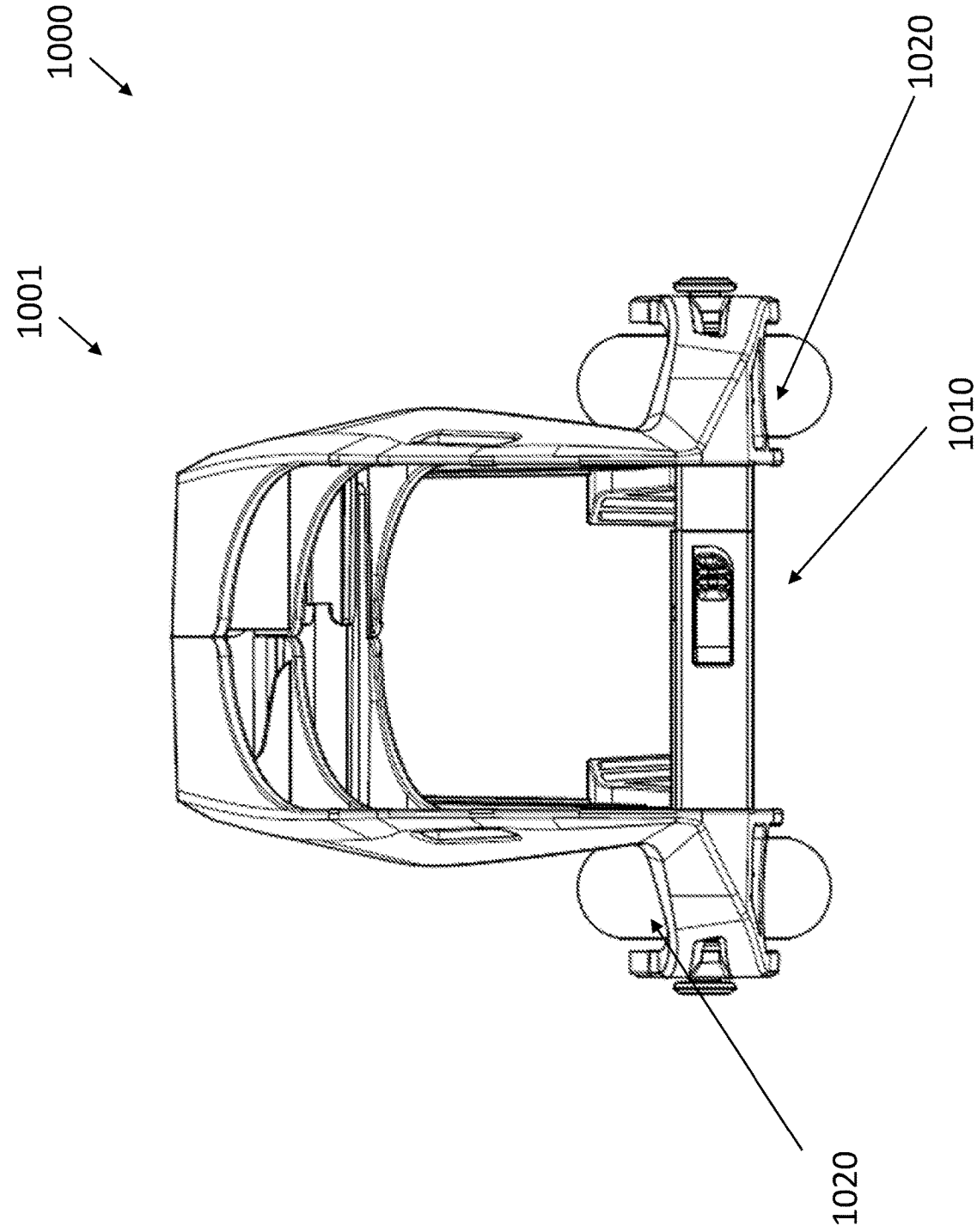

POWERED MOBILITY SYSTEMS

CROSS REFERENCE

This application claims the priority benefit under at least 35 U.S.C. § 119 of U.S. Provisional Patent Application No. 62/362,772, filed Jul. 15, 2016, U.S. Provisional Patent Application No. 62/445,148, filed Jan. 11, 2017, and U.S. Provisional Patent Application No. 62/448,835, filed Jan. 20, 2017, the entirety of each of which is incorporated by reference herein.

BACKGROUND

Field

The present disclosure relates to mobility systems, such as powered mobility systems that can be securely attached to and/or receive that receive a user's foot.

Description of Certain Related Art

Many types of personal mobility systems exist, such as roller skates, skateboards, scooters, bicycles, karts, etc. A user can ride such a system to travel from place to place.

SUMMARY OF CERTAIN FEATURES

A need still exists for new and/or improved designs, which may provide a new riding experience or unique functionality. The systems, methods and devices described herein have innovative aspects, no single one of which is indispensable or solely responsible for their desirable attributes.

Various powered mobility systems are described in this disclosure. In some embodiments, the system can include at least one powered skate. The powered skate can include a platform, a plurality of wheels, and a motor assembly. The motor assembly can include a motor and a bushing. The motor assembly can be configured to drive at least one drive wheel. The motor assembly can be controlled by the user to regulate driving of the drive wheel, and thus locomotion of the skate and user. In some embodiments, the system includes a powered stake and a non-powered skate. In certain variants, the system includes two powered skates.

The powered and/or non-powered skates can include a plurality of wheels. As mentioned above, for the powered skate, at least one of the wheels can be the drive wheel, which is driven by the motor to propel the skate the user. In some embodiments, the powered wheel is positioned at a rear of the powered skate, such as behind the user's heel. The powered and/or non-powered skates can include non-powered wheels. For example, in some embodiments, the powered and/or non-powered skate includes a first non-powered wheel on a first lateral side of the user's foot and a second skate on a second lateral side of the user's foot. In certain implementations, the powered and/or non-powered skate includes at least one non-powered wheel near a front of the skate, such as at or near where a user's toes or forefoot are positioned when wearing the skate. The non-powered wheels can aid in distributing the user's weight onto the ground, can help in balancing on the skates, and/or can enhance the user's comfort while rising on the skates.

According to some embodiments, a powered mobility system includes a powered skate and a non-powered skate. In some embodiments, the powered skate includes a frame, a plurality of wheels, a motor assembly, a transmission assembly, and a power supply. The plurality of wheels can include a driving wheel disposed rearwardly from a heel end of the powered skate and a side wheel. The motor assembly can include a motor and a drive shaft. The transmission assembly can include a gear transmission. The gear transmission can comprise a driving gear connected to the drive shaft and a driven gear configured to spin the driving wheel. The power supply can power the motor assembly and to cause the motor to spin the driving wheel.

In some embodiments, the powered skate comprises a heel end, the heel end comprising a pressure sensor configured to detect a pressure applied to the heel end by the user. In some embodiments, the powered skate comprises a controller configured to detect shifts in the user's position and adjust a speed of the motor. In some embodiments, the platform comprises at least one strap for securing the user's foot within the platform. In some embodiments, the non-powered skate comprises a plurality of wheels disposed near a toe end and a heel end of the platform.

In some embodiments, the powered skate comprises a connector configured to couple the motor assembly to the frame. In some embodiments, the driving wheel is supported at one end of the connector and wherein the motor assembly is disposed rearwardly from the platform and above the driving wheel such that when the user leans on the end of the swing arm assembly, the motor drives the driving wheel. In some embodiments, a speed of the motor increases when the motor assembly pivots in an upward direction. In some embodiments, a speed of the motor increases when the motor assembly pivots towards the platform and the platform pivots towards the motor assembly. In some embodiments, the driving wheel is configured to contact a riding surface when the motor assembly pivots towards the platform and the platform pivots towards the motor assembly. In some embodiments, the driving wheel and motor assembly are disposed at one end of the connector and wherein the power supply is disposed rearwardly from the platform and above the motor assembly such that when the user leans on the end of the swing arm assembly, the power supply supplies power to the motor to drive the driving wheel.

According to some embodiments, a powered skate includes a frame, a plurality of wheels, a motor assembly, a transmission assembly, and a power supply. The plurality of wheels can include a driving wheel disposed rearwardly from a heel end of the powered skate and a side wheel. The motor assembly can include a motor and a drive shaft. The transmission assembly can include a gear transmission, the gear transmission comprising at least a driving gear connected to the drive shaft and a driven gear configured to spin the driving wheel. The power supply can power the motor assembly and to cause the motor to spin the driving wheel.

In some embodiments, the powered skate comprises a heel end, the heel end comprising a pressure sensor configured to detect a pressure applied to the heel end by the user. In some embodiments, the powered skate comprises a controller configured to detect shifts in the user's position and adjust a speed of the motor. In some embodiments, the powered skate comprises a connector configured to couple the motor assembly to the frame.

In some embodiments, the driving wheel is supported at one end of the connector and wherein the motor assembly is disposed rearwardly from the platform and above the driving wheel such that when the user leans on the end of the swing arm assembly, the motor drives the driving wheel. In some embodiments, a speed of the motor increases when the motor assembly pivots in an upward direction. In some embodiments, a speed of the motor increases when the motor assembly pivots towards the platform and the platform pivots towards the motor assembly. In some embodiments, the driving wheel is configured to contact a riding surface when the motor assembly pivots towards the platform and the platform pivots towards the motor assembly. In some embodiments, the driving wheel and motor assembly are disposed at one end of the connector and wherein the power supply is disposed rearwardly from the platform and above the motor assembly such that when the user leans on the end of the swing arm assembly, the power supply supplies power to the motor to drive the driving wheel.

According to some embodiments, a powered mobility system comprises a powered skate and a non-powered skate. The powered skate can include a frame, a plurality of wheels, a motor assembly, and a power supply. The frame can include a platform. The platform can receive a user's foot and secure the user's foot within the platform. The plurality of wheels can include a driving wheel disposed rearwardly from a heel end of the powered skate and a side wheel. The motor assembly can include a motor and a bushing. The power supply can power the motor assembly and cause the motor to spin the driving wheel.

In some embodiments, the frame comprises a slot comprises a biasing mechanism configured to bias the driving wheel within the slot to maintain an engagement between the bushing and the driving wheel. In some embodiments, the biasing mechanism includes one or more of a spring or a cushion. In some embodiments, the powered skate comprises a heel end, the heel end comprising a pressure sensor configured to detect a pressure applied to the heel end by the user. In some embodiments, the powered skate comprises a controller configured to detect shifts in the user's position and adjust a speed of the motor. In some embodiments, the platform comprises at least one strap for securing the user's foot within the platform. In some embodiments, the non-powered skate comprises a plurality of wheels disposed near a toe end and a heel end of the platform.

According to some embodiments, a powered mobility system comprises a powered skate and a non-powered skate. The powered skate can include a frame, a plurality of wheels, a motor assembly, and a power supply. The frame can include a platform and a swing arm assembly. The platform can receive a user's foot and secure the foot within the platform. The swing arm assembly can pivot about a swing arm attachment mechanism. The plurality of wheels can include a driving wheel disposed rearwardly from a heel end of the powered skate and a side wheel. The motor assembly can include a motor and a bushing. The power supply can power the motor assembly and cause the motor to spin the driving wheel.

In some embodiments, the powered skate comprises a heel end, the heel end comprising a pressure sensor configured to detect a pressure applied to the heel end by the user. In some embodiments, the powered skate comprises a controller configured to detect shifts in the user's position and adjust a speed of the motor. In some embodiments, a speed of the motor is a function of swing arm position such that the speed of the motor increases when the swing arm pivots in an upward direction. In some embodiments, the power supply is disposed at one end of the swing arm assembly. In some embodiments, the driving wheel is disposed at one end of the swing arm assembly and wherein the motor assembly is disposed rearwardly from the platform and above the driving wheel such that when the user leans on the end of the swing arm assembly, the motor drives the driving wheel. In some embodiments, the driving wheel and motor assembly are disposed at one end of the swing arm assembly and wherein the power supply is disposed rearwardly from the platform and above the motor assembly such that when the user leans on the end of the swing arm assembly, the power supply supplies power to the motor to drive the driving wheel. In some embodiments, the non-powered skate comprises a plurality of wheels disposed near a toe end and a heel end of the platform. In some embodiments, the frame comprises a slot comprises a biasing mechanism configured to bias the driving wheel within the slot to maintain an engagement between the bushing and the driving wheel. In some embodiments, the biasing mechanism includes one or more of a spring or a cushion.

According to some embodiments, a powered skate includes a frame, a plurality of wheels, a motor assembly, and a power supply. The frame can include a platform and a swing arm assembly. The platform can receive a user's foot and secure the foot within the platform. The swing arm assembly can pivot about a swing arm attachment mechanism. The plurality of wheels can include a driving wheel disposed rearwardly from a heel end of the powered skate and a side wheel. The motor assembly can include a motor and a bushing. The power supply can power the motor assembly and cause the motor to spin the driving wheel.

In some embodiments, the driving wheel is disposed at a heel end of the swing arm assembly and wherein the motor assembly is disposed rearwardly from the platform and above the driving wheel such that when the user leans on the heel end of the swing arm assembly, the motor drives the driving wheel. In some embodiments, the driving wheel and motor assembly are disposed at a heel end of the swing arm assembly and wherein the power supply is disposed rearwardly from the platform and above the motor assembly such that when the user leans on the heel end of the swing arm assembly, the power supply supplies power to the motor to drive the driving wheel.

According to some embodiments, a powered skate includes a frame, a plurality of wheels, a motor assembly, and a power supply. The frame can include a platform and a swing arm assembly. The platform can receive a user's foot and secure the foot within the platform. The swing arm assembly can pivot about a swing arm attachment mechanism. The plurality of wheels can include a driving wheel disposed rearwardly from a heel end of the powered skate and a side wheel. The motor assembly can include a hub motor. The power supply can power the motor assembly and cause the motor to spin the driving wheel.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

FIG. 1D illustrates a rear perspective view of a portion of the powered mobility system of FIG. 1A on the user's foot.

FIG. 10B illustrates a front view of the powered mobility system of FIG. 10A.

DETAILED DESCRIPTION OF CERTAIN EMBODIMENTS

Figure 1A:
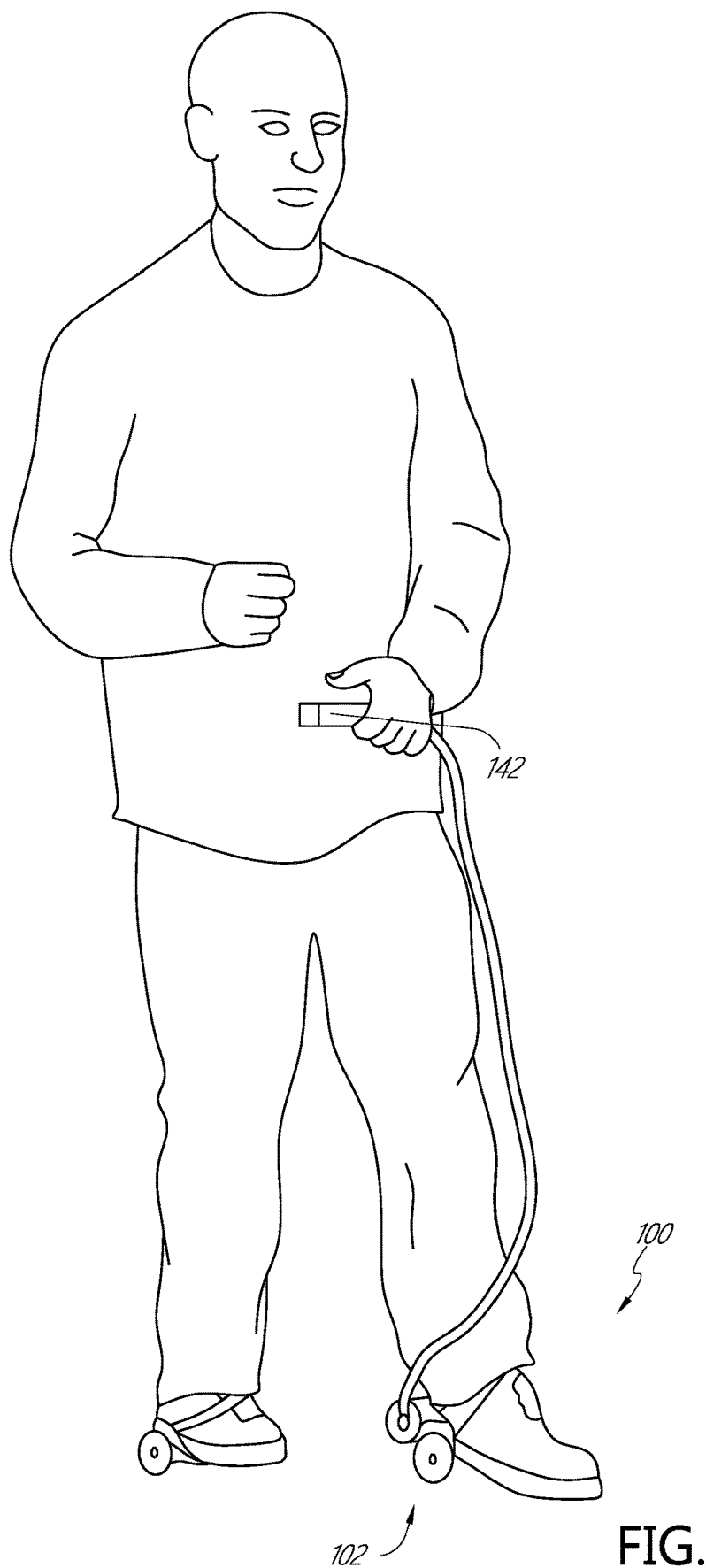
FIG. 1A illustrates a powered mobility system on a user's foot.

Embodiments of systems, components and methods of assembly and manufacture will now be described with reference to the accompanying figures, wherein like numerals refer to like or similar elements throughout. Although several embodiments, examples and illustrations are disclosed below, the inventions described herein extend beyond the specifically disclosed embodiments, examples and illustrations, and can include other uses of the inventions and obvious modifications and equivalents thereof. Embodiments of the inventions can comprise several novel features and no single feature is solely responsible for its desirable attributes or is essential to practicing the inventions herein described.

The terminology used in this disclosure should be interpreted by its plain and ordinary meaning, unless specifically specified otherwise. The terminology should not be interpreted in any limited or restrictive manner simply because it is being used in conjunction with a description of certain specific embodiments of the inventions. Throughout the following description, like numbers refer to like components.

Overview

Skating systems and/or other mobility systems can be attached to a user's foot to enable the user to ride across a floor and/or other surface. In some systems, two non-powered skates may be used. In such systems, each of the non-powered skates can support and surround an entire foot. However, the skates may not provide sufficient support to the user and/or may not allow the user to reach a sufficient speed. Further, such systems may require the user to manually propel themselves on the skates.

Various embodiments of powered mobility systems are described below. Some embodiments of the powered mobility system described herein can provide the user with a comfortable skate that can securely hold the user's foot within the skate. In certain embodiments, the powered mobility system can include at least one powered skate and at least one non-powered skate. Thus, the user may exert less energy when using the skates. The user could also perform tricks that the user would not otherwise be able to perform as a result of the configurations of the powered mobility system described herein.

In certain embodiments, the powered mobility system can enhance efficiency by using various engagement mechanisms between a motor assembly and a power supply. In certain embodiments, the powered mobility system can require less power than certain other powered mobility devices. The powered mobility system can increase the usability and control over the powered mobility system. FIGS. 1A-1K FIG. 1A illustrates an embodiment of a powered mobility system 100. The powered mobility system 100 can include one or more skates. For example, the powered mobility system 100 can include a powered skate and a non-powered skate. In some embodiments, the powered mobility system can include two or more powered skates. In some embodiments, the powered mobility system can include two or more non-powered skates. As illustrated, the system 100 can be configured to be worn on a user's foot or feet. In some embodiments, the powered skate and/or the non-powered skate can be universal. For example, the powered skate and/or the non-powered skate can be worn on the left and/or the right foot of the user. This can be convenient for users. In some embodiments, the powered mobility system can easily conform to any of the user's feet. In some embodiments, the powered skate and/or the non-powered skate can be worn only on the user's right or left feet.

Figure 1B:
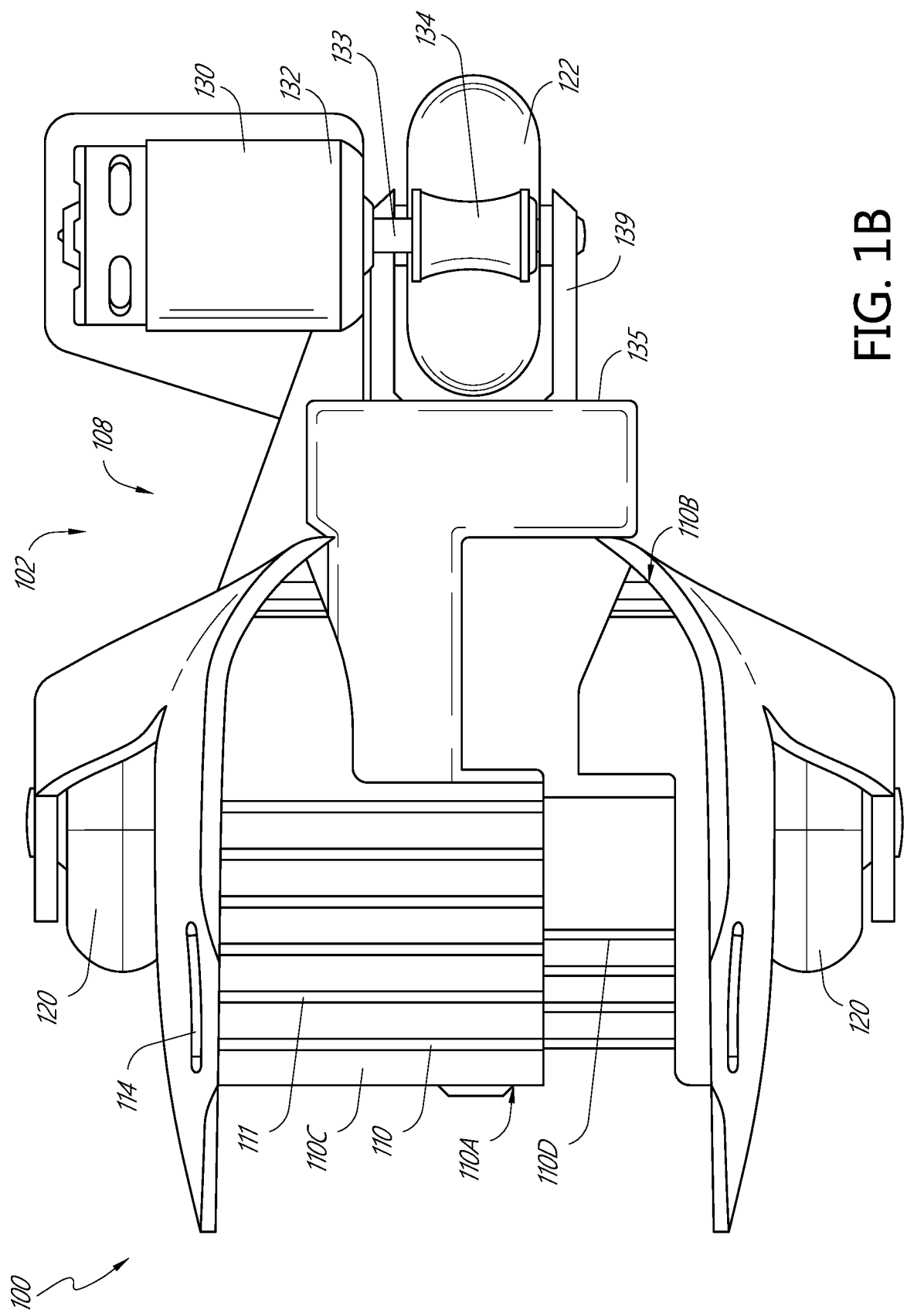
FIG. 1B illustrates a top view of the powered mobility system of FIG. 1A.
Figure 1C:
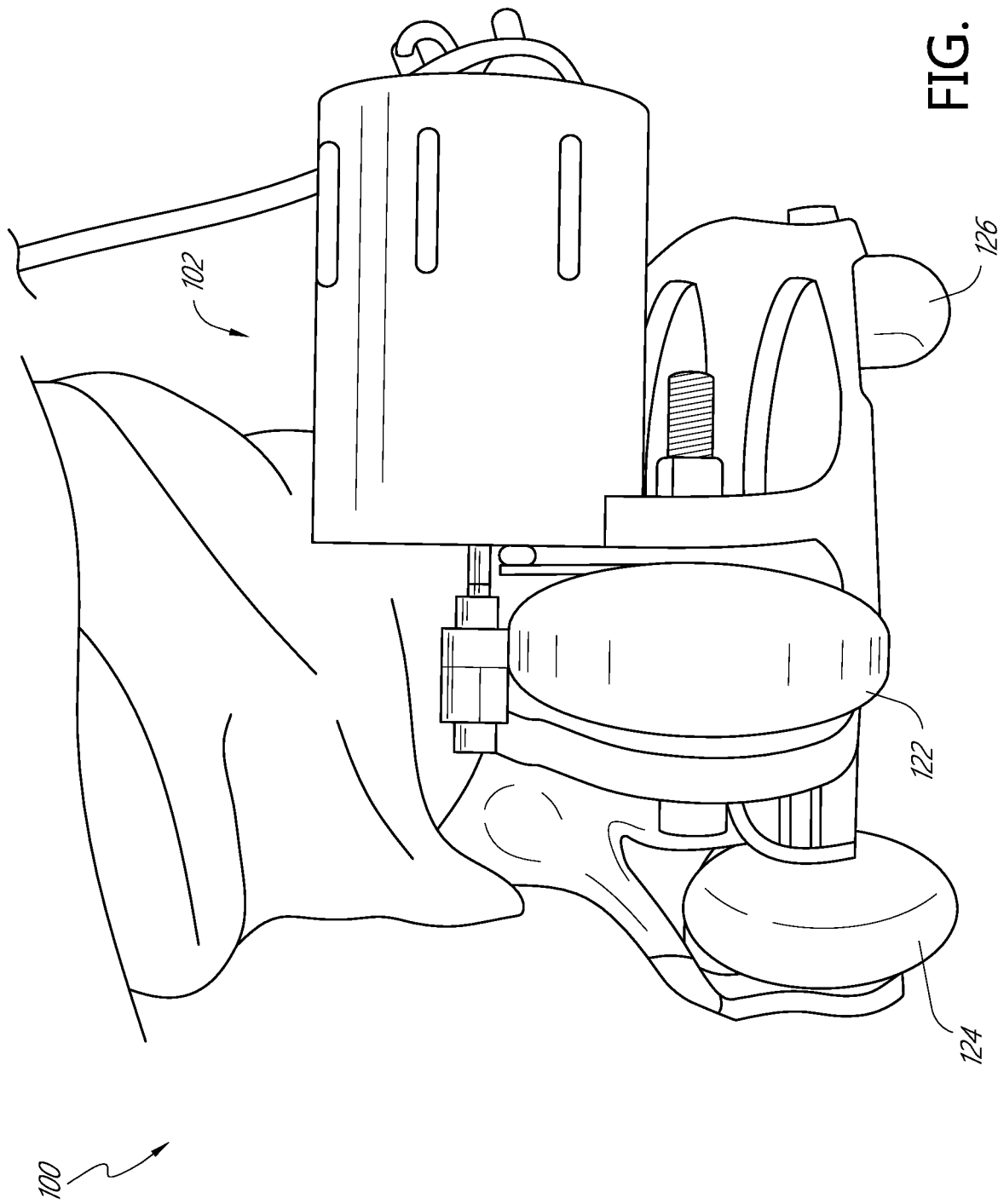
FIG. 1C illustrates a rear view of the powered mobility system of FIG. 1A on the user's foot.

As illustrated in FIG. 1B, the powered mobility system 100 can include at least one powered skate 102. The powered skate 102 can include a platform 110, a plurality of wheels 120, and a motor assembly 130. The platform 110 can be part of a frame 108.

The platform 110 can receive at least a portion user's foot. In some embodiments, the platform 110 can be adapted to receive a user's foot with a shoe. The platform can be shaped to conform to a user's foot. In some embodiments, the platform 110 can include a toe end 110A and a heel end 110B. The heel end 110B can be configured to receive and/or support a heel of the user's foot. The toe end can be configured to receive a toe of the user's foot. In some embodiments, the toe end can be configured to support only a portion of the user's foot, such as a center of the user's foot. In various embodiments, a user's toes protrude forward of the platform 110.

Figure 1E:
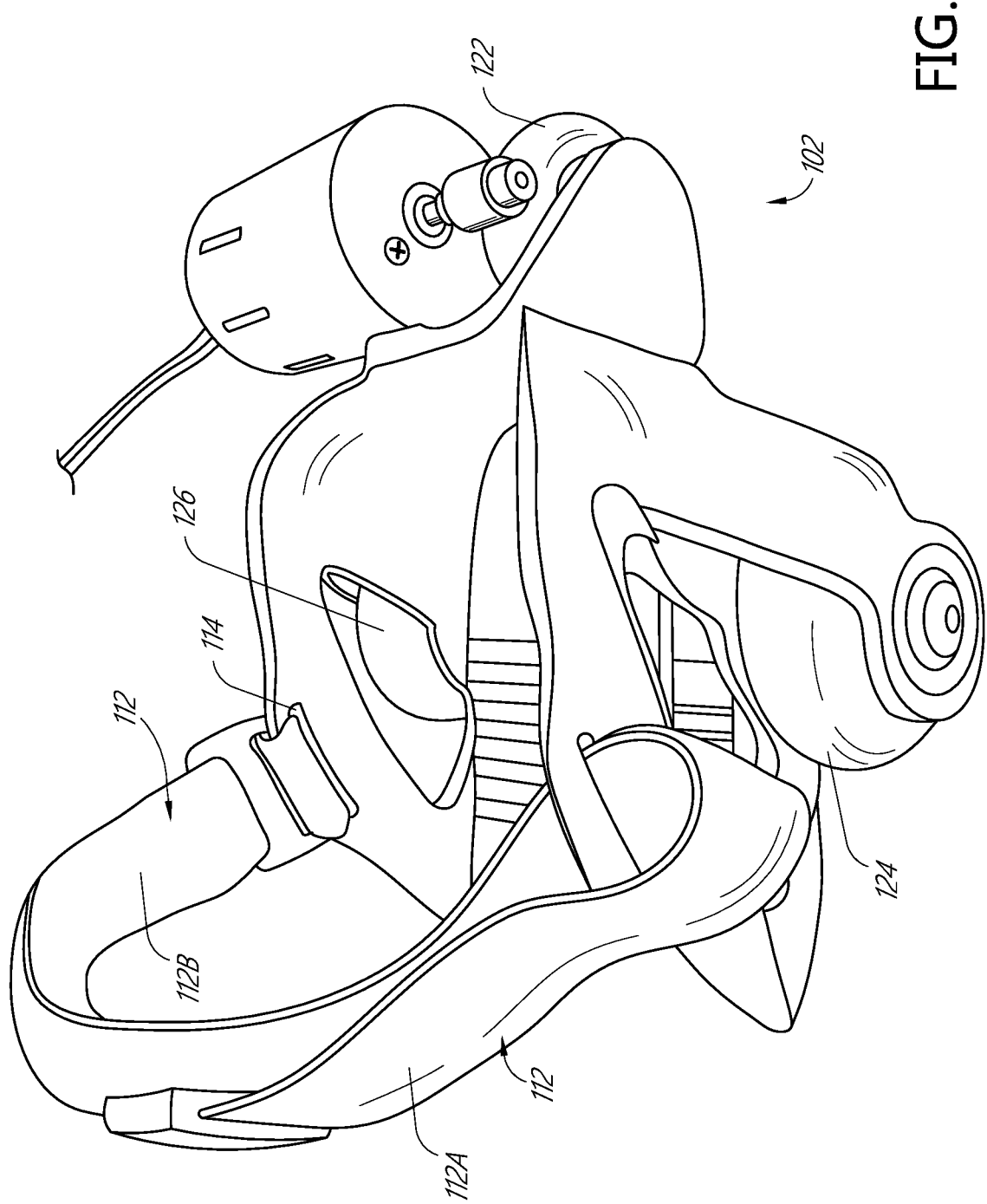
FIG. 1E illustrates a side and top perspective view of the powered mobility system of FIG. 1A.
Figure 1F:
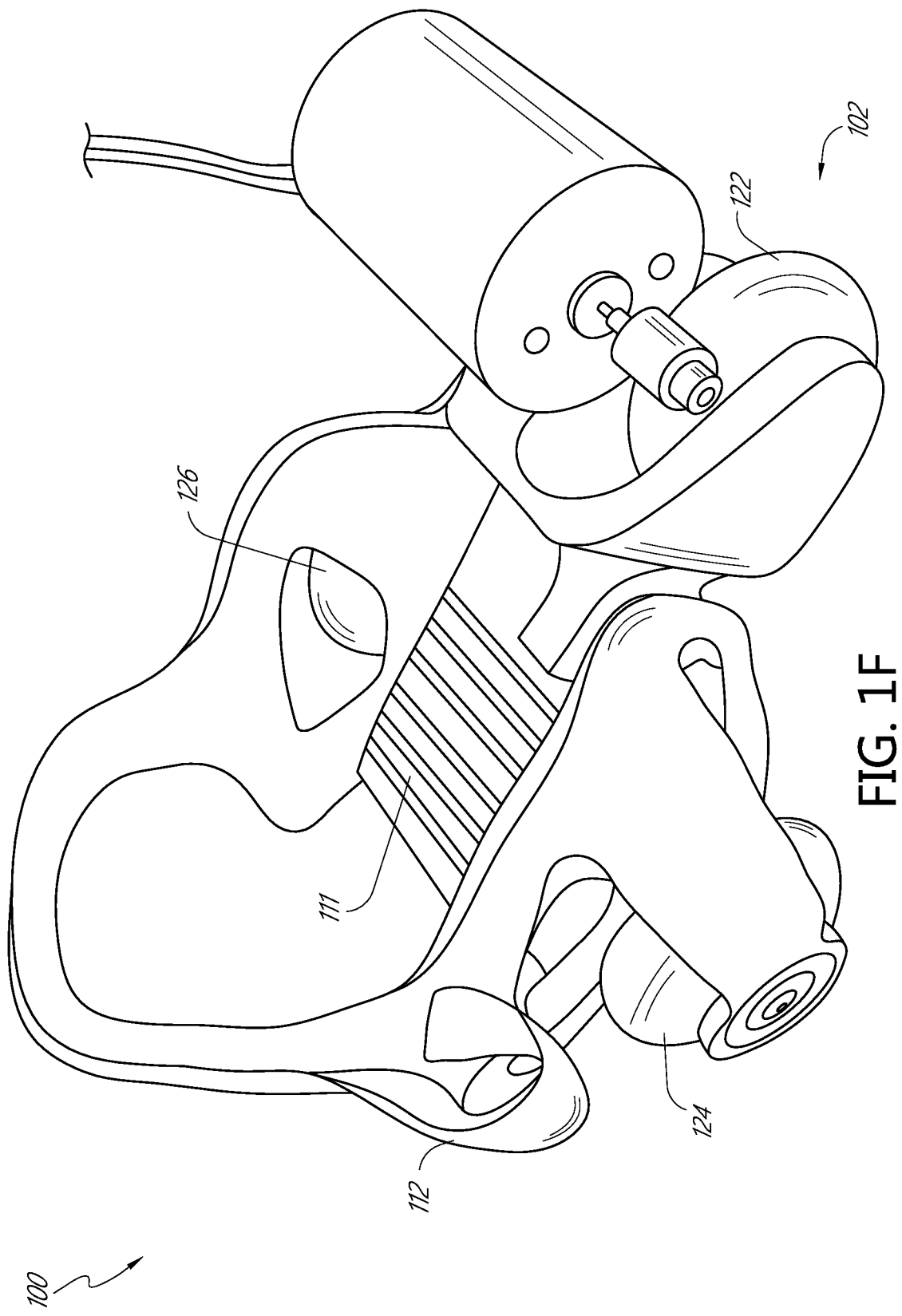
FIG. 1F illustrates a top rear perspective view of the powered mobility system of FIG. 1A.
Figure 1G:
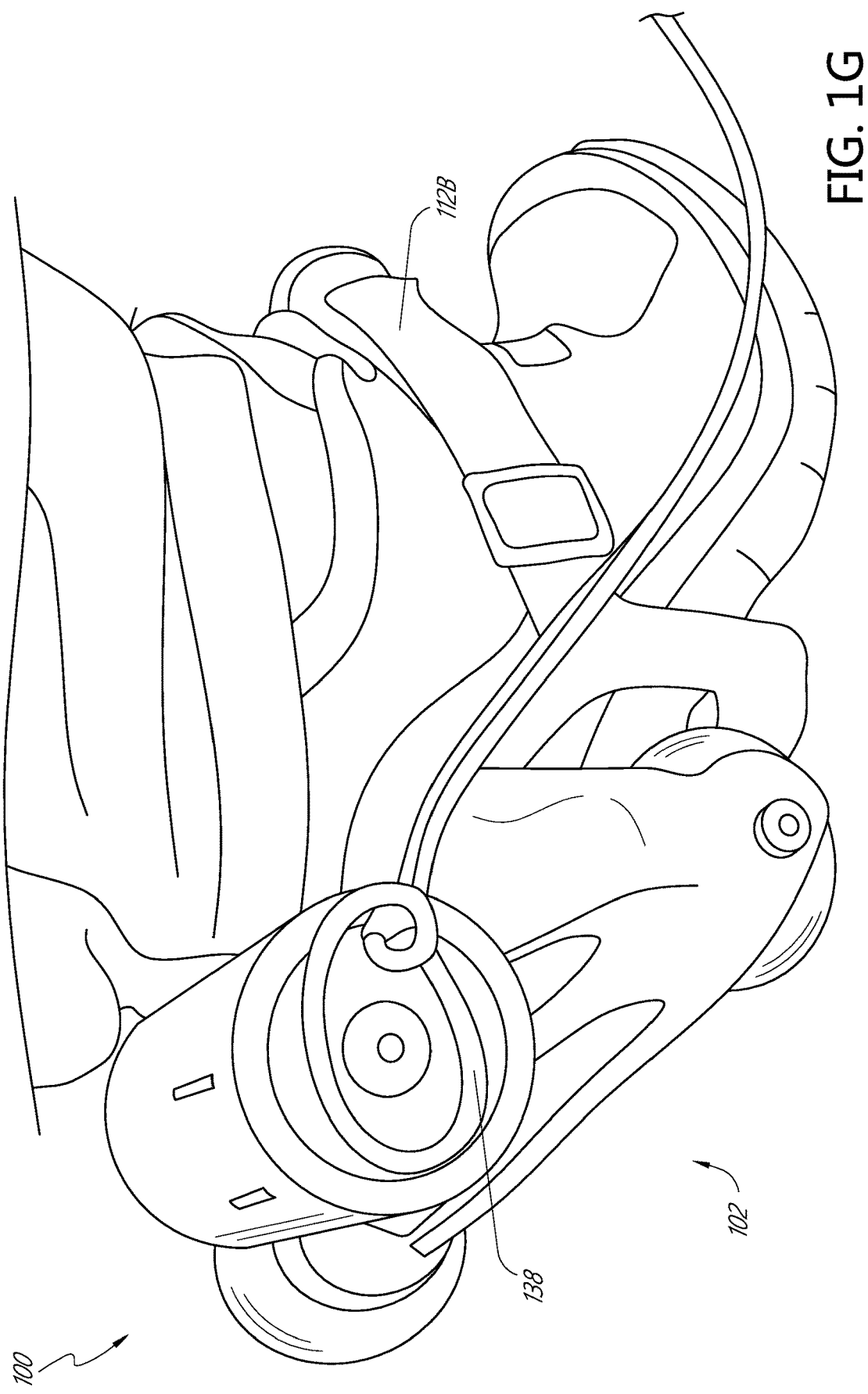
FIG. 1G illustrates a side perspective view of the powered mobility system of FIG. 1A on the user's foot.
Figure 1H:
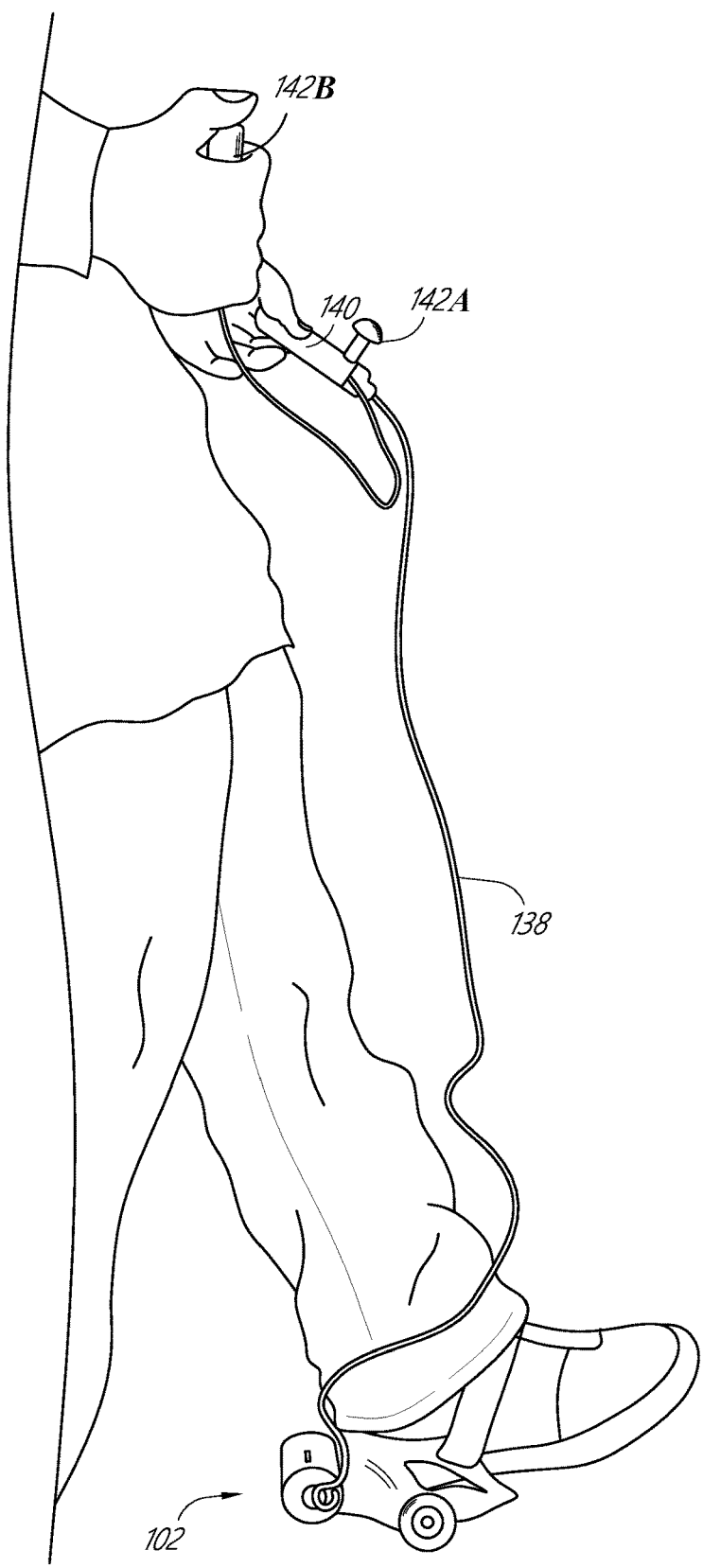
FIG. 1H illustrates a side view of the powered mobility system of FIG. 1A during use.

In some embodiments, the platform 110 can be adjustable. For example, the width and/or length of the platform can be adjusted to receive a plurality of different-sized and/or shaped feet. As shown in FIGS. 1B and 1E, for example, the platform 110 can be slidably laterally adjustable. The platform 110 can have a first platform portion 110C and a second platform portion 110D. In some embodiments, the first platform portion 110C can receive at least a portion of the second platform portion 110D. To adjust the platform 110, the first platform portion 110C can be moved laterally away from the second platform portion 110D. In some embodiments, the second platform portion 110D can be moved laterally away from the first platform portion 110C in the opposite direction. In some embodiments, the first platform 110C can be moved toward the second platform 110D and/or the second platform 110D can be moved toward the first platform 110C.

Various adjustment mechanisms can be implemented to adjust the platform 110. For example, the platform can slide along a track. In some embodiments, the adjustment mechanism includes a ratchet and/or pawl mechanism to allow movement in a first direction. In some embodiments, the adjustment mechanism allows movement in the first direction and prevents movement in a second direction. In some embodiments, a release can be implemented to allow movement in the second direction. In some embodiments, the adjustment mechanism includes a telescoping mechanism to laterally adjust the platform 110.

In some embodiments, the platform 110 can provide comfort and/or support to a user's foot. The platform 110 can include one or more grips 111. The grips 111 can be configured to provide friction to hold the user's foot within the platform 110. The grips 111 can include protrusions (e.g., ribs or otherwise) extending upwards from the platform 110. The protrusions can extend laterally across a top surface of the platform 110. In some embodiments, the grips 111 are spaced apart along the top surface of the platform 110. In some embodiments, the grips 111 can include slots and/or cutouts in the platform 110.

In some embodiments, the platform 110 can include one or more straps 112. The straps 112 can be attached to the platform. For example, the straps 112 can be attached to the platform 110 through slots 114. The slots 114 can be disposed on opposing sides of the platform 110. The slots 114 can be formed in one or more opposing sides of the frame 108. In some embodiments, the straps 112 are detachable from the platform 112. In some embodiments, the straps 112 are fixed to the platform 112. The straps 112 can extend across the platform 110 to secure a user's foot in place within the platform. For example, the straps 112 can include hook and loop fasteners, cam and ratchet fasteners, pin and hole fasteners, or other fasteners. In some configurations, the straps 112 can include a first strap 112A and a second strap 112B. In such a configuration, the first strap 112A can engage with the second strap 112B. Accordingly, the first strap 112A and the second strap 112B can be engaged to secure the user's foot within the platform 110. The strap 112 can be adjustable in some embodiments. In certain figures of this disclosure, the straps 112 are not shown for purposes of presentation.

As mentioned above, the powered skate 102 can include the plurality of wheels 120. One or more of the plurality of wheels 120 can be disposed on each side of the user's foot and/or behind the user's foot. For example, the powered skate 102 can include a driving wheel 122, a first side wheel 124, and a second side wheel 126. The driving wheel 122 can be disposed behind the user's foot. The first side wheel 124 can be on a first side of the user's foot. The second side wheel 126 can be on a second side of the user's foot. The driving wheel 122 can be connected to the platform 110 and configured to support the user's foot within the platform 110. In some embodiments, the driving wheel 122 can be powered, as described in more detail below.

The first and second side wheels 124, 126 can be connected to the platform 110 by an axle and/or bolt, among other connection means. The first and second side wheels 124, 126 can be disposed on either side of the heel end of the platform 110. In some embodiments, the first and second wheels 124, 126 can be disposed on either side of the toe end 110A and/or a region of the platform 110 positioned between the toe end 110A and the heel end 110B. The first and second side wheels can include one or more lights (e.g., LEDs) that can light up. The lights can be configured to turn on as the first and second side wheels begin to spin. In some embodiments, the lights can get brighter as the first and second side wheels spin faster.

The first and second side wheels 124, 126 can be housed within a wheel housing. The wheel housing can extend outwardly from the platform 110. The wheel housing can surround at least a portion of the first and second side wheels 124, 126 to protect the side wheels from dirt, rocks, and/or other potentially harmful substances that can disrupt the wheels during operation. For example, the wheel housing can surround at least a portion of the top of the first and second side wheels 124, 126 (see, e.g., FIGS. 1A-1K) and/or at least a portion of a side of the first and second side wheels (see, e.g., FIGS. 6A-6B and 9A-9F discussed below). In some embodiments, the wheel housing can increase aerodynamics of the powered skate 102.

In some embodiments, the first and second side wheels 124, 126 are the same size as the driving wheel 122. In some embodiments, the first and second side wheels 124, 126 have a diameter that is greater than the driving wheel 122. In some embodiments, the first and second side wheels 124, 126 have a diameter that is less than the driving wheel 122. In some embodiments, a portion of the first and second side wheels 124, 126 extends above the platform 110 and/or a portion of the first and second side wheels 124, 126 extends below the platform 110. In some embodiments, a center of the platform 110 along a vertical axis is approximately in axial alignment with the first and second side wheels 124, 126. In some embodiments, a top of the first and second side wheels 124, 126 is positioned below a battery 126, which is described in more detail below. In some embodiments, the top of the first and second side wheels 124, 126 is positioned below the user's ankle and/or a top of the user's midfoot. In some embodiments, the top of the first and second side wheels 124, 126 is positioned below a motor 132, which is described in more detail below. In some embodiments, the diameter of the first and second side wheels 124, 126 is less than one-half a maximum height of the frame 108 of the skate 102. In some embodiments, the diameter of the first and second side wheels 124, 126 is less than one-third a maximum height of the frame 108 of the skate 102.

As mentioned above, the powered mobility system 100 can include the motor assembly 130. In some embodiments, the motor assembly 130 can include a motor 132, a drive shaft 133, and a bushing 134. As shown, the bushing 134 can extend outwardly from a side of the motor 132. The bushing 134 can be coupled to an end of the drive shaft 133. As shown, the bushing 134 can be disposed in axial alignment with the drive shaft 133 of the motor assembly 130. In some embodiments, a distal end of the drive shaft 133 and/or the busing 134 is supported by an arm 139 of the frame 108 (see FIG. 1A). In some variants, the distal end of the drive shaft 133 and/or bushing 134 is cantilevered and/or does not connect with the arm 139 (see FIGS. 1B-1E). In various embodiments, the bushing 134 engages the wheel 122.

The bushing 134 can be in contact with and/or contoured to match the shape of the driving wheel 122. For example, as illustrated, the bushing 134 can have a generally hourglass shape (see FIG. 1A). In some variants, the bushing is generally cylindrical (see FIGS. 1B-1E). The motor 132 can cause the busing 134 to spin, thereby causing the driving wheel 122 to rotate. As shown, the motor 132 can be offset to the side of the driving wheel 122. In some embodiments, the motor 132 is positioned above at least a portion of the driving wheel 122. In some embodiments, the motor 132 laterally overlaps at least a portion of the driving wheel 122. In some embodiments, the motor does not laterally overlap at least a portion of the driving wheel 122.

In some embodiments, the motor assembly 130 comprises a transmission. The transmission can be configured to transmit power from the motor 132 to the drive wheel 122. In certain implementations, the transmission comprises and/or acts as a gear reduction. This can allow the motor to drive the driving wheel 122 at a slower speed than the speed of the motor 132. In some embodiments, the transmission comprises the bushing 134.

As discussed above, the bushing 134 can engage with an outside diameter of the driving wheel 122 while the motor 132 is operated. The motor 132 can spin the drive shaft 133, thereby causing the bushing 134 to spin at about the same speed as the drive shaft 133. In various embodiments, the bushing 134 is offset from the motor 132 and the diameter of the bushing 134 can be smaller at the point of contact with the driving wheel 122 than the outside diameter of the driving wheel 122. In some variants, the motor 132 can drive the driving wheel 122 at higher speeds using less power. In some implementations, the bushing 134 being on the outside diameter of the wheel 122 and having a smaller diameter than the wheel 122 causes the wheel 122 to rotate slower than the bushing 134 and/or a drive shaft of the motor 132. The transmission of power from the motor assembly 130 to the driving wheel 122 can convert higher motor speeds to a slower driving wheel speed and/or can increase torque. The increase in torque applied by the motor 130 can allow the driving wheel 122 to be driven more efficiently, to facilitate gripping the ground, etc. In some embodiments, the ratio of the outside diameter of the wheel 122 to the diameter of the portion of the bushing 134 that is in contact with the outside diameter of the wheel 122 is at least about: 4.0, 4.5, 5.0, 5.5, 6.0, 6.5, 7.0, 7.5, 8.0, ratios between the aforementioned ratios, or other ratios.

In some embodiments, the powered skate 102 can include an engagement mechanism. The engagement mechanism can maintain a connection (e.g., abutment) between the driving wheel 122 and the bushing 134. For example, the engagement mechanism can bias the drive wheel 122 and/or bushing 134 against each other. In some embodiments, as shown in FIG. 1D, the driving wheel axle 122 can ride in a slot 131 in the frame 108. When the driving wheel 122 and/or an axle of the driving wheel 122 is disposed within the slot 131, the driving wheel can be biased by a biasing mechanism. Several different types of biasing mechanisms can be implemented, such as a spring, cushion, and/or a block, among others.

The motor 132 can receive power from a power supply 135. The power supply can include a battery for example. Several locations for placing the power supply are contemplated. In the illustrated embodiment of FIG. 1B, the power supply is disposed above the motor towards the rear of the platform 110. The battery can extend from the platform 110 outwardly and rearwardly over the motor 132. In some embodiments, the battery can be disposed outwardly and rearwardly from the platform 110 offset from the position of the motor 132. In some embodiments, the battery is insertable, replaceable, and/or removable from a housing portion. In some embodiments, the battery is integrally formed with the housing portion. The battery may be any type of battery, such as a lithium ion rechargeable battery. For example, the battery can have an approximate 1.5-2.5 hour discharge time. In some embodiments, the battery can have an approximate 1-2 hour, 2-4 hour, 4-6 hour, 5 to 7 hour, 7 to 9 hour, or longer discharge time.

The motor 132 can be operated and/or controlled through at least one motor control 140. The motor 132 can be connected to the motor control 140 by the connection mechanism 138. The connection mechanism 138 can include a physical connection, such as an electrical wiring, a wireless, and/or other remote connection. The motor control 140 can signal to the system and/or otherwise be configured to supply power from the power supply 135 to the motor 132. Thus, the motor control 140 can control a motor speed of the motor 132. For example, the motor 132 can have a physical control 142 (see FIGS. 1I-1K). In such configurations, the physical control 142 can include an actuator 142, and/or a mobile application (e.g., a smartphone app), for example. The physical control 142 can include a button, switch, and/or other actuating means that can allow the user to physically control the motor 132. The physical control 142 can be configured to receive an input from the user to supply power from the power supply 135 to the motor 132. For example, the user would be able to operate the physical control 142 by activating the actuator 142. Accordingly, the physical control 142 can be configured to control locomotion of the skate 102.

In some embodiments, the physical control 142 include a first control 142A and a second control 142B. The first control 142A can be the same or different from the second control 142B. In some embodiments, the first control 142A can be held by a first hand of the user and the second control 142B can be held by a second hand of the user. In some embodiments, the first and second controls 142A, 142B can be help by one or both hands of the user. In some embodiments, the first control 142A controls a direction the motor spins (e.g., forward or backward). This can help to control the direction the skate 102 moves when the user is riding in the skate 102. In some embodiments, the first control 142A and/or the second control 142B can be activated and/or otherwise used by the user to operate the skate 102 by, for example, changing a speed of the motor 132 (e.g., faster or slower), changing a direction that the motor 132 spins, activating the power supply 136, instructing the power supply 136 to supply power to the motor 132, and/or turning the motor 132, among other uses. In some embodiments, the motor control 140 is located in the motor 132. In some variants the motor control 140 is located in a rear and/or bottom of the frame 108 of the skate 102.

In some embodiments, the motor control 140 can operate the motor 132 using an algorithm. The algorithm can control the motor and/or can be configured to start and/or stop the motor. In some configurations, the algorithm can control the speed of the motor 132. For example, the algorithm can increase and/or decrease the speed of the motor 132. The algorithm can include a maximum speed that can limit the maximum speed which the motor can be operated. In some embodiments, the motor control 140 can include a limiter. The limiter can include a physical limiter, an electronic limiter, and/or an application that is configured to limit the maximum speed at which the motor 132 can be operated.

In some embodiments, the powered mobility system includes a wireless connection between the motor 132, the power supply 135 and/or the motor control 140. In such configurations the motor control 140 can include a wireless motor control. As discussed above, the motor control 140 can include an actuator and/or a mobile application (e.g., a smartphone app), for example.

The wireless motor control can be toggled by the user to increase or decrease the speed of the motor 132 to increase or decrease the speed of the powered skate 102. When the motor control 140 is toggled by the user, the motor 132 and/or the motor control 140 can be configured to instruct a controller to supply power to the motor 132. In some embodiments, the controller communicates with one or more components wirelessly, such as via wi-fi, Bluetooth®, etc. The controller can control aspects of certain components of the system 100. In some embodiments, the controller can be positioned at various locations on and/or in the powered and/or non-powered skate. For example, the controller can be disposed within a portion of the platform 110, frame 108, and/or motor assembly 130, among other locations. In some embodiments, the motor control 140 can be configured to instruct the controller to supply power to the motor 132 and/or the driving wheel 122.

In some embodiments, the wireless motor control 140 can include a transmitter and a trigger, a mobile application or selection option, or other suitable control(s). Movement of the trigger and/or the amount of movement of the trigger can be detected, such as by a sensor in the motor control 140. This information can be used (e.g., by a processor or in the motor control or on the skate 102) to determine an amount of motive power to be provided by the motor. In some embodiments, the transmitter can transmit a signal corresponding to the amount of trigger movement and a receiver on the vehicle 100 can receive the signal, which can be used to control the motor. In some embodiments, the trigger comprises an accelerator to control motive power provided by the motor. Although a "pistol-grip" style of motor control can be used, some configurations are contemplated as well, such as a button, switch, joystick, toggle, slider, trackball, dial, smartphone application, or otherwise. In some configurations, the motor control is the only element of the system 100 that is controlled with a hand (e.g., during riding). For example, in some implementations, although the motor 132 can be controlled via the motor control 140, the user can control all or some other aspects of the system 100 with his or her feet in a manner described in more detail below. The motor control 140 can allow a user to move both of his or her hands during operation of the vehicle, while still being able to control locomotion of the skate 102. In some embodiments, the motor control 140 can be configured to be held and operated by a single hand. In some variants, the motor control 140 is configured for use with two hands. In some embodiments, the motor control 140 can facilitate user safety, such as by not restraining the user's hands. This can allow the user to readily move his or her hands to catch the user in the case of a fall and/or to perform other actions, such as waving.

In various embodiments, the controller can receive a signal from the motor control 140. For example, the controller can receive a signal indicative of the amount of speed and/or power to apply to the driving wheel 122. The controller can provide two-way or one-way transmission to the motor 132. For example, the controller can instruct the motor to drive the driving wheel 122 in response to and/or consistent with the signal from the motor control 140. While control of the skate 102 can be wireless via the wireless motor control 140, some variants have wired connections to connect the throttle, brake, and on/off switch to the motor, as discussed above. Any wired or wireless protocol may be used.

In some embodiments, the motor 132 can include a digital component. The digital component can allow the motor to turn on and/or off. In such configurations, the motor can be bimodal. In some implementations, the motor 132 can spin at a set motor speed when on. The set speed can be predetermined and/or selected by a user. In some embodiments, the motor can spin at only a single set speed. In such configurations, when the motor 132 is operating, the motor spins at the set speed. When the motor is not operating (e.g., turned off), the motor substantially stops spinning. In some embodiments, the motor 132 operates at less than a 100% duty cycle, such as less than or equal to about: 80%, 90%, 60%, 50%, 40%, or other percentages.

In some embodiments, the motor can spin at a variable motor speed. The variable motor speed can be predetermined and/or selected by a user. In some embodiments, the variable motor speed can include a gradient motor speed that can be varied while the motor is in an operating state. In such configurations, when the motor 132 is in the operating state, the motor speed can increase until the motor speed reaches the set speed. Similarly, when the motor is turned off in such configurations, the motor speed can decrease until the motor 132 is no longer spinning. In some embodiments, the user can change the speed at which the motor spins. For example, the user can change the motor speed by using a physical speed dial, an application, and/or through the algorithm, among other means. Accordingly, the motor speed can vary while the motor 132 is in the operating state.

Figure 1I:
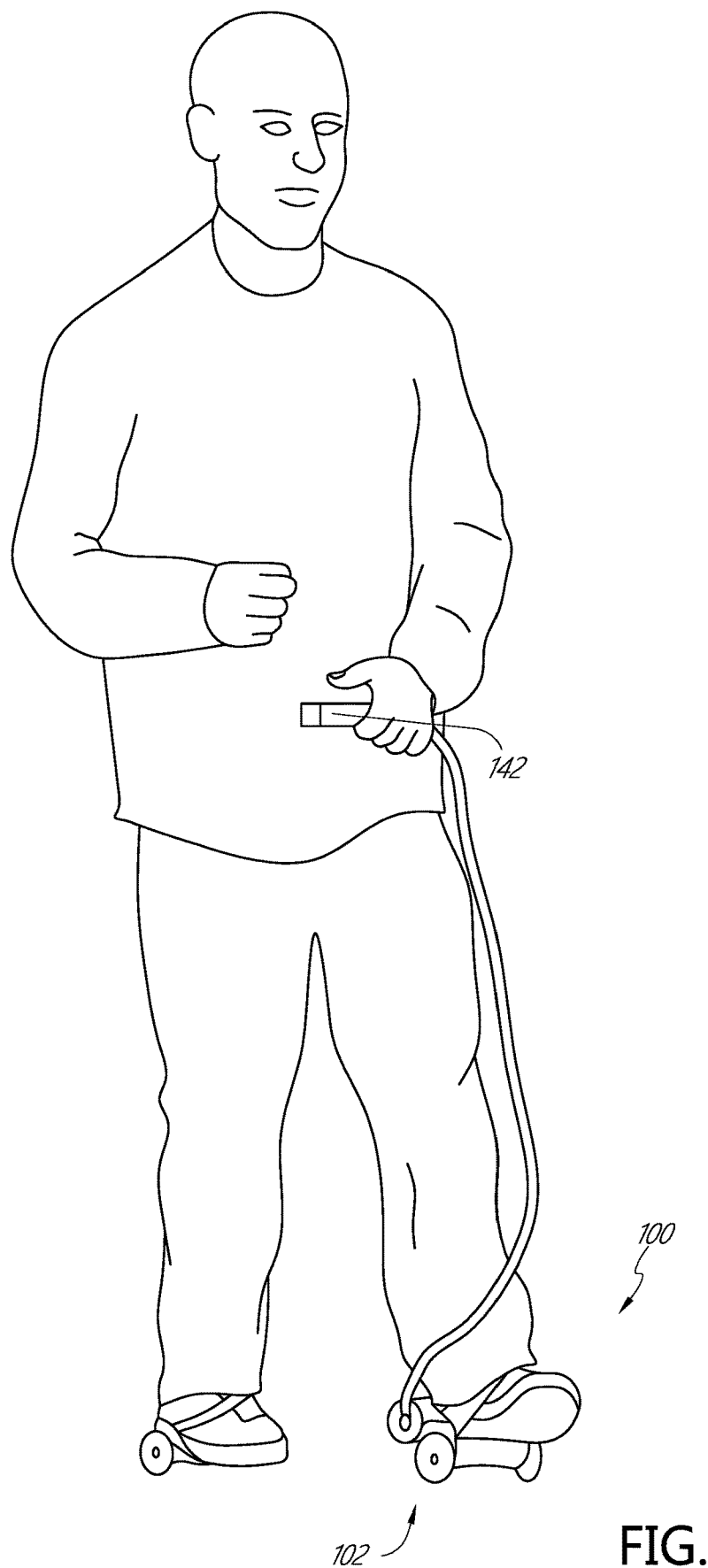
FIGS. 1I-1K illustrate the powered mobility system of FIG. 1A in various stages of use.
Figure 1J:
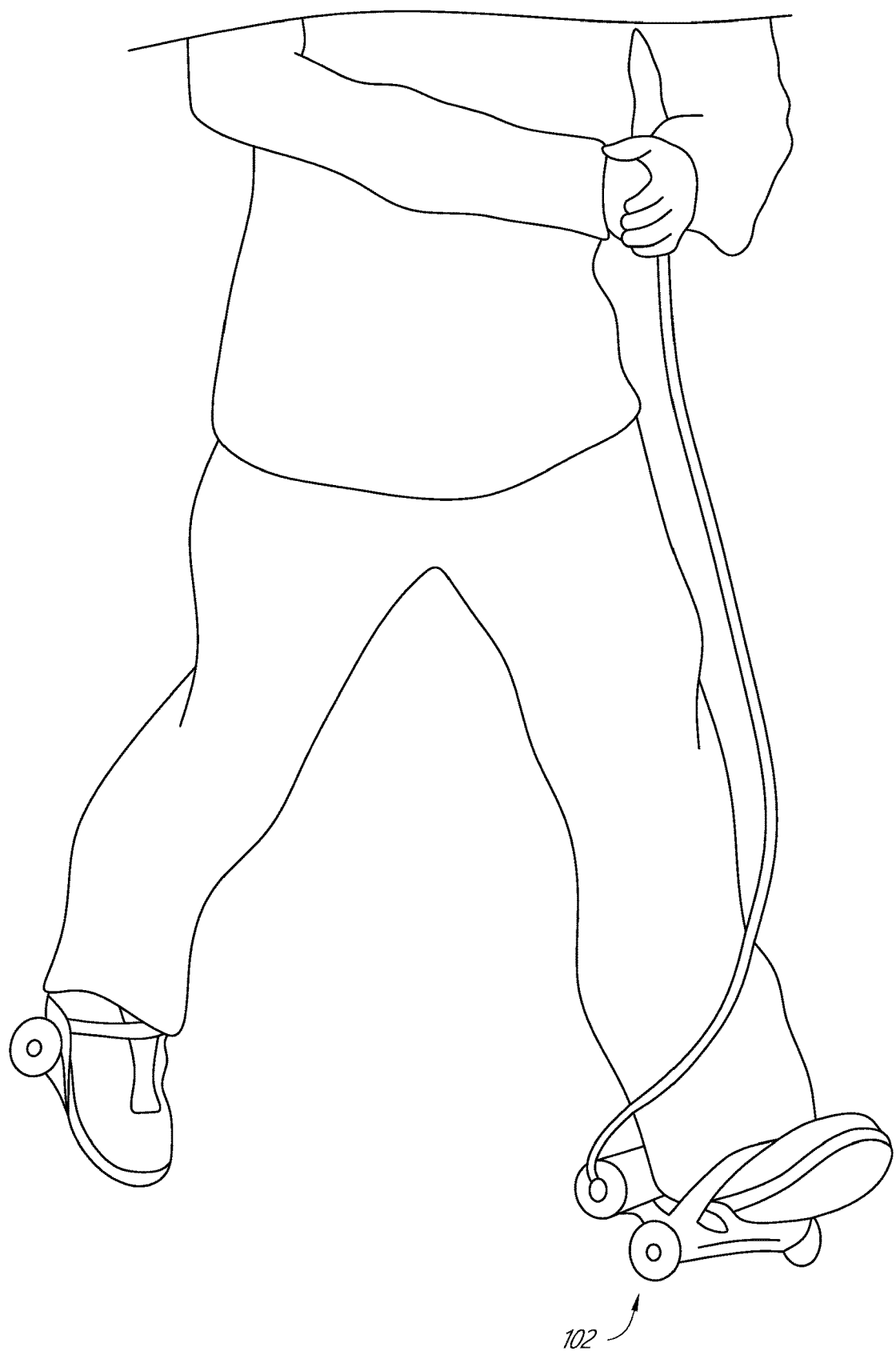
Figure 1K:

FIGS. 1I-1K illustrate a method of wearing the powered skate 102 of the powered mobility system 100. For example, the user can slide and/or snap their foot into place within the platform 110. The user can insert a heel of their foot into the platform 110. To secure the user's foot within the powered skate 102, the user can secure the straps 112 to hold the foot within the powered skate 102. The straps 112 can be adjusted to match the size of the user's foot. The non-powered skate can be the same or similar to the powered skate 102, but without certain propelling features, such as the motor 132 and/or the drive wheel 122. The non-powered skate can have any of the features of the powered skate 102.

FIGS. 1I-1K show a method of starting and/or stopping the motor 132 and/or overall powered mobility system. In the illustrated embodiments, the user can start by pushing off on the user's foot secured within the non-powered skate (see FIG. 1I). In some embodiments, the user may start the powered mobility system without moving relative to the surrounding environment. The user can lift the toe end 110A of the powered skate 102. In some implementations, the user leans on the heel end 110B of the powered skate 102. (see FIG. 1J). The motor can drive the drive wheel 122, thereby propelling the skate and the user. The motor can be controlled and/or operated by the user and/or through the algorithm, as discussed above. As shown, the user can lean on the non-powered skate and lift the toe end 110A of the non-powered skate. The user can lean on the heel end of the powered skate 102 and/or non-powered skate while the powered mobility system is operated by the user. (see FIG. 1K).

To stop, the user may signal to the motor 132 via the controller to reduce or stop driving the driving wheel 122 and/or may contact the ground with the toe of one or more of their feet. In some variants, the user stops by raising the heel of the foot with the powered skate 102 or otherwise separating the driving wheel 122 from the ground.

FIG. 2

Figure 2:
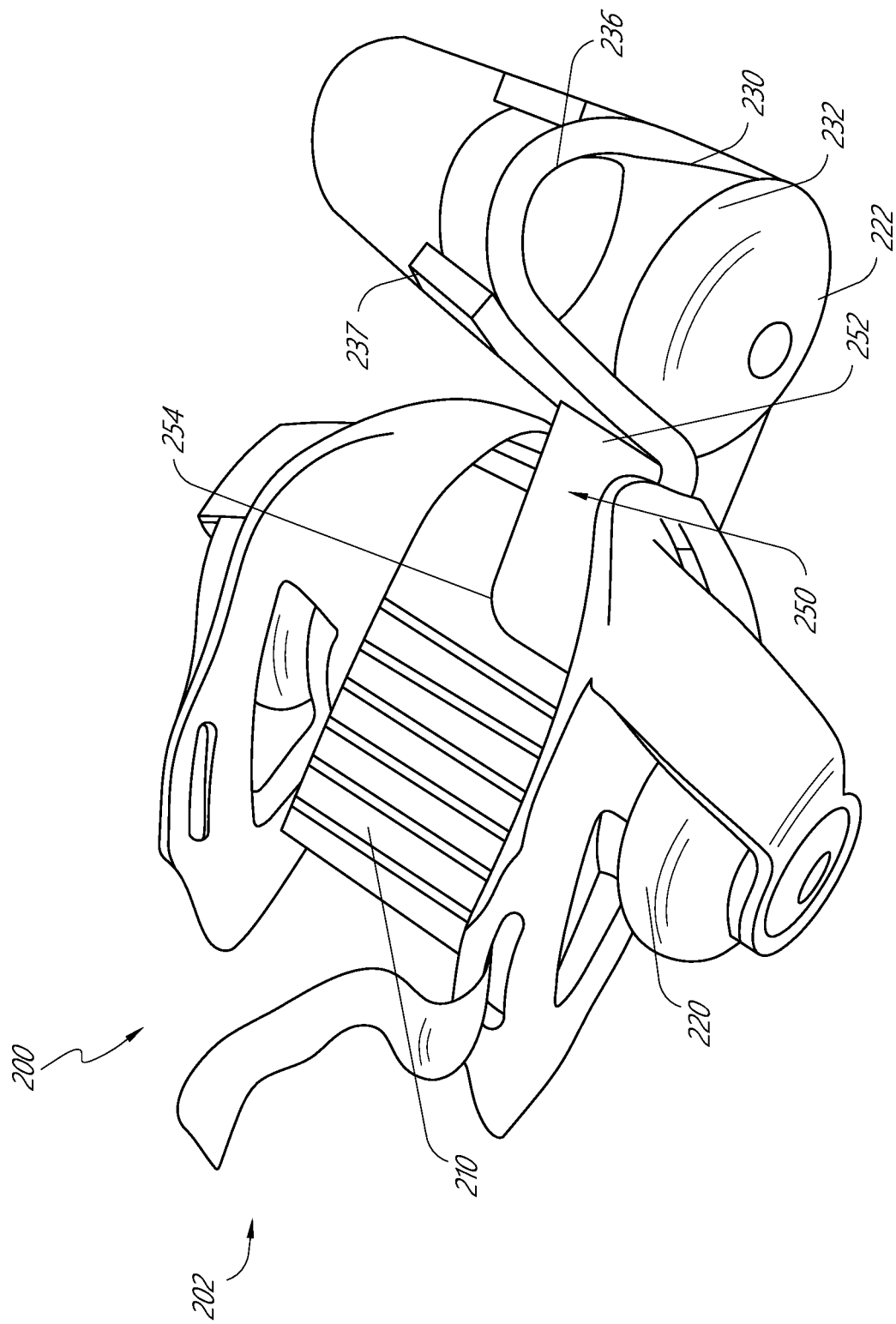
FIG. 2 illustrates another embodiment of a powered mobility system.

FIG. 2 illustrates another embodiment of a powered skate 202. The powered skate 202 is similar or identical to the powered skate 102 discussed above in many respects. Accordingly, numerals used to identify features of the powered skate 202 are incremented by a factor of one hundred to identify certain similar features of the powered skate 102. For example, as shown in FIG. 2, the powered skate 202 can include a platform 210, a plurality of wheels 220, and a motor assembly 230, which can be respectively similar to the platform 110, the plurality of wheels 120, and the motor assembly 130 described above in connection with the powered skate 102. The powered skate 202 can include any one, or any combination, of the features of the powered skate 102.

In the illustrated configuration, a power supply 236, such as a battery is disposed above (e.g., directly above) the motor assembly 230. The battery 236 can be disposed at one end of a swing arm assembly 250. The swing arm assembly 250 can include a swing arm 252 and a swing arm attachment 254. The swing arm 252 can extend outwardly and rearwardly from the platform 210. The swing arm 252 can be attached to the platform 210 by the swing arm attachment 254. In various embodiments, the swing arm 252 can rotate relative to the platform 210. For example, the swing arm attachment 254 can include an axle, pivot pin, hinge, and/or other mechanism to enable the swing arm 252 to pivot relative to the platform 210.

The battery 236 can be disposed at an end of the swing arm 252. The battery 236 can be stored in a battery storage compartment 237. In some embodiments, the battery 236 can be snapped into place. For example, in the illustrated embodiment, the battery 236 is snapped into a battery clip at the end of the swing arm 252 that can securely store the battery.

In certain implementations, the skate 202 operates in response to a body position of the user. For example, in some embodiments, the user can engage the motor assembly 230 by leaning on the heel end of the powered skate 202 (e.g., by raising their toes). When the user leans on the heel end of the powered skate 202, the front of the powered skate (e.g., by the platform 210) can pivot upward. The swing arm 252 can remain engaged with the ground because of the relative movement allowed by the swing arm attachment 254. In various embodiments, the swing arm 252 thus moves relative to the platform 210. In some implementations, the movement of the swing arm 252 actuates a switch or other actuation feature. The actuation feature can signal for the skate to begin operating (e.g., driving the wheel 222). In some embodiments, the actuation feature causes a signal to be sent to the controller and/or the motor 232. In some variations, pivoting of the swing arm causes the battery 236 to engage with the motor assembly 230. When the battery 236 engages with the motor assembly, the motor can spin a bushing (not shown). The bushing can rotate the driving wheel 222, as described above. Accordingly, the motor 232 can be activated by leaning on the heel end of the powered skate 202. In some embodiments, the motor 232 is activated when the platform is rotated by at least 5°, such as 10° or more, relative to the swing arm 252 and/or the ground.

In some embodiments, the rotation of the wheel 222 and/or motor 232 is a function of another portion of the powered skate 202 and/or the body position of the user. For example, as the user presses on the heel end of the powered skate 202 (e.g., thereby changing the position of the swing arm 252), the motor 232 spins faster. The speed of the motor 232 and/or overall speed of the powered skate 202 can depend on a pressure exerted on the heel end of the powered skate 202 by the user.

In some embodiments, the system includes a pressure sensor, such as in the platform of the powered skate 202. The pressure sensor can be used instead of and/or in combination with the swing arm attachment 254. A signal from the pressure sensor can be used to control how much power is supplied to the driving wheel 222 from the battery 236. In some embodiments, signals from the pressure sensor can be used (e.g., by a controller) to detect shifts of the user. For example, the signals can indicate how far a user is pushing and/or leaning forward backward, and/or sideways on various portions of the powered skate 202. In some embodiments, depending on the portion of the powered skate 202 on which the user is pushing, the controller can adjust the motor speed of the motor 232. This can, for example, allow some embodiments to aid the user in balancing, can compensate for weight shifts by the user, or otherwise aid in safely riding the skate.

FIGS. 3A-3B

Figure 3A:
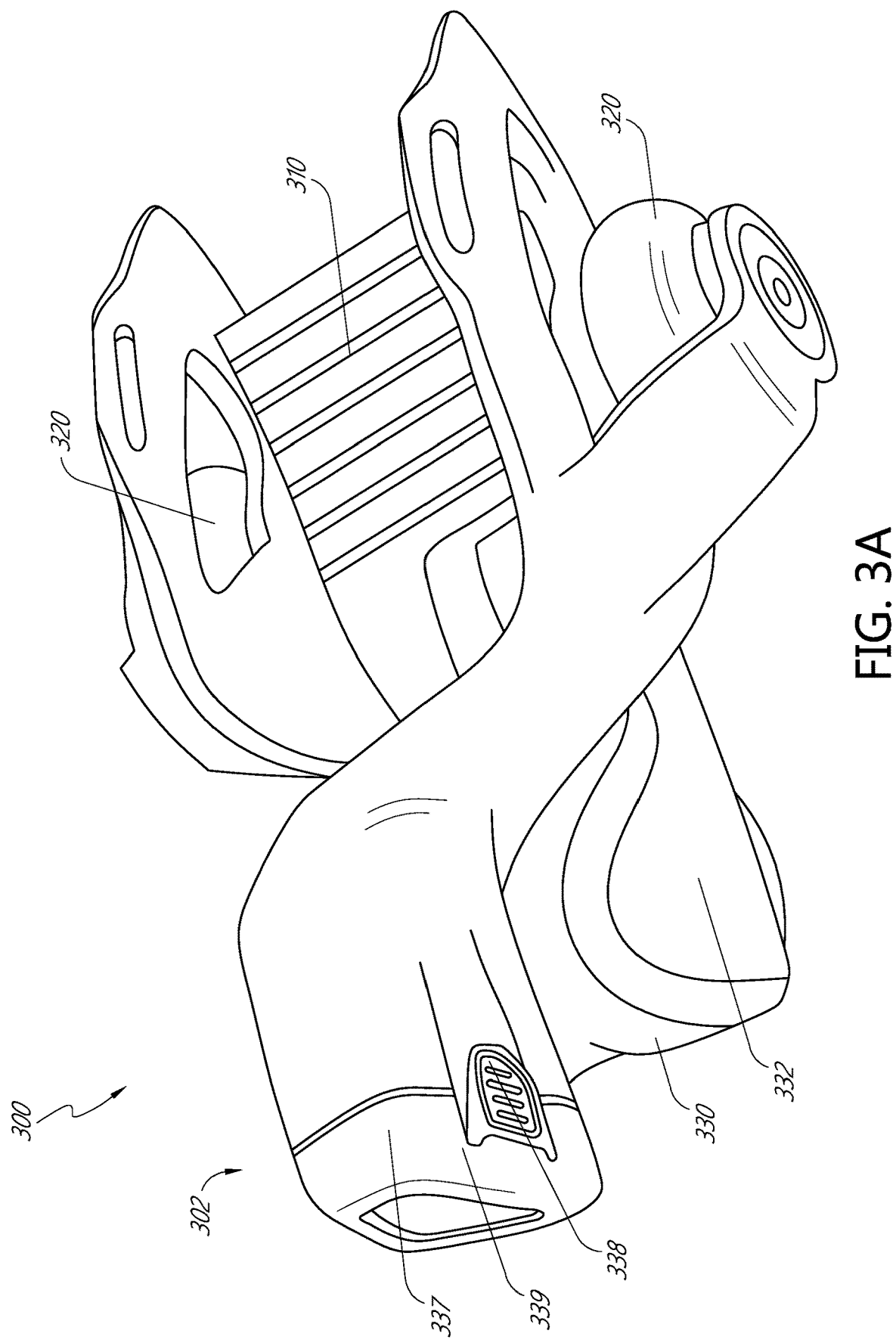
FIG. 3A illustrates another embodiment of a powered mobility system.
Figure 3B:
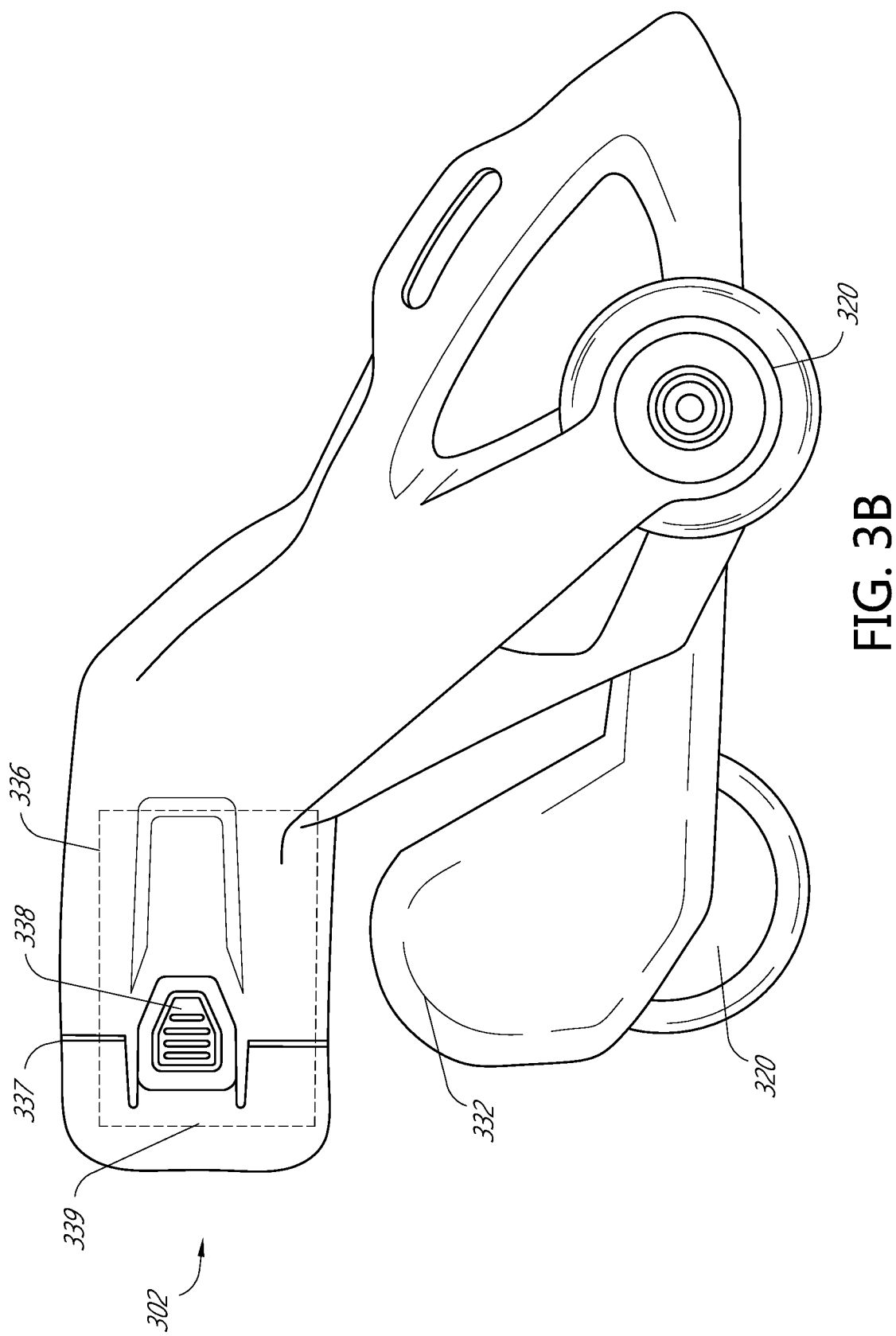
FIG. 3B illustrates a side view of the powered mobility system of FIG. 3A.

FIGS. 3A-3B illustrate another embodiment of a powered skate 302. The powered skate 302 is similar or identical to the powered skate 102 and/or 202 discussed above in many respects. As shown in FIGS. 3A-3B, the powered skate 302 can include a platform 310, a plurality of wheels 320, and a motor assembly 330, which can be respectively similar to the platform, the plurality of wheels, and the motor assembly described above in connection with the powered skate 102 and/or 202. The powered skate 302 can include any one, or any combination, of the features of the powered mobility systems 100 and/or 200.

In the illustrated configuration, a power supply 336, such as a battery is disposed above (e.g., directly above) the motor assembly 330. The battery 336 can be stored in a battery storage compartment 337. The battery storage compartment 337 can include several configurations. For example, the battery storage compartment 337 can include a locking mechanism 338, such as a latch or clip, and a cover 339. In the illustrated configuration, the battery storage compartment 337 generally faces rearwardly and extends horizontally outwards from the powered skate 302 beyond the motor assembly. The cover 339 can face rearwardly and the locking mechanism can be disposed on one side of the battery storage compartment 337.

FIGS. 4A-4B

Figure 4A:
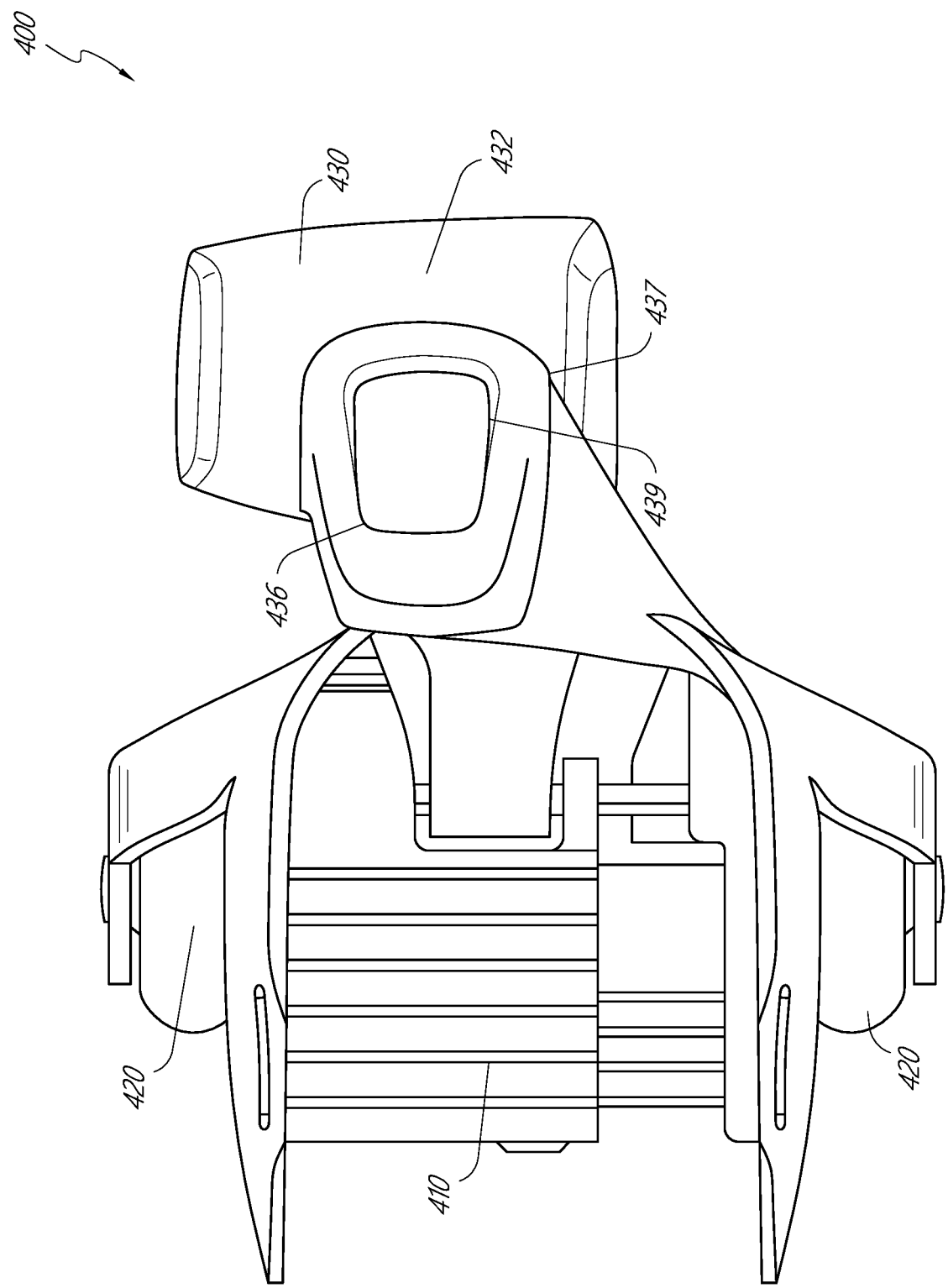
FIG. 4A illustrates another embodiment of a powered mobility system.
Figure 4B:
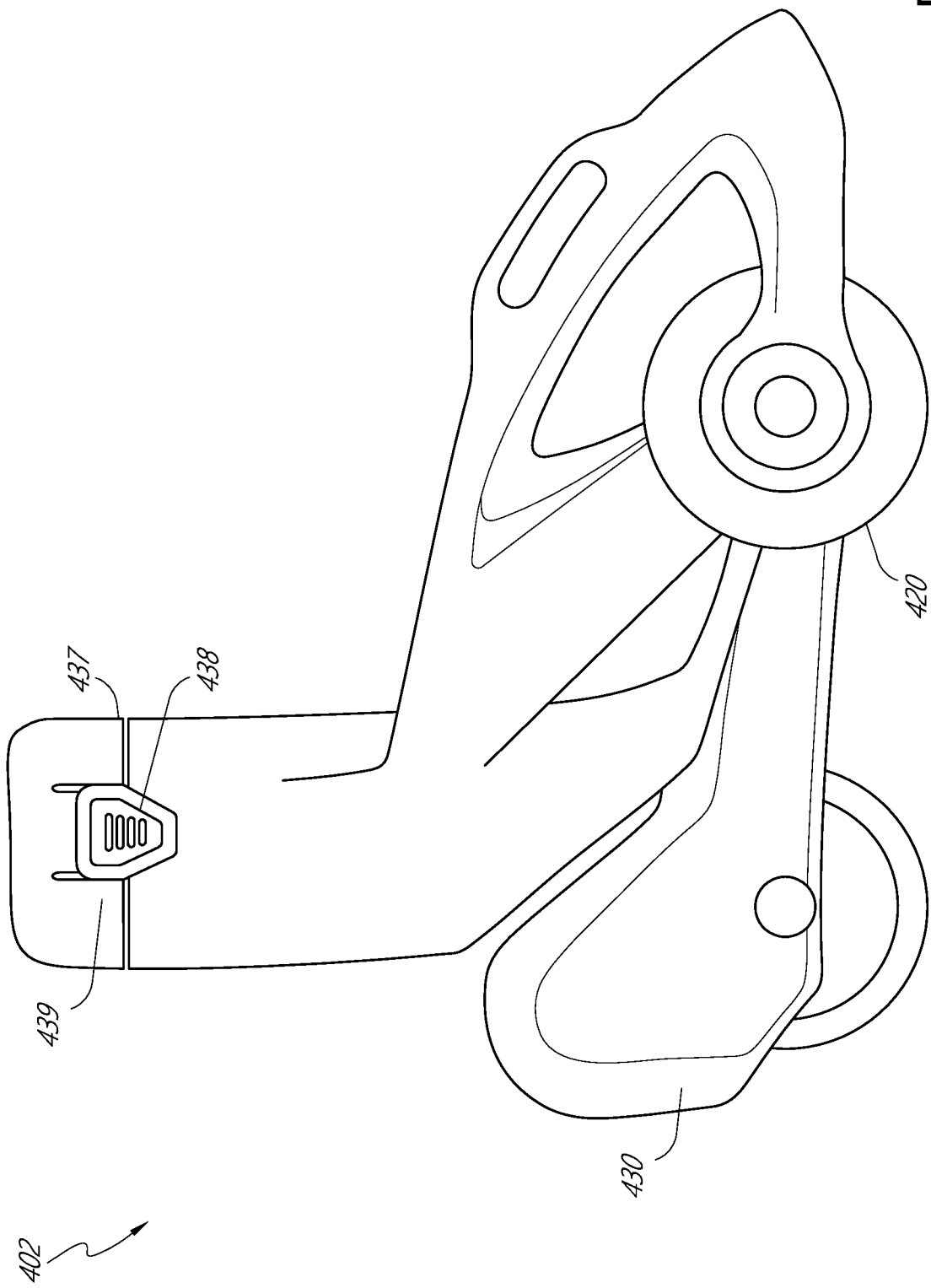
FIG. 4B illustrates a side view of the powered mobility system of FIG. 4A.

FIGS. 4A-4B illustrate another embodiment of a powered skate 402. The powered skate 402 is similar or identical to the powered skate 102, 202, and/or 302 discussed above in many respects. As shown in FIGS. 4A-4B, the powered skate 402 can include a platform 410, a plurality of wheels 420, and a motor assembly 430, which can be respectively similar to the platform, the plurality of wheels, and the motor assembly described above in connection with the powered skates 102, 202, and/or 302. The powered skate 402 can include any one, or any combination, of the features of the powered mobility systems 100, 200, and/or 300.

In the illustrated configuration, a power supply 436, such as a battery is disposed directly above a motor assembly 430. The battery 436 can be stored in a battery storage compartment 437. The battery storage compartment 437 can include a locking mechanism 438, such as a latch or clip, and a cover 439. In the illustrated configuration, the battery storage compartment 437 generally faces upwardly and extends upwardly from the powered skate 302. In some embodiments, the battery storage compartment 437 does not extend rearwardly beyond the motor assembly 430. In some embodiments, the battery storage compartment 437 can extend vertically generally perpendicular to the device and/or at an angle upwardly and outwardly away from the powered skate. The cover 439 can face upwardly. The locking mechanism 438 can be disposed on one side of the battery storage compartment 437 and/or in a generally vertical configuration, for example.

FIGS. 5A-5B

Figure 5A:
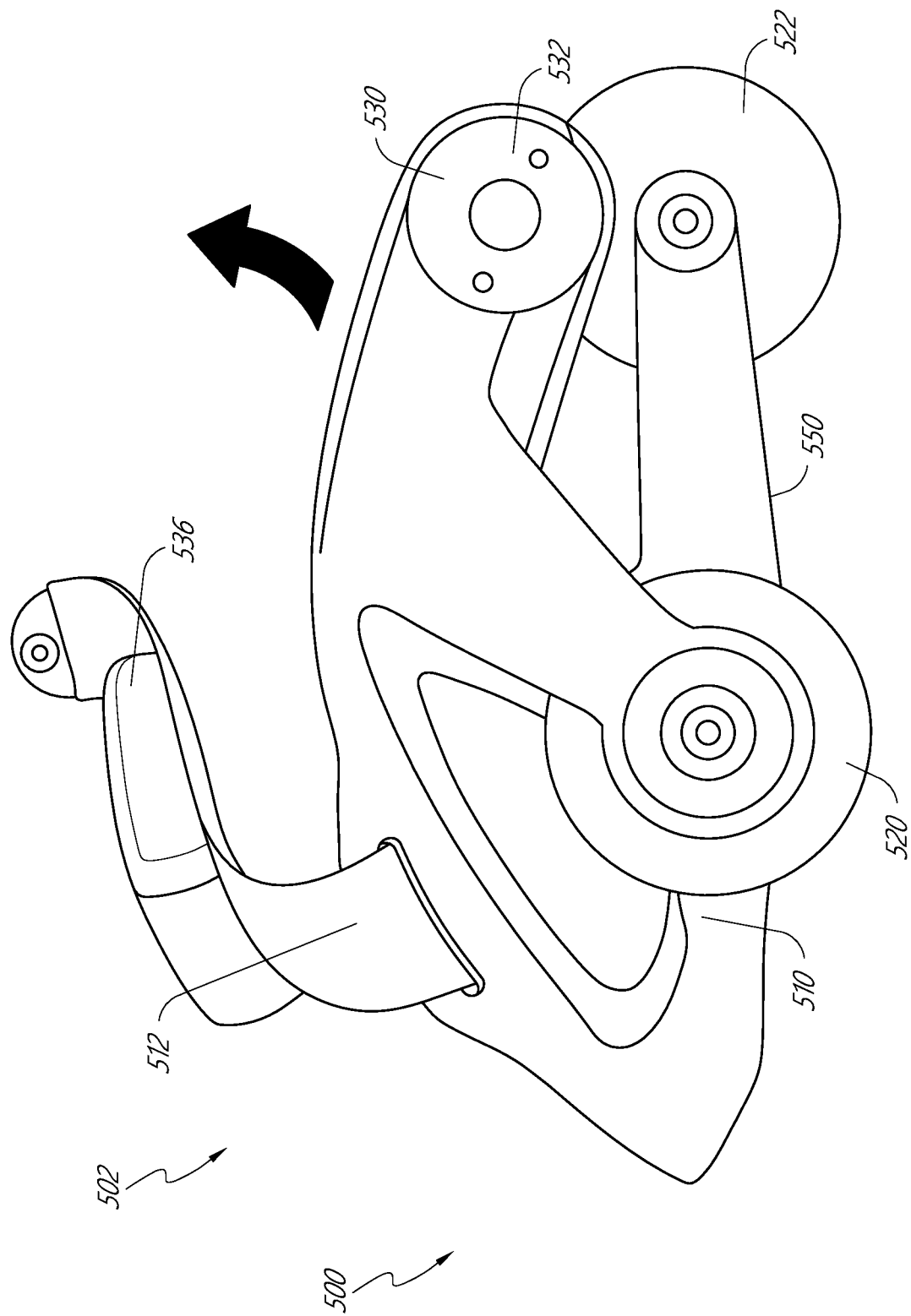
FIG. 5A illustrates a side view of another embodiment of a powered mobility system.
Figure 5B:
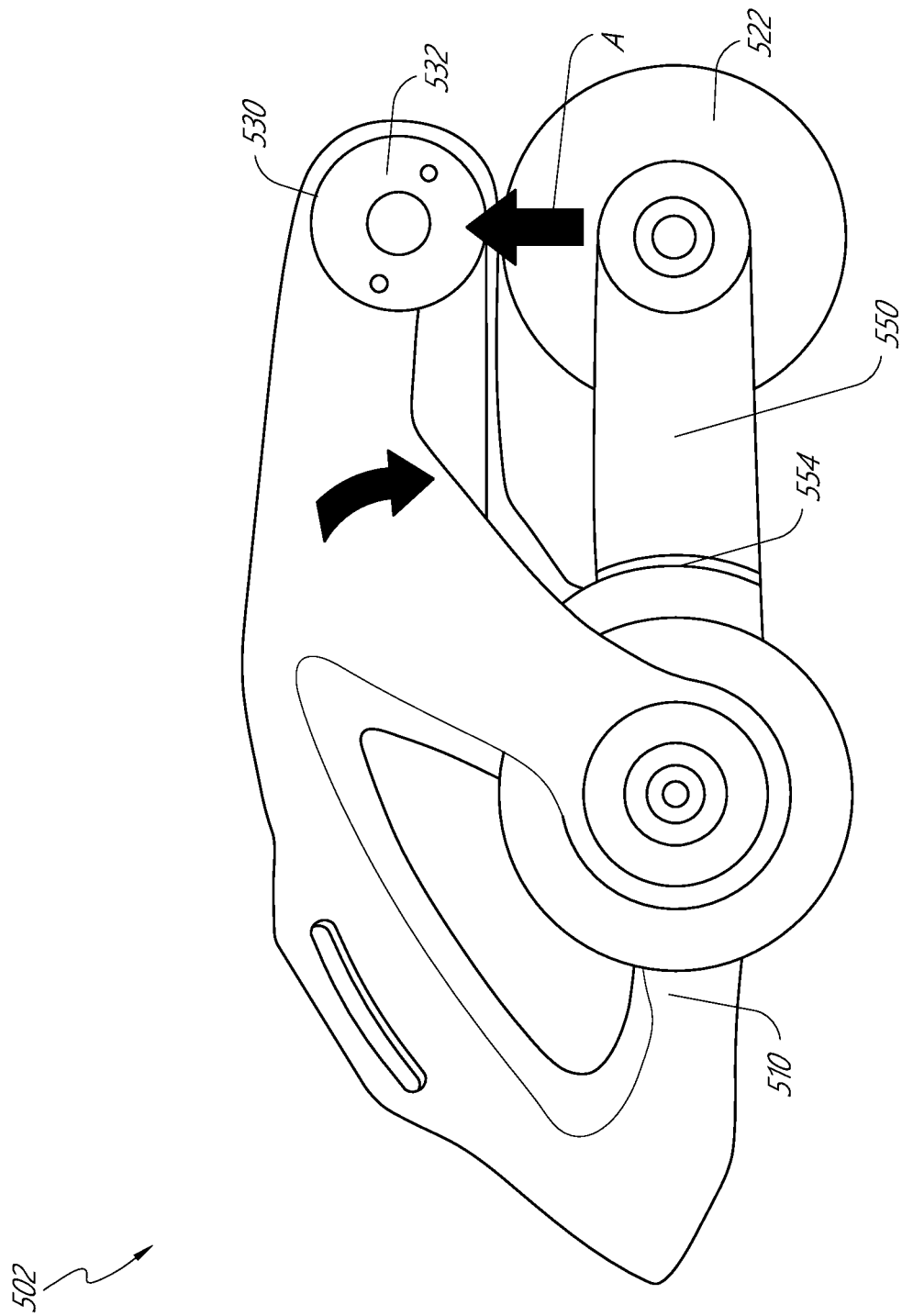
FIG. 5B illustrates another side view of the powered mobility system of FIG. 5A.

FIGS. 5A-5B illustrate another embodiment of a powered skate 502. The powered skate 502 is similar or identical to the powered skates discussed above in many respects. As shown in FIGS. 5A-5B, the powered skate 502 can include a platform 510, a plurality of wheels 520, and a motor assembly 530, which can be respectively similar to the platform, the plurality of wheels, and the motor assembly described above in connection with the powered skate 102, 202, 302, 402. The powered skate 502 can include any one, or any combination, of the features of the powered mobility system 100, 200, 300, 400.

As shown, the skate 502 can have a power supply 532, such as a battery that can be attached to a strap 512. The battery 536 can be connected to a motor 532 or other electronics (e.g., controls).

The skate 502 can include several motor assembly configurations. For example, the motor 532 of the motor assembly 530 can be disposed on and/or above a swing arm assembly 550. The motor 532 can extend outwardly (e.g., laterally) from the platform 510.

In some embodiments, the skate 502 is activated in response to the user pivoting the skate 502 relative to the ground. For example, in some embodiments, the user can engage the motor 532 by leaning on the heel end of the powered skate 502. When the user leans on the heel end of the powered skate 502, the powered skate can pivot about an axis of rotation of one of the wheels 520 and/or a swing arm attachment 554. This can engage the motor assembly 530 to drive the skate 502. In some embodiments, pivoting of the skate forces the motor assembly 530 to engage with a rear driving wheel 522. When the motor 532 engages with the rear driving wheel 522, a bushing of the motor assembly 530 can rotate the rear driving wheel 522.

In some embodiments, as the user presses harder on the heel end of the powered skate 502, the motor 532 spins faster. Thus, the motor speed of the motor 532 and/or overall speed of the powered skate 502 can depend on a pressure exerted on the heel end of the powered skate 502 by the user. In some embodiments, the speed of the motor is a function of the position of the swing arm. For example, as the swing arm is moving upward (in the direction of the arrow A), the motor can increase in speed. In some variants, the relationship between swing arm position and motor speed is proportional (e.g., linear). In some variants, the relationship is non-linear.

FIGS. 6A-6C

Figure 6A:
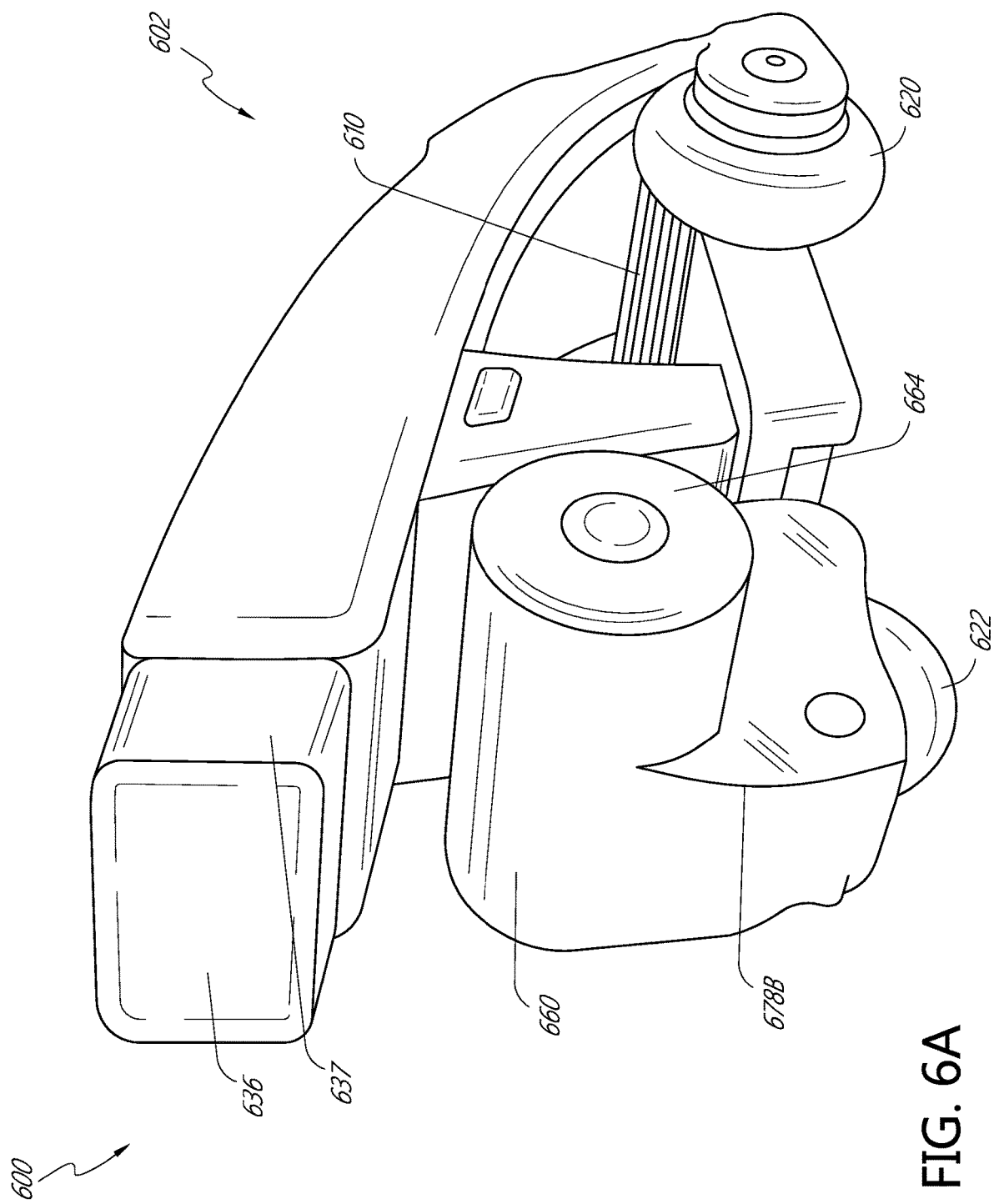
FIG. 6A illustrates a rear perspective view of another embodiment of a powered mobility system.
Figure 6B:
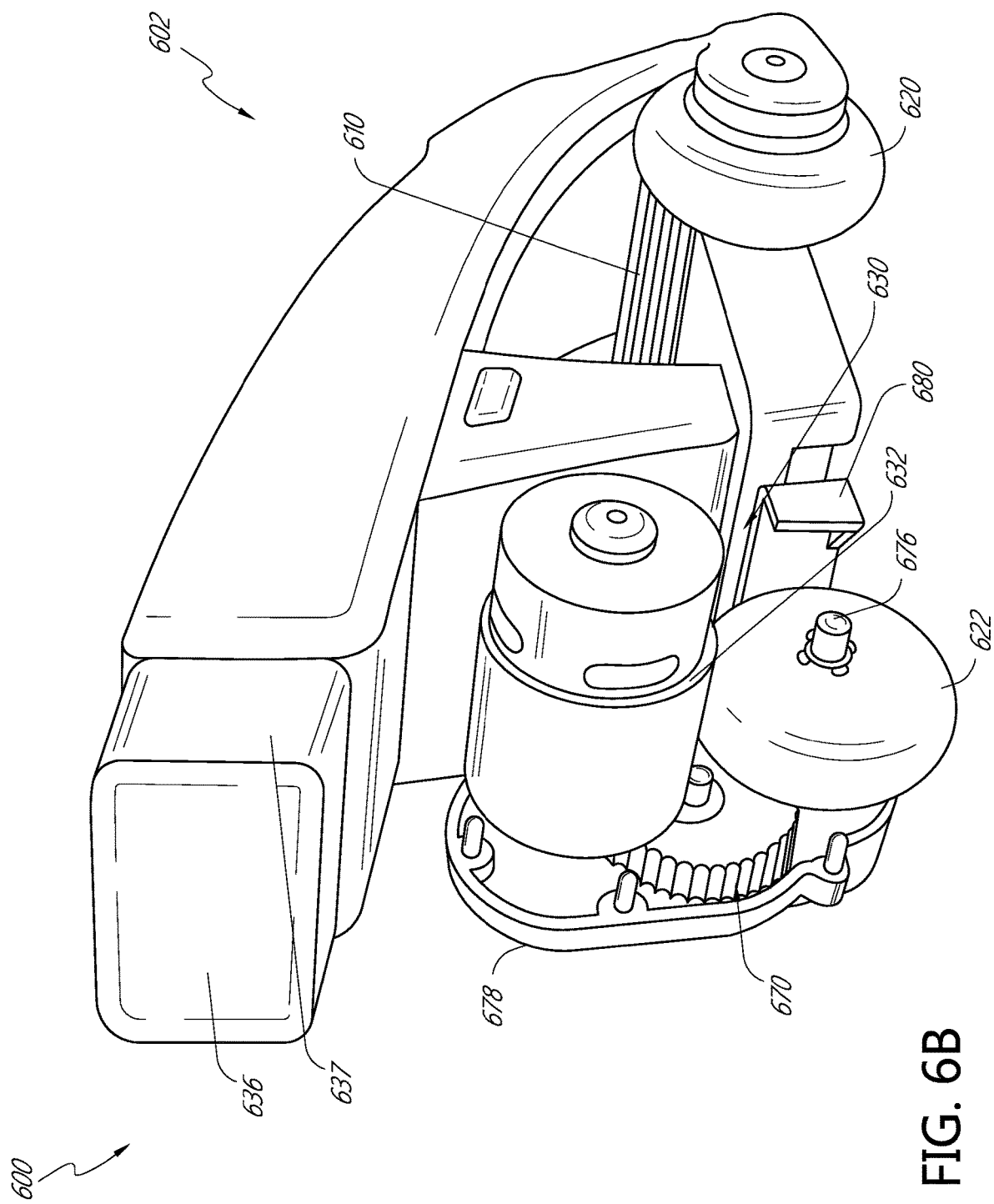
FIG. 6B illustrates a rear perspective view of the powered mobility system of FIG. 6A with certain housings not shown for purposes of presentation.
Figure 6C:
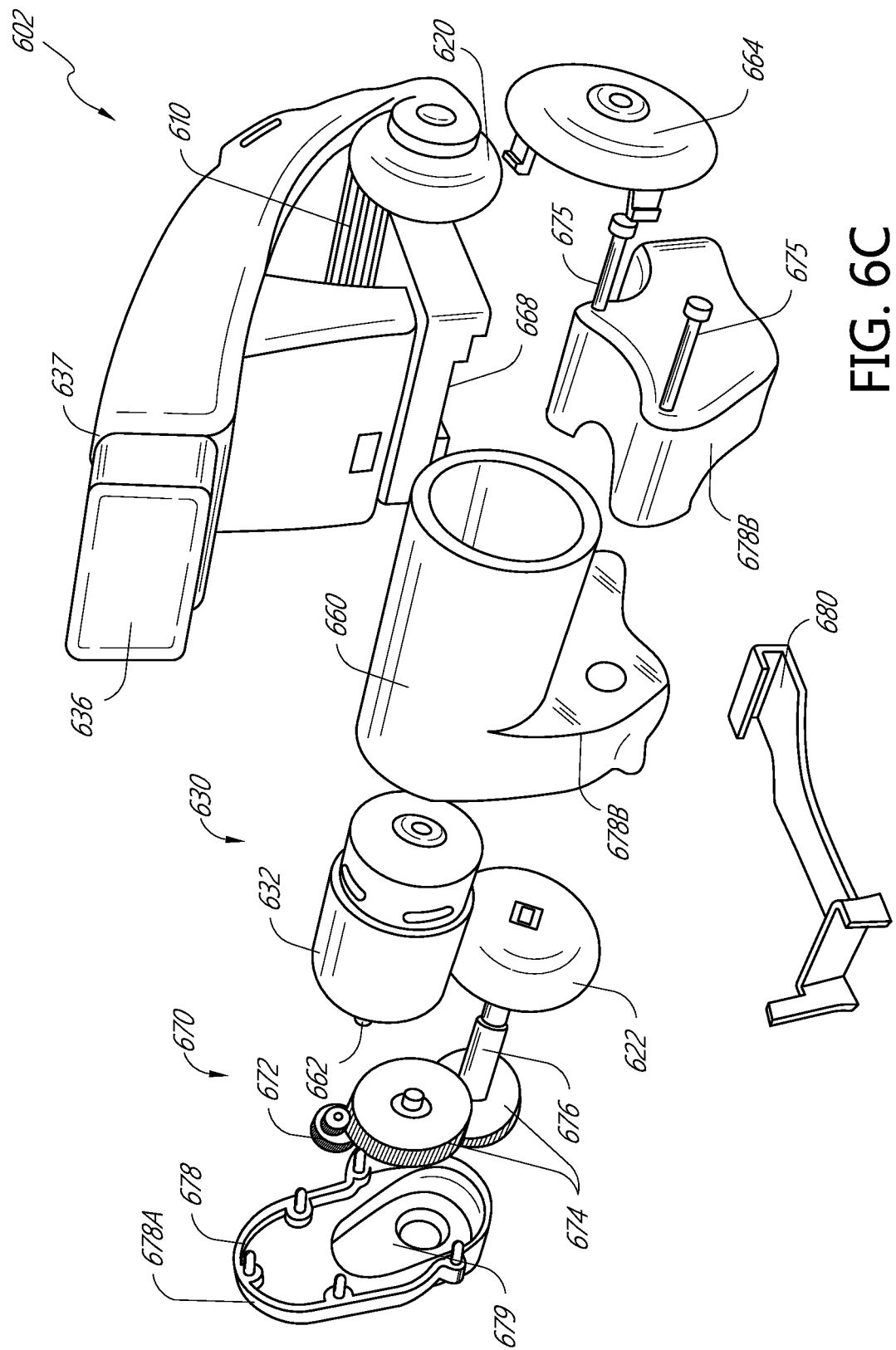
FIG. 6C illustrates an exploded view of the powered mobility system of FIG. 6A.

FIGS. 6A-6C illustrate another embodiment of a powered skate 602. The powered skate 602 is similar or identical to the powered skates discussed above in many respects. As shown in FIGS. 6A-6C, the powered skate 602 can include a platform 610, a plurality of wheels 620 including a driving wheel 622, and a motor assembly 630, which can be respectively similar to the platform, the plurality of wheels, and the motor assembly described above in connection with the powered skate 102, 202, 302, 402, 502. The powered skate 602 can include any one, or any combination, of the features of the powered mobility systems 102, 202, 302, 402, 502. As shown in FIG. 6A, the skate 602 can include a motor housing 660 and a transmission assembly housing 678. For purposes of presentation, the housing 660 and a portion of the transmission assembly housing are not shown in FIG. 6B.

In the illustrated configuration, a power supply 636, such as a battery, is disposed above (e.g., directly above) at least a portion of the motor assembly 630. The battery 636 can be stored in a battery storage compartment 637. In the illustrated configuration, the battery storage compartment 637 generally faces rearwardly and extends horizontally outwards from the powered skate 602. In some embodiments, the compartment 637 extends beyond (e.g., rearwardly beyond) the motor assembly.

In some embodiments, the motor assembly 630 can include a motor 632 and a drive shaft 662. As shown, the drive shaft 662 can extend outwardly from a side of the motor 632. The drive shaft 662 can be coupled to a transmission assembly 670. The transmission assembly 670 can include a gear transmission configured to transmit power from the motor 632 to the drive wheel 622. In some embodiments, the transmission assembly 670 can include a plurality of gears. The plurality of gears can include a driving gear 672 and at least one driven gear 674. Preferably, the plurality of gears can include at least two driven gears 674. In some embodiments, the plurality of gears can include one, two, three, four, five, six, seven, and/or eight or more driven gears. The plurality of gears can include various types of gear arrangements. For example, the plurality of gears can include spur gears, double spur gears and/or worm gears, among other gear arrangements. In certain implementations, the transmission assembly 670 comprises and/or acts as a gear reduction. This can allow the motor to drive the driving wheel 622 at a slower speed than the speed of the motor 632. Accordingly, as discussed above, the drive shaft 662 can engage with the driving gear 672 while the motor 632 is operated.

The plurality of gears can be at least partially surrounded by and/or enclosed within the transmission assembly housing 678. The transmission assembly housing 678 can include a recess and/or a slot 679 to receive the transmission assembly 670. In some embodiments, the transmission assembly housing 678 can include a first housing portion 678A and a second housing portion 678B. In some embodiments, the first housing portion 678 includes the recess and/or a slot 679 to receive the transmission assembly 670. The second housing portion 678B can connect to the first transmission assembly portion 678A to enclose the transmission assembly 670. For example, the fasteners 695 (e.g., screws) can connect the housing portions 678A, 678B, The transmission assembly housing 678 can protect the transmission assembly from dirt, rocks, and/or other potentially harmful substances that can disrupt the transmission assembly during operation.

As shown in FIG. 6C, the drive shaft 662 can be engaged with and/or in axial alignment with the driving gear 672. In some embodiments, the motor 632 can spin the drive shaft 662. In some embodiments, this causes the driving gear 672 to spin at about the same speed as the drive shaft 662. Through the gear reduction, the driving gear 672 can cause at least one driven gear 674 to rotate a driving wheel shaft 676, which in turn causes the driving wheel 622 to spin. In various embodiments, the driving gear 672 is offset from the motor 632 and the diameter of the driving gear 672 can be smaller than the driven gears 674 of the transmission assembly 670. In some variants, the motor 632 can drive the driving wheel 622 at higher speeds and/or using less power (e.g., compared to an embodiment without gear reduction). In some implementations, the driving gear 672, having a smaller diameter than at least one of the driven gears 674, causes the driving wheel 622 to rotate slower than the driving gear 672 and/or the drive shaft 662 of the motor assembly 630. The transmission of power from the motor assembly 630 to the driving wheel 622 can convert higher motor speeds to a slower driving wheel speed and/or can increase torque. The increase in torque applied by the motor 630 can allow the driving wheel 622 to be driven more efficiently, to facilitate gripping the ground, etc. In some embodiments, the ratio of the outside diameter of the driving gear 672 (e.g., a gear connected to the drive shaft 662) to the diameter of at least one of the driven gears 674 (e.g., a gear connected to the driving wheel shaft 676) is at least about: 4.0, 4.5, 5.0, 5.5, 6.0, 6.5, 7.0, 7.5, 8.0, ratios between the aforementioned ratios, or other ratios.

As mentioned above, the motor assembly 630 can include a motor housing 660. The motor housing 660 can surround at least a portion of the motor 632 (e.g., radially). The housing 660 can be positioned above at least a portion of the driving wheel 622. For example, the motor 632 can slide into and/or be secured within the motor housing 660. In some embodiments, the motor housing 660 includes a cap 664 that can connect to the motor housing 660 to enclose the motor 630. The cap 664 can be connected to the motor housing 660 by a snap-fit, screw-fit, and/or a press-fit arrangement.

In some embodiments, the motor housing 660 can connect to the platform 610. For example, the motor housing 660 can connect to a slot 668 formed within a rear side of the platform 610. In some embodiments, the powered skate 602 includes a motor assembly connector 680 to connect the motor assembly and/or the transmission assembly to the platform 610. In some embodiments, the connector 680 comprises a shield (e.g., a plate), which can be configured to protect at least a portion of a bottom of the platform 610 and/or the motor assembly 630. As shown, in some variants, the connector 680 is received in a channel in the platform 610. In some embodiments, the connector 680 can be integrally formed with the platform 610 and/or the motor assembly 630. In some embodiments, the connector 680 is fastened to the platform 610 and/or the motor housing 660 by a mechanical fastener, such as a screw. In some embodiments, the connector 680 is coupled with the platform 610 by a snap-fit, press-fit, or other arrangement.

In some embodiments, the connector 680 acts as a swing arm (as described above) that can support the motor assembly 630 and/or the rear driving wheel 622 rearwardly and outwardly from the platform 610. In some embodiments, the connector 680 comprises a resilient member, such as the plate. The connector 680 can have a free end (e.g., a free rear end). In some embodiments, the connector 680 slidably receives a spring arrangement of the housing 660. The spring arrangement can provide flexible support to the connector 680. The spring arrangement can allow the connector 680 to flex while the user is using the skate 602. In some embodiments, the connector 680 can allow the motor assembly 630 and/or driving wheel 622 to move with respect to the platform 610 and/or the platform 610 to move relative to the motor assembly 630 and/or driving wheel 622.

In some embodiments, the connector 680 acts as a shock absorber. This can help to provide a smoother experience to the user. The connector 680 can help to account for bumps or non-flat riding surfaces. The connector 680 can flex as the skate 602 rolls over the bumps or non-flat riding surfaces to aid in maintaining contact between the driving wheel 622 and the riding surface. In some embodiments, the connector 680 can help to reduce and/or absorb shock impulses from the riding surface as the skate contacts the riding surface. The connector 680 can help to maintain contact between the driving wheel 622 and the ground when the user is using the skate 602. In some embodiments, the connector 680 can aid in maintaining contact between the driving wheel 622 and the riding surface when the user lands after performing tricks and/or jumps, which cause the driving wheel 622 to temporarily disengage from the riding surface. In some embodiments, the connector 680 is biased. For example, in some embodiments, the connector 680 can be biased in a direction towards the surface that the skate 602 is riding over. This can help to maintain contact between the driving wheel 622 and the surface when the user is using the skate 622. In some embodiments, the contact between the driving wheel 622 and the surface can cause the motor 632 to continue to spin.

FIGS. 7A-7N

Figure 7B:
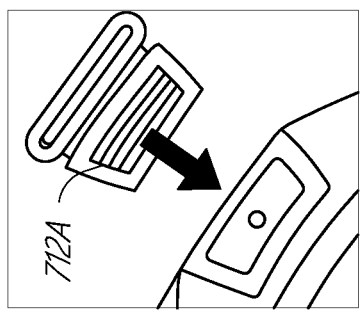
FIG. 7B illustrates a close-up view of a buckle of the powered mobility system of FIG. 7A.
Figure 7A:
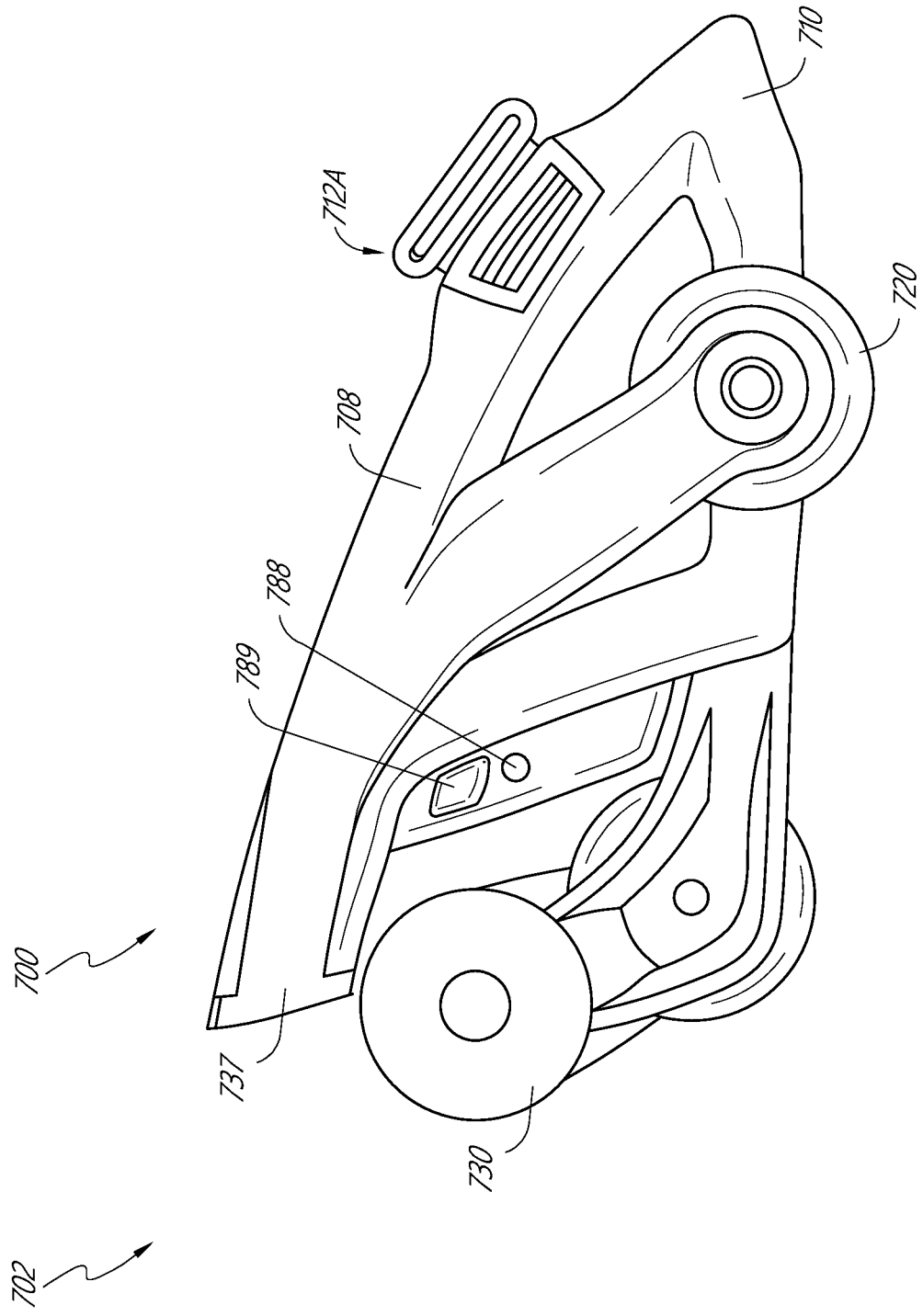
FIG. 7A illustrates a side view of another embodiment of a powered mobility system.
Figure 7C:
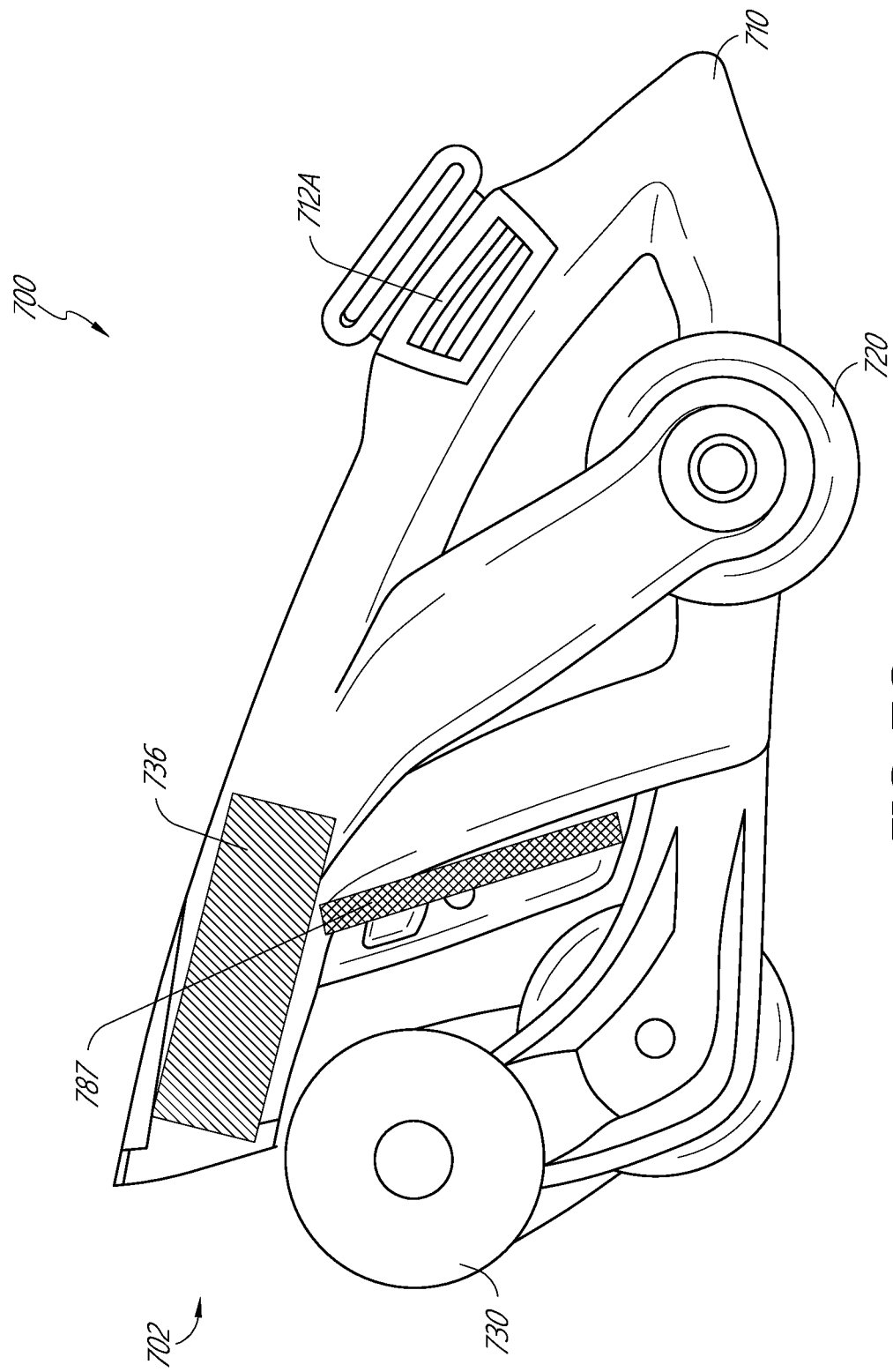
FIG. 7C illustrates another side view of the powered mobility system of FIG. 7A showing example locations of a battery and a controller.
Figure 7D:
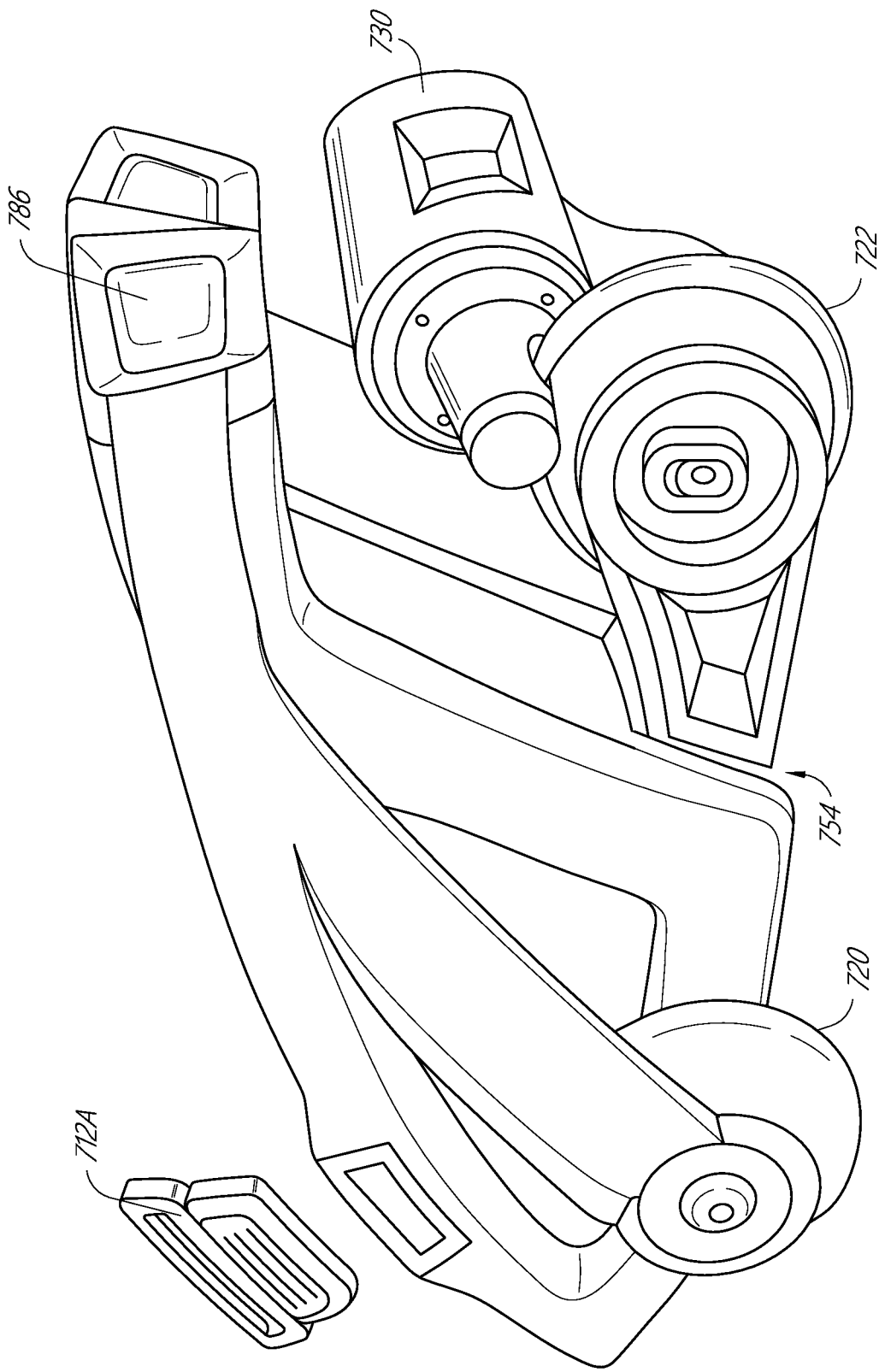
FIG. 7D illustrates a rear perspective view of the powered mobility system of FIG. 7A.
Figure 7E:
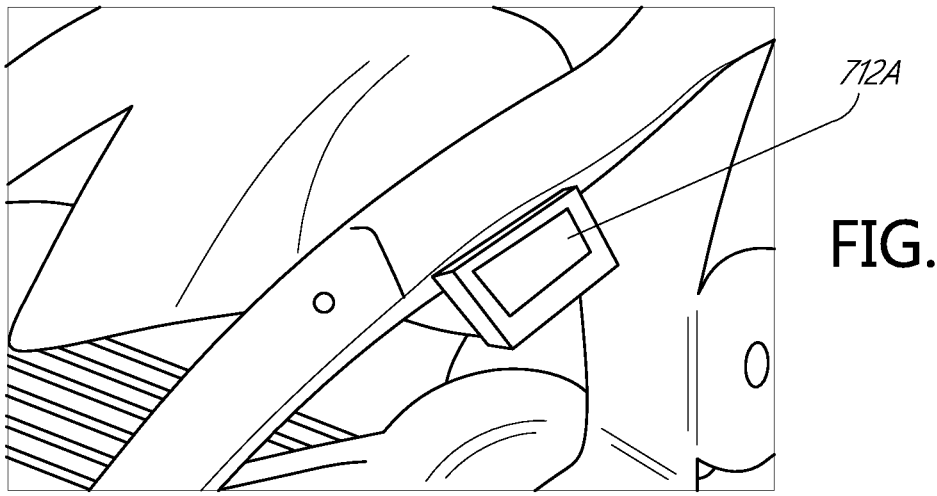
FIG. 7E illustrates a close-up view of a buckle assembly of the powered mobility system of FIG. 7A.
Figure 7F:
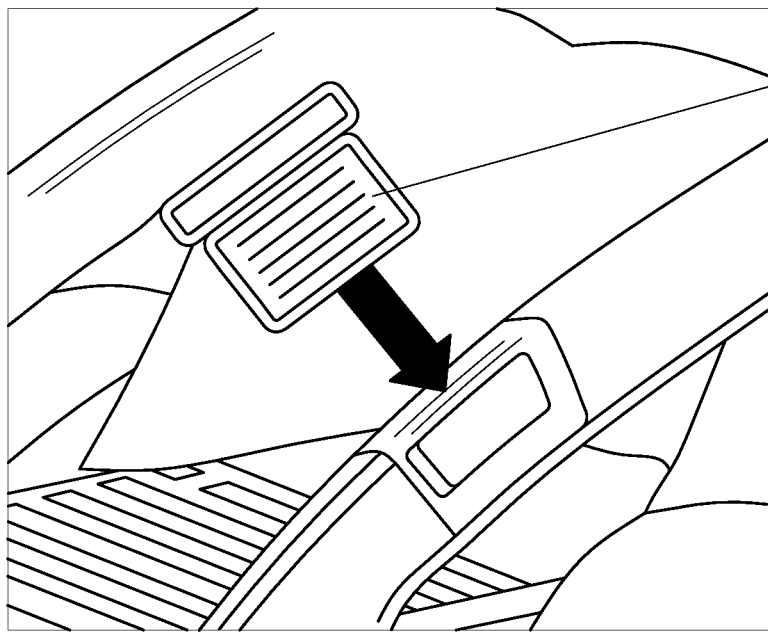
FIG. 7F illustrates another close-up view of the buckle assembly of the powered mobility system of FIG. 7A.
Figure 7G:
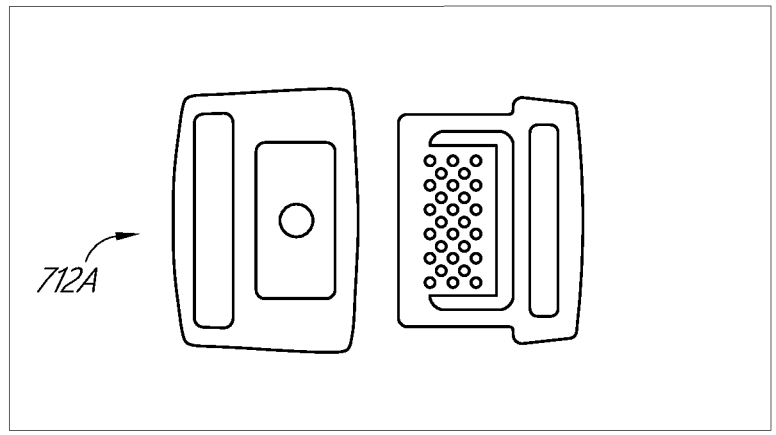
FIG. 7G illustrates another close-up view of the buckle of the powered mobility system of FIG. 7A.
Figure 7H:
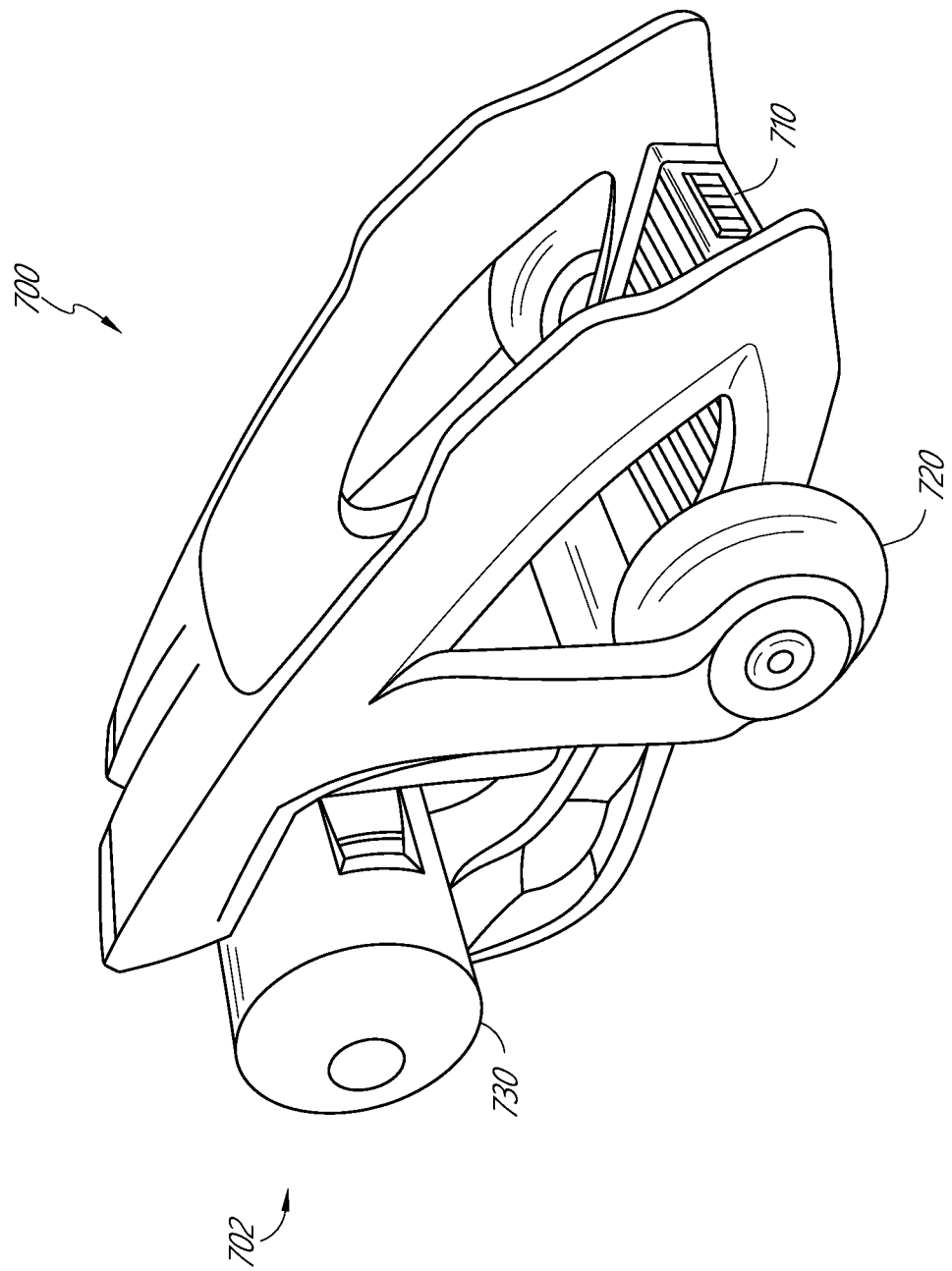
FIG. 7H illustrates a front perspective view of the powered mobility system of FIG. 7A.
Figure 7I:
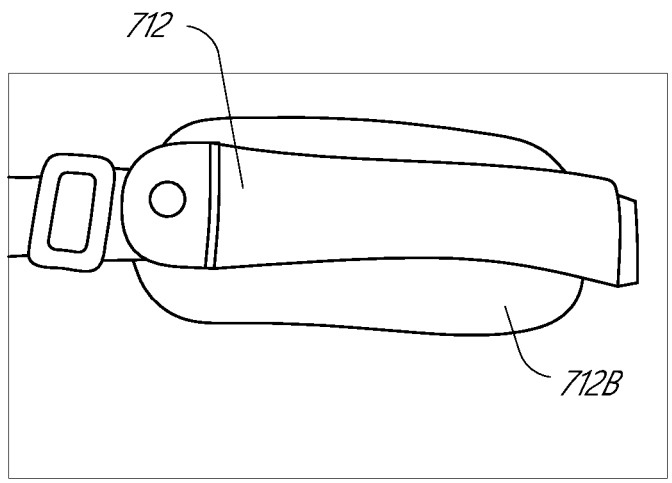
FIG. 7I illustrates a close-up view of a strap of the powered mobility system of FIG. 7A.
Figure 7J:
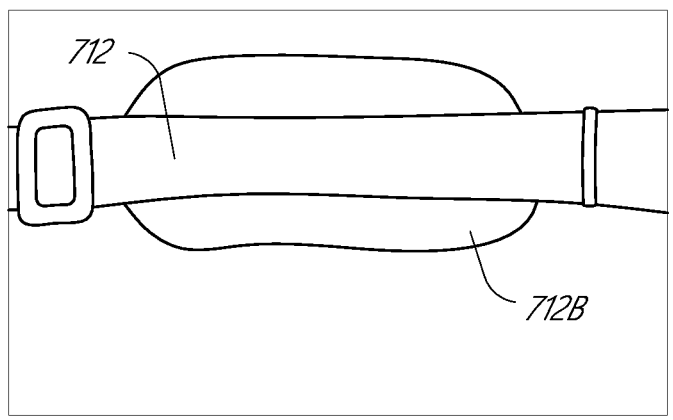
FIG. 7J illustrates another close-up view of the strap of the powered mobility system of FIG. 7A.
Figure 7K:
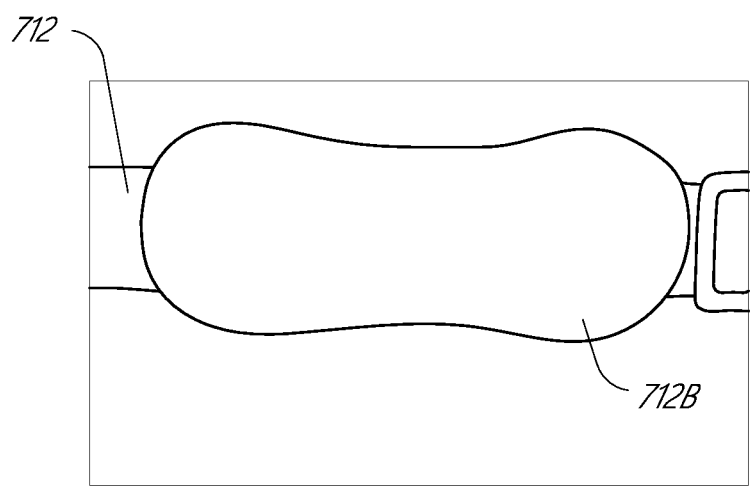
FIG. 7K illustrates a close-up view of a strap pad of the powered mobility system of FIG. 7A.
Figure 7L:
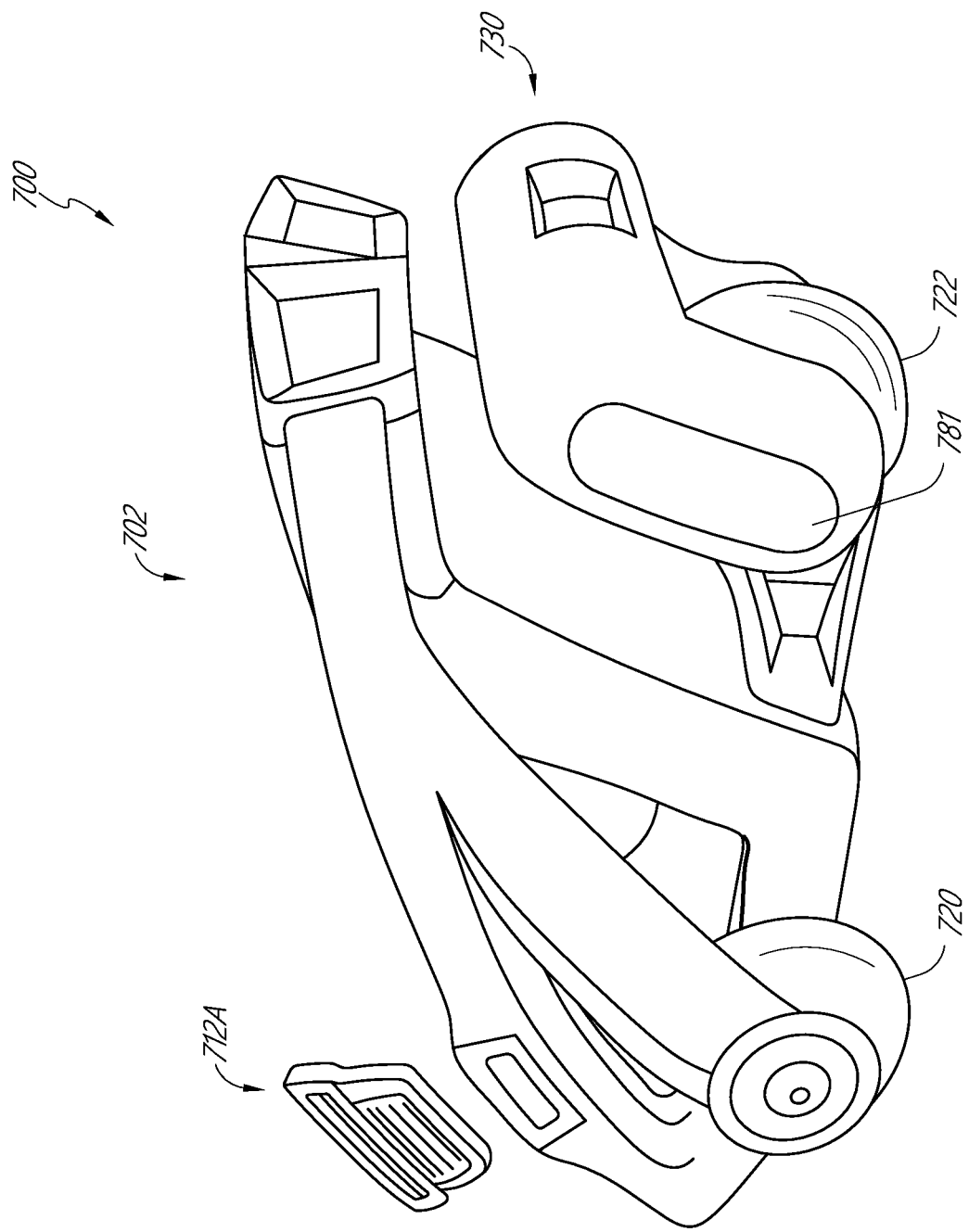
FIG. 7L illustrates another rear perspective view of the powered mobility system of FIG. 7A showing various areas of the powered mobility system.
Figure 7N:
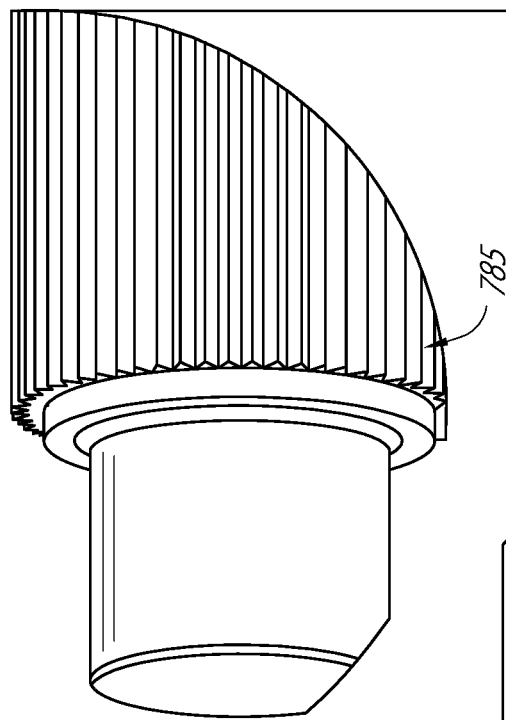
FIG. 7N illustrates a close-up view of a knurled shaft of the bearing support system of FIG. 7M.

FIGS. 7A-7N illustrate another embodiment of a powered mobility system 700, such as a powered skate 702. The powered skate 702 is similar or identical to the powered skates discussed above in many respects. As shown in FIGS. 7A-7N, the powered skate 702 can include a platform 710, a plurality of wheels 720, and a motor assembly 730, which can be respectively similar to the platform, the plurality of wheels, and the motor assembly described above in connection with the powered skate 102, 202, 302, 402, 502, 602. The powered skate 702 can include any one, or any combination, of the features of the powered mobility system 100, 200, 300, 400, 500, 600.

In some embodiments, the platform 710 can include one or more straps 712. The straps 712 can be attached to the platform 710. For example, the straps 712 can be attached to the platform 710 via a buckle 712A. The buckle 712A can be disposed on at least one side of the platform 710. The buckle 712A can be formed in one or more opposing sides of the frame 708. In some embodiments, the buckle 712A is detachable from the frame 708. In some embodiments, the buckle 712A is fixed to the frame 708. The buckle 712A can include a quick release buckle (see FIGS. 7E-7G). The quick release buckle 712A can quickly attach and/or detach from the frame 708. The straps 712 can be coupled to one end of the buckle 712A. In some embodiments, the frame 708 can be coupled to the other end of the buckle 712A. The straps 712 can extend across the platform 710 to secure a user's foot in place within the platform. The buckle 712A can allow for the straps 712 to be easily adjusted. As shown in at least FIGS. 7I-7K, the straps 712 can include a strap pad 712B. The strap pad 712B can help to distribute pressure over the user's foot. The strap pad 712B can include various materials, such as EVA backed with a polyester fabric, among others.

In the illustrated configuration, a power supply 736, such as a battery is disposed above (e.g., directly above) the motor assembly 730. The battery 736 can be stored in a battery storage compartment 737. The battery storage compartment 737 can include several configurations. For example, the battery storage compartment 737 can include a locking mechanism, such as a latch or clip, and a cover. Such configurations can allow the battery to be removed and/or replaced. In some embodiments, the battery is not removable and/or replaceable. For example, the battery storage compartment 737 may not include a cover to allow access to the battery. In the illustrated configuration, the battery storage compartment 737 generally faces rearwardly and extends horizontally outwards from the powered skate 702. As shown, in some embodiments, the battery storage compartment may not extend beyond the motor assembly 730. In some embodiments, the battery 736 and/or at least a portion of the battery storage compartment 737, can include a lighted portion 786 (e.g., an LED). The lighted portion 786 can indicate when the powered skate 702 is in an "on" position and/or in a position in which power is capable of being supplied from the battery 736 to the motor 732.

In some embodiments, the skate 702 can include a charging port 788. The charging port 788 can allow the battery 736 to be charged. In some embodiments, the charging port 788 allows the battery 736 to be charged without removal of the battery 736. In some embodiments, the charging port 788 can be positioned along a side of the platform 710. In some embodiments, the charging port 788 can be positioned along a rear of the platform 710. In some embodiments, the charging port 788 is positioned adjacent a power switch 789. For example, the charging port 788 can be positioned below the power switch 789 along a lateral side of the platform 710. In some embodiments, activation of the power switch 789 can allow the battery 736 to supply power to the motor 732 of the motor assembly 730.

As mentioned above, the powered mobility system 700 can include the motor assembly 730. In some embodiments, the motor assembly 730 can be coupled to a swing arm 752. As described in more detail below, the swing arm 752 can be pivotably connected with the platform 710 by a swing arm attachment 754.

Figure 7M:
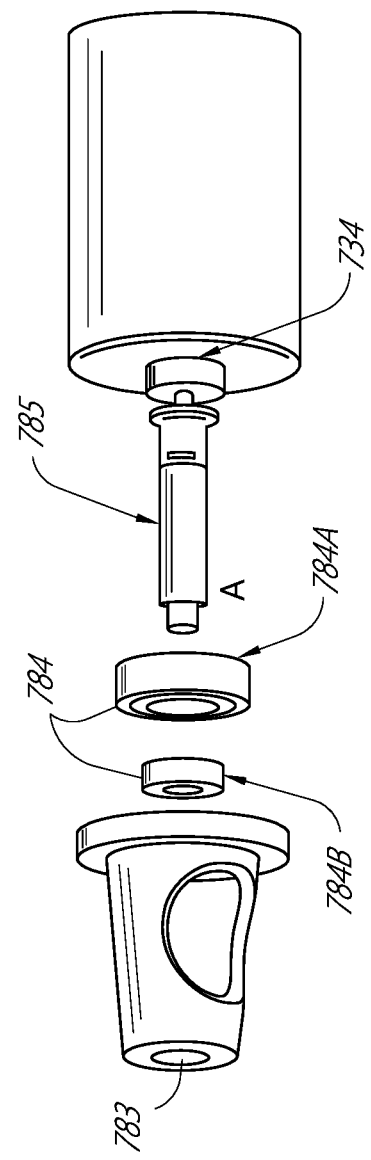
FIG. 7M illustrates a close-up view of a bearing support system of the powered mobility system of FIG. 7A.
Figure 8A:
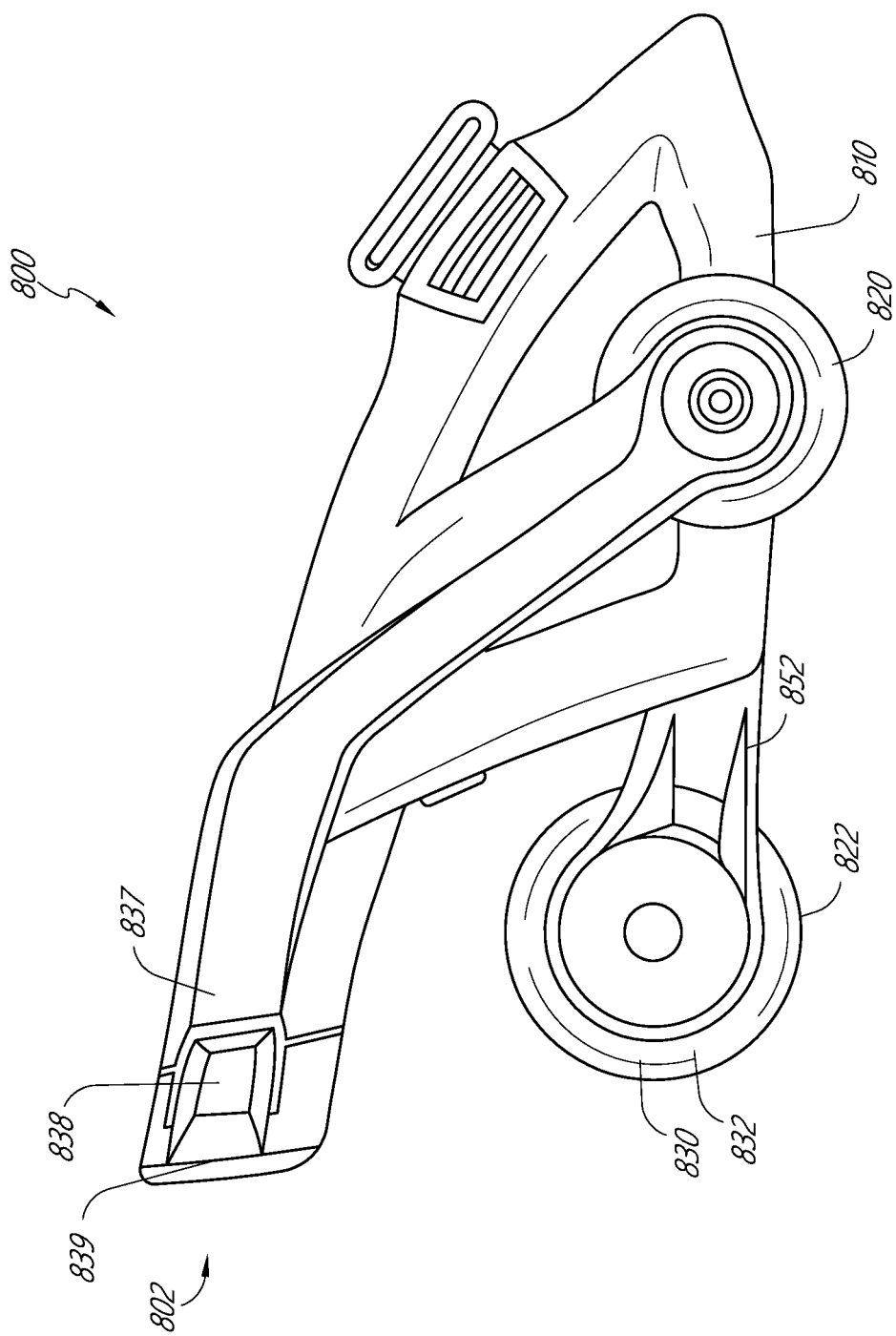
FIG. 8A illustrates a side view of another embodiment of a powered mobility system.
Figure 8B:
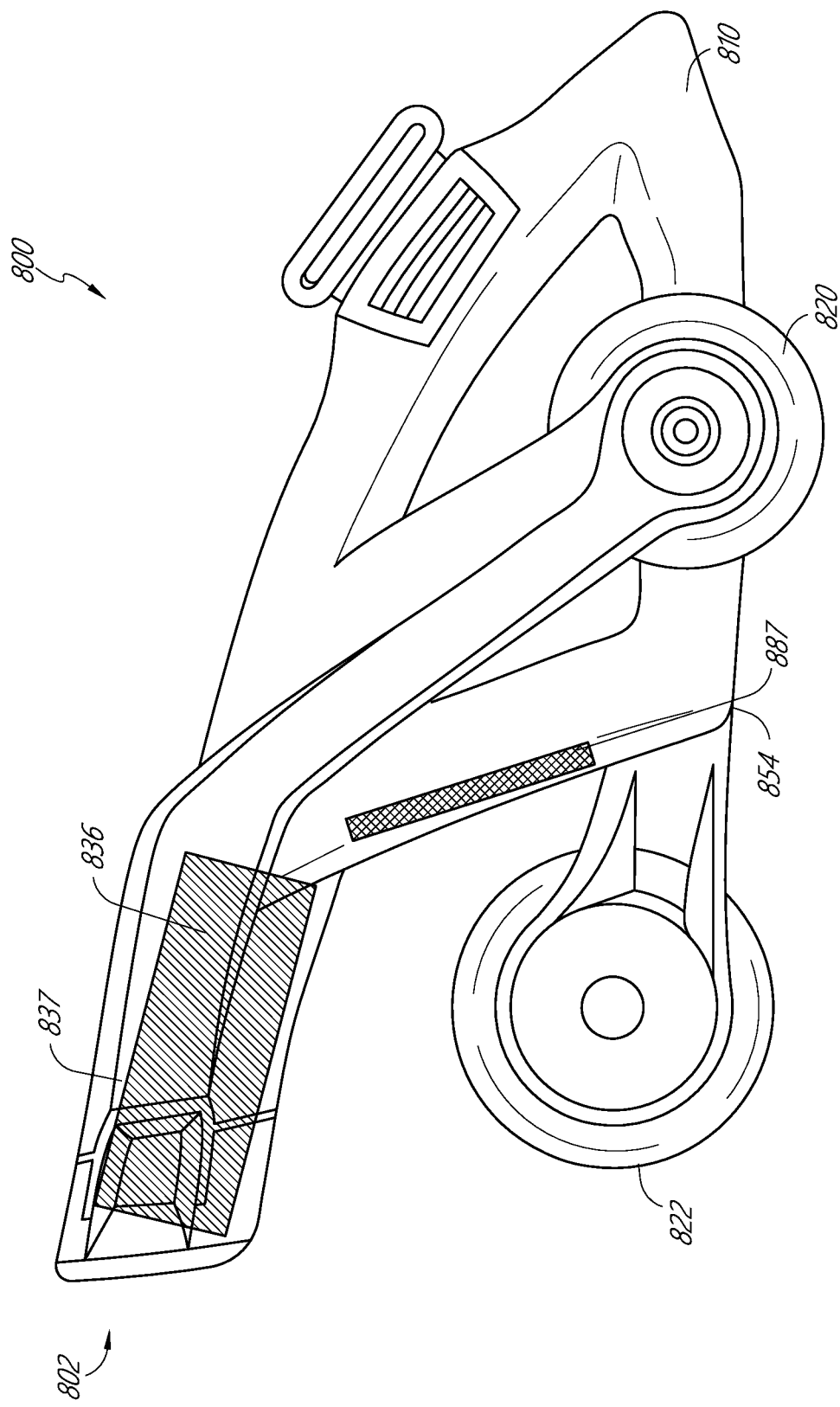
FIG. 8B illustrates another side view of the powered mobility system of FIG. 8A showing example locations of a battery and a controller.
Figure 8C:
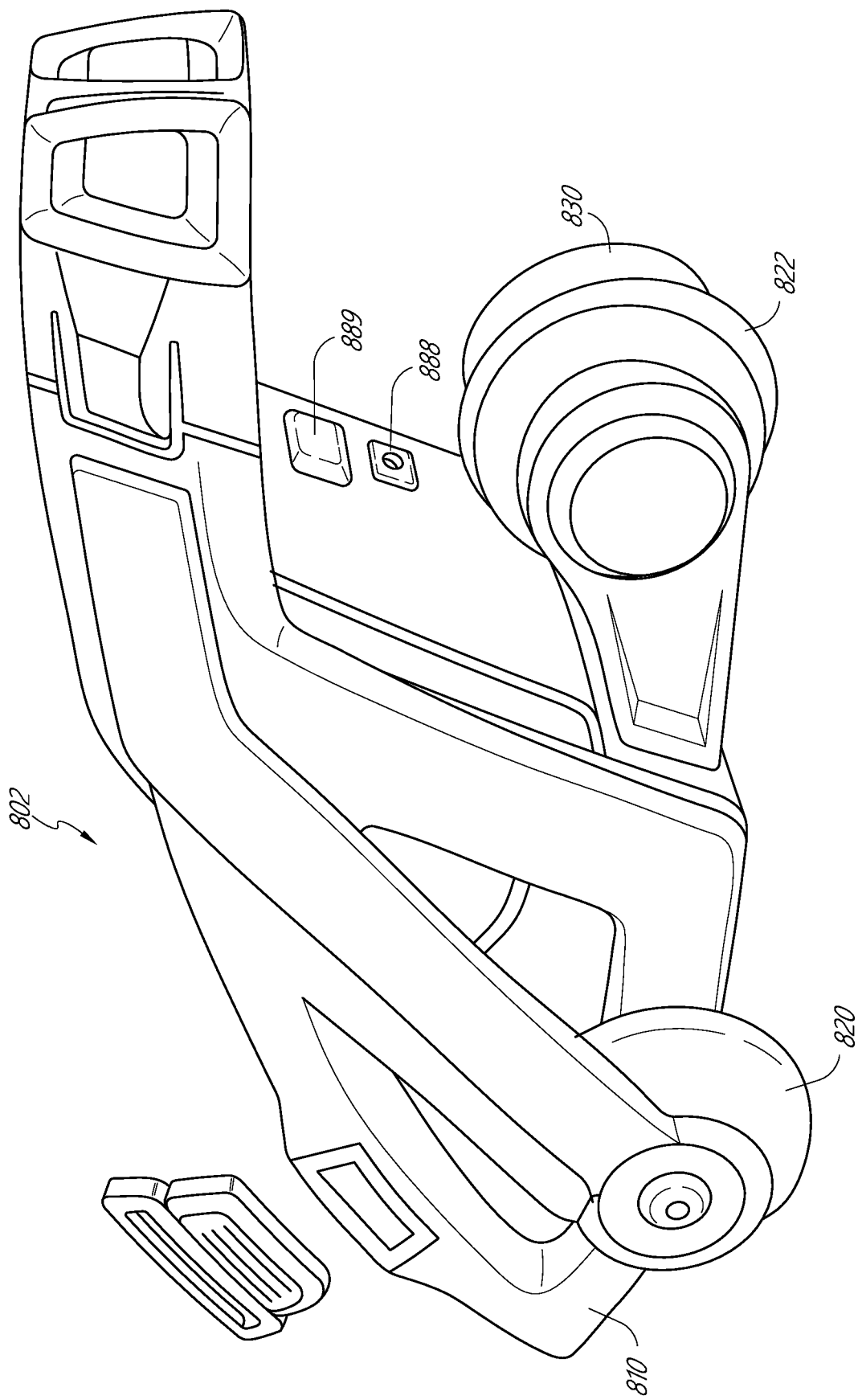
FIG. 8C illustrates a rear perspective view of the powered mobility system of FIG. 8A.
Figure 8D:
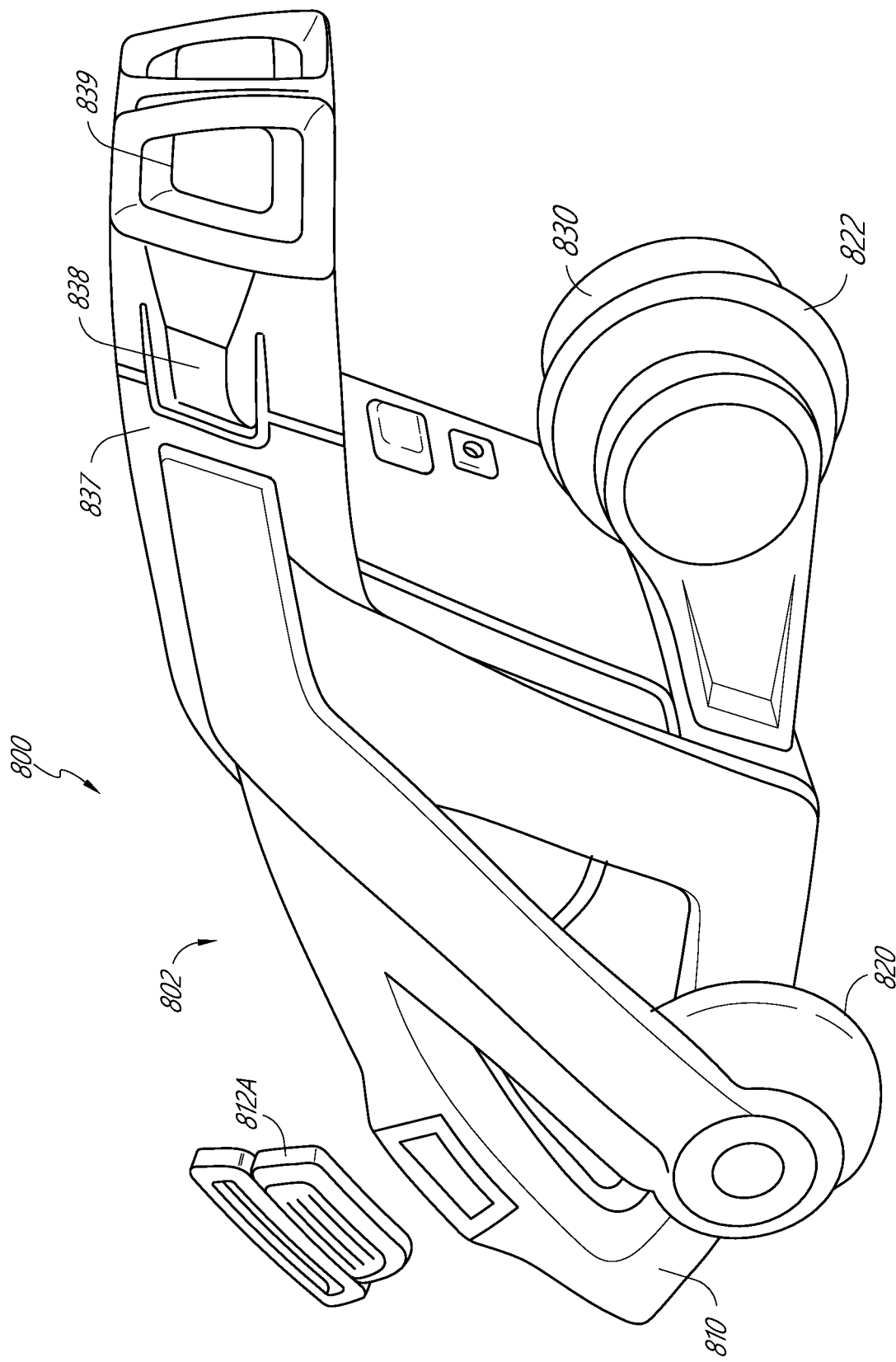
FIG. 8D illustrates another rear perspective view of the powered mobility system of FIG. 8A showing various areas of the powered mobility system.

As shown in at least FIGS. 7M and 7N, in some embodiments, the motor assembly 730 can include the motor 732 and a bearing support system. The bearing support system can include a bushing 734 coupled with the motor, a knurled shaft 785, at least one bearing 784, and a knurl cover 783. As shown, the bushing 734 can be coupled with a side of the motor. The knurled shaft 785 can be coupled with the bushing 734 and/or the motor 732. In some embodiments, the at least one bearing 784 includes a first bearing 784A and a second bearing 784B. The first and second bearings 784A, 784B can include the same or different size. In some embodiments, the first and second bearings can slide over at least a portion of the knurled shaft 785. In some embodiments, the knurl cover 783 can slide over and/or otherwise at least partially surround the knurled shaft 785 and the first and second bearings 784A, 784B. The knurl cover 783 can include an opening to allow the first bearing 784A, the second bearing 784B, and/or the knurled shaft 785 to contact the driving wheel 722. In some embodiments, the motor assembly 730 can include a cover 781 that encloses the motor 732 and at least a portion of the bearing support system to protect the motor assembly 730 from dirt, rocks, and/or other potentially harmful substances that can disrupt the motor assembly during operation.

In some embodiments, when the motor 732 is activated, the motor 732 spins the bushing 734, the knurled shaft 785 and/or the bearings 784. This can cause the driving wheel to spin, as described below. In some embodiments, when power is supplied to the motor 732, the motor 732 spins the bushing 734, the knurled shaft 785 and/or the bearings 784. This can cause the driving wheel to spin, as described below. Certain embodiments of the motor assembly 730, which include the knurled shaft 785 and/or bearings 784 can desirably limit additional stress to the motor 732 when the motor 732 is activated.

In certain implementations, the skate 702 operates in response to a body position of the user. For example, in some embodiments, the user can engage the motor assembly 730 by leaning on a heel end of the powered skate 702. When the user leans on the heel end of the powered skate 702, the powered skate can pivot about the swing arm attachment 754. In some implementations, the movement of the swing arm 752 actuates a switch or other actuation feature. The actuation feature can signal for the skate to begin operating (e.g., driving the wheel 722). In some embodiments, the actuation feature causes a signal to be sent to a controller 787 and/or the motor 732. In some variations, pivoting of the swing arm 752 causes the battery 736 to supply power to the motor assembly 730. When the battery 736 supplies power to the motor assembly 730, the motor 732 can spin the bushing 734, the knurled shaft 785 and/or the bearings 784. Such configurations can rotate the driving wheel 722. Accordingly, the motor 732 can be activated by leaning on the heel end of the powered skate 702. In some embodiments, the motor 732 is activated when the swing arm is rotated by at least 5°, such as 10° or more.

FIGS. 8A-8D

FIGS. 8A-8D illustrate another embodiment of a powered mobility system 800, such as a powered skate 802. The powered skate 802 is similar or identical to the powered skates discussed above in many respects. As shown in FIGS. 8A-8D, the powered skate 802 can include a platform 810, a plurality of wheels 820, and a motor assembly 830, which can be respectively similar to the platform, the plurality of wheels, and the motor assembly described above in connection with the powered skate 102, 202, 302, 402, 502, 602, 702. The powered skate 802 can include any one, or any combination, of the features of the powered mobility system 100, 200, 300, 400, 500, 600, 700.

In the illustrated configuration, a power supply 836, such as a battery, is disposed above (e.g., directly above) at least a portion of the motor assembly 830. The battery 836 can be stored in a battery storage compartment 837. The battery storage compartment 837 can include several configurations. For example, the battery storage compartment 837 can include a locking mechanism 838, such as a latch or clip, and a cover 839. In the illustrated configuration, the battery storage compartment 837 generally faces rearwardly and extends generally horizontally outwards from the powered skate 802 beyond the motor assembly 830. The cover 839 can face rearwardly and the locking mechanism can be disposed on one side of the battery storage compartment 837.

In some embodiments, the skate 802 can include a charging port 888. The charging port 888 can allow the battery 836 to be charged. In some embodiments, the charging port 888 can be positioned along a rear side of the platform 810. In some embodiments, the charging port 888 is positioned adjacent a power switch 889.

As mentioned above, the powered mobility system can include the motor assembly 830. In some embodiments, the motor assembly 830 can include a motor 832. In the illustrated embodiment, the motor 832 includes a hub motor arrangement that powers at least one of the plurality of wheels (e.g., a motor integrated with a rear driving wheel 822). The hub motor arrangement or driving wheel arrangement can include a body or housing, which at least partially encloses the motor 832 and transmission assembly. In some embodiments, a tire or other traction element that contacts a surface upon which the associated powered mobility system is ridden is adjacent to or is directly carried by the housing. A diameter of the traction element can be similar to or slightly larger than a diameter of the housing. In some embodiments, no substantial structural elements (e.g., spokes and rim) are provided between the housing and the traction element. The hub motor arrangement can be well-suited for small diameter wheel applications, such as ride-on vehicles for children, such as the powered mobility systems illustrated in the embodiments discussed herein.

Preferably, the motor 832 is a standard, commercially-available small DC brush motor. The skate 802 can include a transmission assembly that is configured to convert the speed and torque of the motor 832 into a speed and torque suitable for the driving wheel 822. In some variants, the motor and transmission assembly 830 are configured for accommodation in a housing that is suitably sized and shaped. The motor 832 is preferably positioned along a center axis of the hub motor arrangement and/or offset axially or laterally to one side of a central plane of the hub motor arrangement or of the traction element. In some configurations, the motor 832 is off-center and/or spaced from the center axis of the hub motor arrangement. Preferably, a portion of the motor 832 (e.g., an output shaft is supported and/or journaled in one or both of a support bearing for the housing and a mount of the hub motor arrangement. In some arrangements, a portion of the motor 832 is laterally or axially inboard of the support bearing and/or mount that is nearest the motor (if multiple bearings/mounts are provided) and a portion of the motor 832 is laterally or axially outboard of the support bearing and/or mount. In several embodiments, a standard motor can be used along with a transmission assembly suitable to convert the power of the motor into suitable drive power for the rear driving wheel arrangement to provide a relatively low-cost drive system for small or child vehicle applications, including the powered mobility system. In addition, such an arrangement preserves space for the transmission of the hub motor arrangement.

In some embodiments, the hub motor arrangement is not a through-shaft type of arrangement in which an axle member or arrangement passes completely through the center of the hub motor, but is a distributed axle arrangement that provides suitable support while permitting the motor to be centrally-located or aligned with a central, rotational axis of the hub motor arrangement and to occupy a portion of the axis of rotation. That is, the motor 832 is not a hollow design that surrounds the axis of rotation. Such an arrangement provides a well-balanced hub motor arrangement while permitting the use of a standard, commercially-available "off-the-shelf" motor to keep costs low. In some embodiments, when incorporated into the associated powered mobility system, both sides of the hub motor arrangement may be supported. In some embodiments, the axle supports only one side of the hub motor arrangement. For example, the axle may extend partially inboard the housing of the hub motor and partially outboard the motor on one side of the hub motor arrangement. Although through-shaft type axle designs can also permit a motor to be aligned with a central, rotational axis of a motor, such an arrangement would require a custom motor design or at least a large motor design because the axle needs to be sufficient to support a substantial portion of the weight of the associated powered mobility system. In the illustrated arrangement, the shaft of the motor 832 may not support any significant weight of the associated powered mobility system. In some configurations, the motor 832 could be completely outside of the housing and/or an outside bearing or completely within the housing and/or inboard of the bearing, depending on factors such as the amount of space available, especially in a width direction (along the center or rotational axis). In some configurations the motor 832 is reasonably accessible without significant disassembly of the hub motor arrangement. For example, in some configurations, the motor can be positioned partially within the housing and/or extend partially outside of the housing. In some configurations, at least a portion of the motor 832 is positioned inboard of the housing and/or within the housing and at least a portion of the motor is located outboard of the housing and/or outside of the housing. Additional details and features related to hub motors can be found in U.S. Pat. No. 9,660,500, filed on Jun. 27, 2014, and U.S. Pat. No. 9,638,285, filed on May 12, 2015, each of which are hereby incorporated by reference in their entirety.

In certain implementations, the skate 802 operates in response to a body position of the user. For example, in some embodiments, the user can engage the motor assembly 830 by leaning on a heel end of the powered skate 802. When the user leans on the heel end of the powered skate 802, the powered skate can pivot about the swing arm attachment 854. In some implementations, the movement of the swing arm 852 actuates a switch or other actuation feature. The actuation feature can signal for the skate to begin operating (e.g., driving the wheel 822). In some embodiments, the actuation feature causes a signal to be sent to a controller 887 and/or the motor 832. In some variations, pivoting of the swing arm 852 causes the battery 836 to supply power to the hub motor. When the battery 836 supplies power to the hub motor, the motor 832 spins the driving wheel 822. Accordingly, the motor 832 can be activated by leaning on the heel end of the powered skate 802. In some embodiments, the motor 832 is activated when the swing arm is rotated by at least 5°, such as 10° or more.

FIGS. 9A-9G

FIGS. 9A-9G illustrate another embodiment of a powered skate 902. The powered skate 902 is similar or identical to the powered skates discussed above in many respects. As shown in FIGS. 9A-9G, the powered skate 902 can include a platform 910, a plurality of wheels 920 including a driving wheel 922, and a motor assembly 930, which can be respectively similar to the platform, the plurality of wheels, and the motor assembly described above in connection with the powered skate 102, 202, 302, 402, 502, 602, 702, 802. The powered skate 902 can include any one, or any combination, of the features of the powered mobility systems 102, 202, 302, 402, 502, 602, 702, 802. The skate 902 can include a transmission assembly housing 918, which can include first and second housing portions 978A, 978B (see FIGS. 9B and 9D).

In some embodiments, the plurality of wheels 920 can include a first side wheel 924 and a second side wheel 926. The first and second side wheels 924, 926 can be housed within a wheel housing 925. The wheel housing 925 can be integrally formed with the frame 908. In some embodiments, the wheel housing 925 can extend outwardly from the platform 910. The wheel housing can surround at least a portion of the first and second side wheels 924, 926 to protect the side wheels from dirt, rocks, and/or other potentially harmful substances that can disrupt the wheels during operation. For example, the wheel housing 925 can surround at least a portion of the side of the first and second side wheels 924, 926. In some embodiments, the wheel housing can increase aerodynamics of the powered skate 902.

In some embodiments, the frame 908 can include an upper portion 927A and a lower portion 927B. The upper portion 927A and the lower portion 927B can be integrally formed. In some embodiments, the upper portion 927A and the lower portion 927B extend along sides of the platform 910. In some embodiments, the upper and/or lower portions 927A, 927B extend forwardly beyond a forward end of the platform 910. This can help to protect a user's toes in use. In some embodiments, the upper and/or lower portions 927A, 927B extend forwardly to an end of the platform 910. In some embodiments, the upper portion 927A and/or the lower portion 927B extends outwardly laterally from the platform 910. In some embodiments, the lower portion 927B extends laterally outwardly from the platform 910 a distance greater than a distance the upper portion extends laterally outwardly from the platform 910. In some embodiments, the lower portion 927B surrounds at least a portion of the side of the first and second side wheels 924, 926. In some embodiments, the lower portion 927B surrounds at least a portion of a front side of the first and second wheels 924, 926.

In some embodiments, the upper portion 927A, the lower portion 927B and a side of the platform 910 form a generally triangular shape. In some embodiments, the upper portion 927A and/or the lower portion 927B are generally curved along a length the upper and lower portions 927A, 927B. In some embodiments a surface of the upper and/or lower portions 927A, 927B is rounded. In some embodiments, a side opening 929 is formed between the upper portion 927A, the lower portion 927B and a side of the platform 910. This can help to reduce materials necessary to manufacture the skate 902. In some embodiments, this can help to provide air to the user's foot when worn to keep the user's foot cool. In some embodiments, this can help to enhance the aerodynamics of the skate 902. In some embodiments, the lower portion 927B includes a lower opening along at least a portion of the lower portion 927B. In some embodiments, the lower portion 927B includes a lower opening along a portion adjacent to the side wheels 924, 926. In some embodiments, the lower opening extends along approximately one-half of the lower portion 927B. In some embodiments, the lower opening extends along greater than or less than one-half of the lower portion 927B.

In some embodiments, the upper portion 927A and the lower portion 927B form a nose. The nose can form an edge between the upper portion 927A and the lower portion 927B. In some embodiments, the nose can form a pointed and/or rounded edge between the upper portion 927A and the lower portion 927B. The nose can help to enhance the aerodynamics of the skate 902 in use. In some embodiments, an angle α is formed between the upper portion 927A and the lower portion 927B. In some embodiments, the angle α is about 70 to 80 degrees. In some embodiments, the angle α is about 30 to 40 degrees, 40 to 50 degrees, 50 to 60 degrees, 60 to 70 degrees, 70 to 80 degrees, or 80 to 90 degrees or less. In some embodiments, the angle α is less than about 90 degrees. In some embodiments, the angle α is less than about 70 degrees. In some embodiments, the angle α is less than about 50 degrees.

In some embodiments, the first and second side wheels 924, 926 are the same size as the driving wheel 922. In some embodiments, the first and second side wheels 924, 926 have a diameter that is greater than the driving wheel 922. In some embodiments, the first and second side wheels 924, 926 have a diameter that is less than the driving wheel 922. In some embodiments, a portion of the first and second side wheels 924, 926 extends above the platform 910 and/or a portion of the first and second side wheels 924, 926 extends below the platform 910. In some embodiments, a center of the platform 910 along a vertical axis is approximately in axial alignment with the first and second side wheels 924, 926. In some embodiments, a top of the first and second side wheels 924, 926 is positioned below a battery 926, which is described in more detail below. In some embodiments, the top of the first and second side wheels 924, 926 is positioned below the user's ankle and/or a top of the user's midfoot. In some embodiments, the top of the first and second side wheels 924, 926 is positioned below a motor 932, which is described in more detail below.

In some embodiments, the diameter of the first and second side wheels 924, 926 is less than one-half a maximum height of the frame 908 of the skate 902. In some embodiments, the diameter of the first and second side wheels 924, 926 is less than one-third a maximum height of the frame 908 of the skate 902. In some embodiments, the height of the first and second side wheels 924, 926 positioned below the upper portion 927A at about a midpoint of the platform 910. In some embodiments, the axle and/or center of the first and second side wheels 924, 926 is positioned below the nose of the frame 908.

In various embodiments, the skate 902 can include a power supply, such as a battery 936. An example of the battery 936 is illustrated in FIG. 9F. As shown in FIGS.

9A-9C, the battery 936 can be disposed above (e.g., directly above) at least a portion of the motor assembly 930. The battery 936 can be stored in a battery storage compartment 937. In the illustrated configuration, the battery storage compartment 937 generally faces rearwardly and extends horizontally outwards from the powered skate 902 beyond (e.g., rearwardly beyond) the motor assembly 930. In some embodiments, the battery storage compartment 937 extends generally horizontally outwards from the powered skate 902 over at least a portion of the motor assembly 930. The battery storage compartment 937 can include several configurations. In some embodiments, the battery storage compartment 937 can include a locking mechanism 938, such as a latch, clip, or button. The locking mechanism 938 can be released by pressing an actuator of the locking mechanism 938, for example.

In some embodiments, the battery 936 is insertable, replaceable, and/or removable from the battery storage compartment 837 (see FIG. 9G). The battery 936 may include any type of battery, such as a lithium ion rechargeable battery. For example, the battery 936 can have an approximate 1.5-2.5 hour discharge time. In some embodiments, the battery 936 can have an approximate 1-2 hour, 2-4 hour, 4-6 hour, 5 to 7 hour, 7 to 9 hour, or longer discharge time.

In some embodiments, the skate 902 can include a charging port 988. The charging port 988 can receive a plug to receive electrical power in order to allow the battery 936 to be charged. A seal, such as a rubber boot, can cover the port 988 when not in use. In some embodiments, the charging port 988 allows the battery 936 to be charged without removal of the battery 936. In some embodiments, the charging port 988 can be positioned along a side of the platform 910. In some embodiments, the charging port 988 can be positioned along a rear of the platform 910. In some embodiments, the charging port 988 is positioned adjacent a power switch 989. For example, as shown the charging port 988 can be positioned below the power switch 989 along a lateral side of the platform 910. In some embodiments, activation of the power switch 989 can allow the battery 936 to supply power to the motor 932 of the motor assembly 930. In some embodiments, the battery 936 can supply power to the motor 932 through a physical connector, such as a power cable. The power cable can be coupled with the battery via a power supply port 991. The power supply port can be positioned along a portion of the platform 910 (see FIG. 9C). The port 988 and/or the switch 989 can be illuminated.

In some embodiments, the switch 989 can be activated by pressing the switch. In some embodiments, the switch 989 can be activated wirelessly, such as via wi-fi, Bluetooth®, mobile application, etc. For example, in some embodiments, the powered mobility system 900 includes a wired and/or wireless motor control, as discussed above.

Figure 9A:
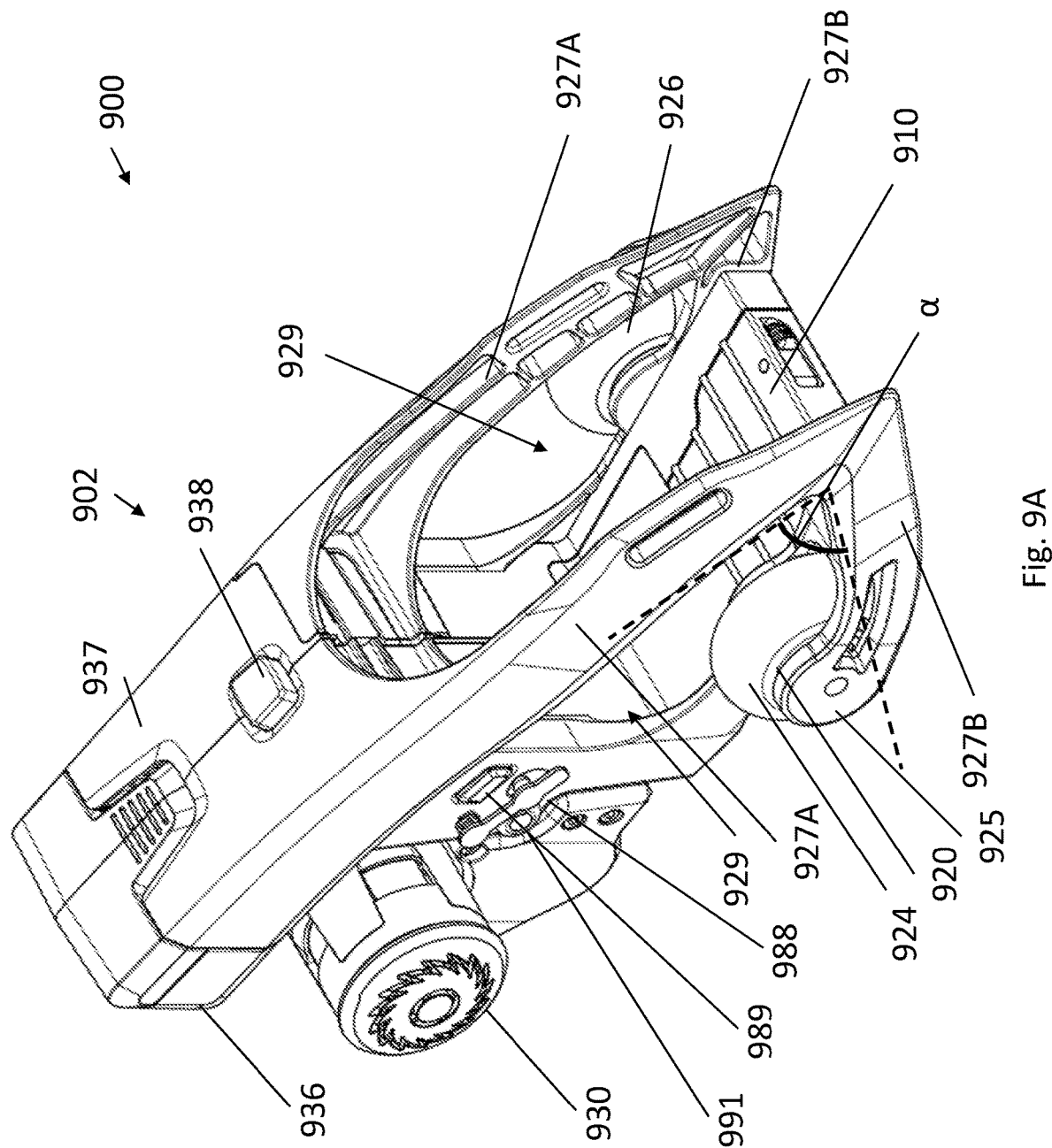
FIG. 9A illustrates a front perspective view of another embodiment of a powered mobility system.
Figure 9B:
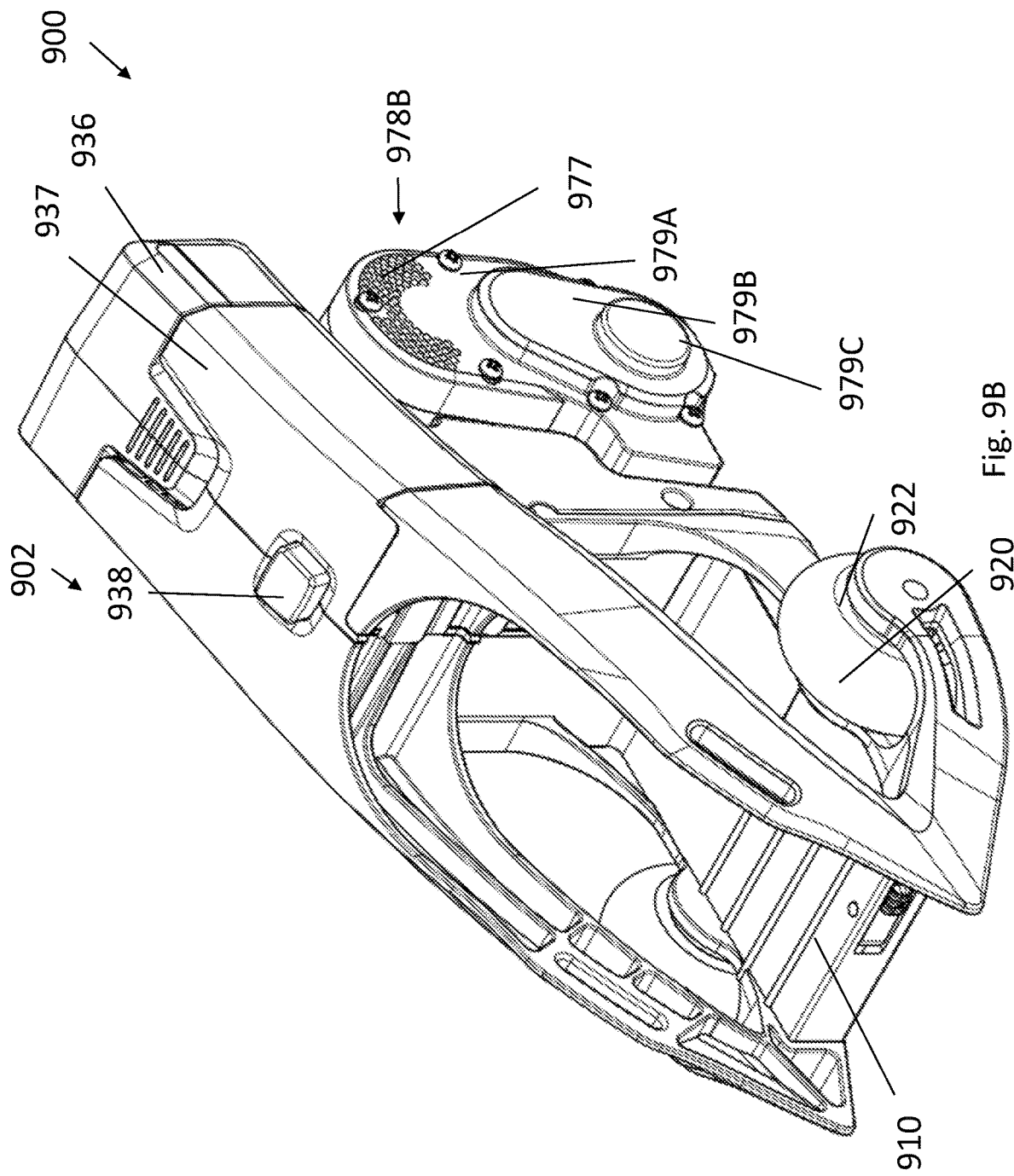
FIG. 9B illustrates another front perspective view of the powered mobility system of FIG. 9A.
Figure 9C:
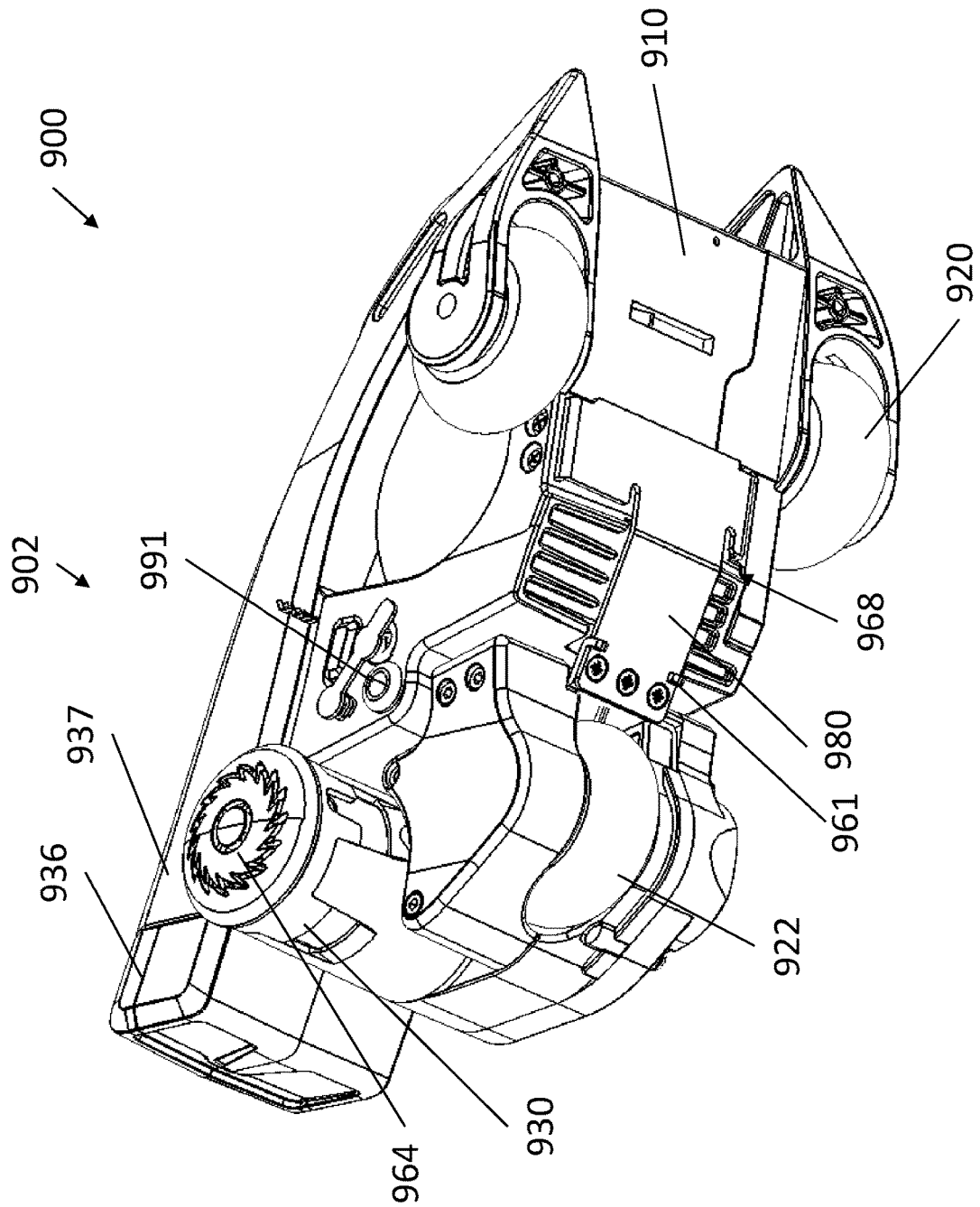
FIG. 9C illustrates a bottom perspective view of the powered mobility system of FIG. 9A.

As shown in FIG. 9B, the second housing portion 978B can include a stepped configuration. For example, the second housing portion 978B can include a first stepped region 979A, a second stepped region 979B, and a third stepped region 979C. The first, second, and third stepped regions 979A, 979B, 979C can have respective outer surfaces that are laterally offset (e.g., non-coplanar) from each other. In some embodiments, the first stepped region 979A can have a vent portion 977. The vent portion 977 can include one or more apertures. The apertures can allow airflow from ambient to a motor 932 for cooling. In some embodiments, the apertures at least partially surround an end of the motor 932 to allow airflow to directly contact the motor 932 for cooling.

Figure 9E:
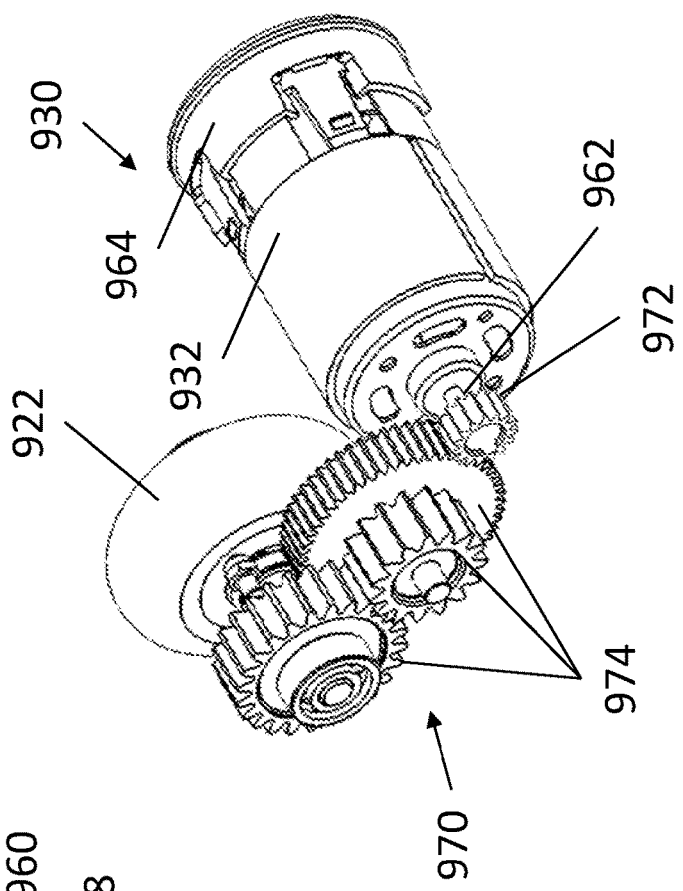
FIG. 9E illustrates portions of the motor and transmission assembly of FIG. 9D and a wheel.
Figure 9D:
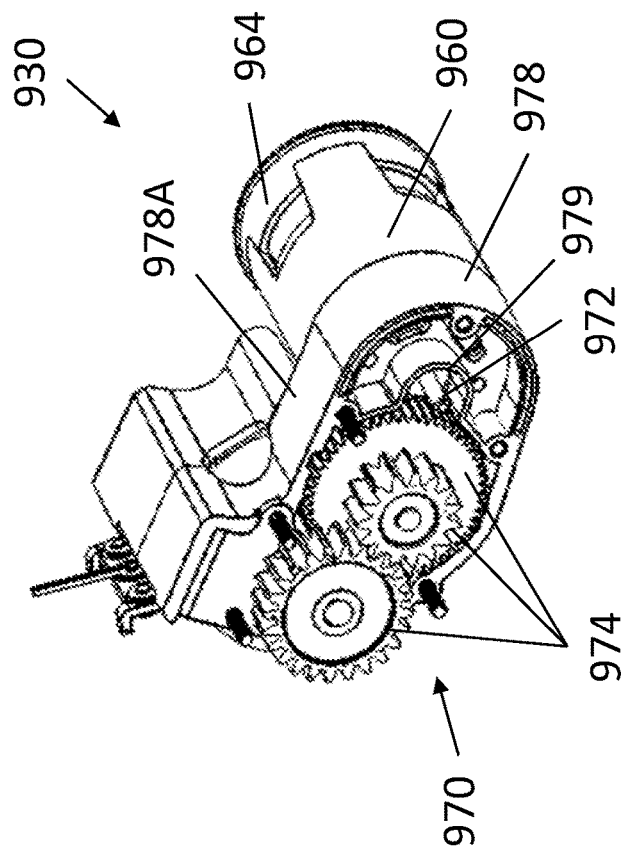
FIG. 9D illustrates a motor and transmission assembly of the powered mobility system of FIG. 9A.
Figure 9F:
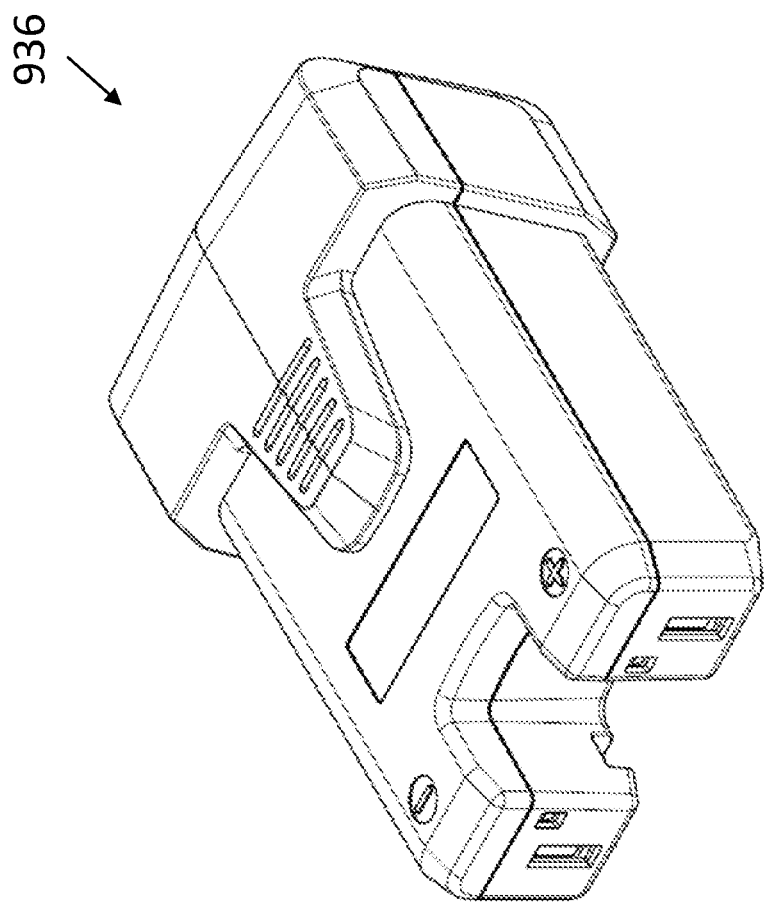
FIG. 9F illustrates a power supply of the powered mobility system of FIG. 9A.
Figure 10A:
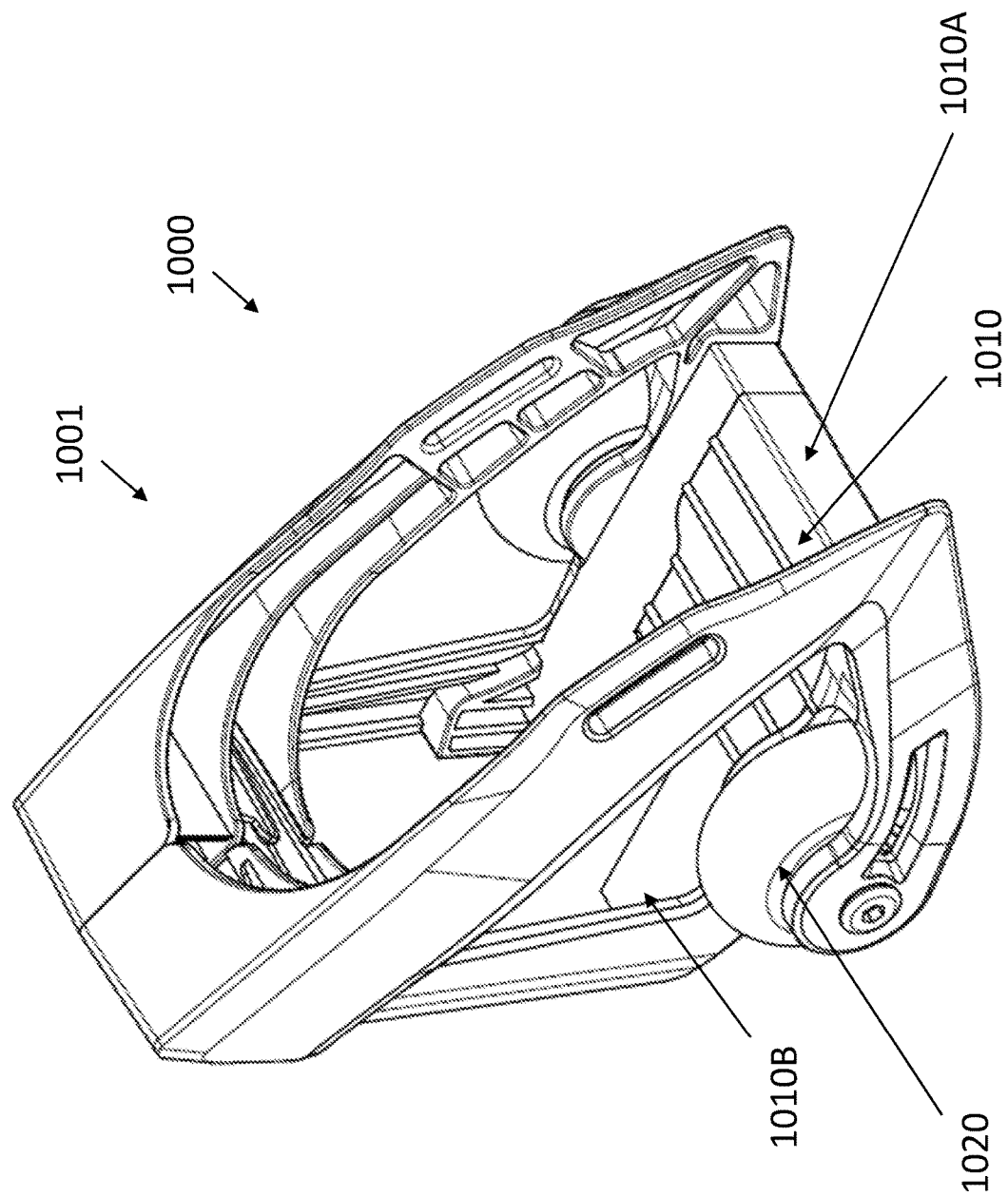
FIG. 10A illustrates a perspective view of another embodiment of a powered mobility system.
Figure 10C:
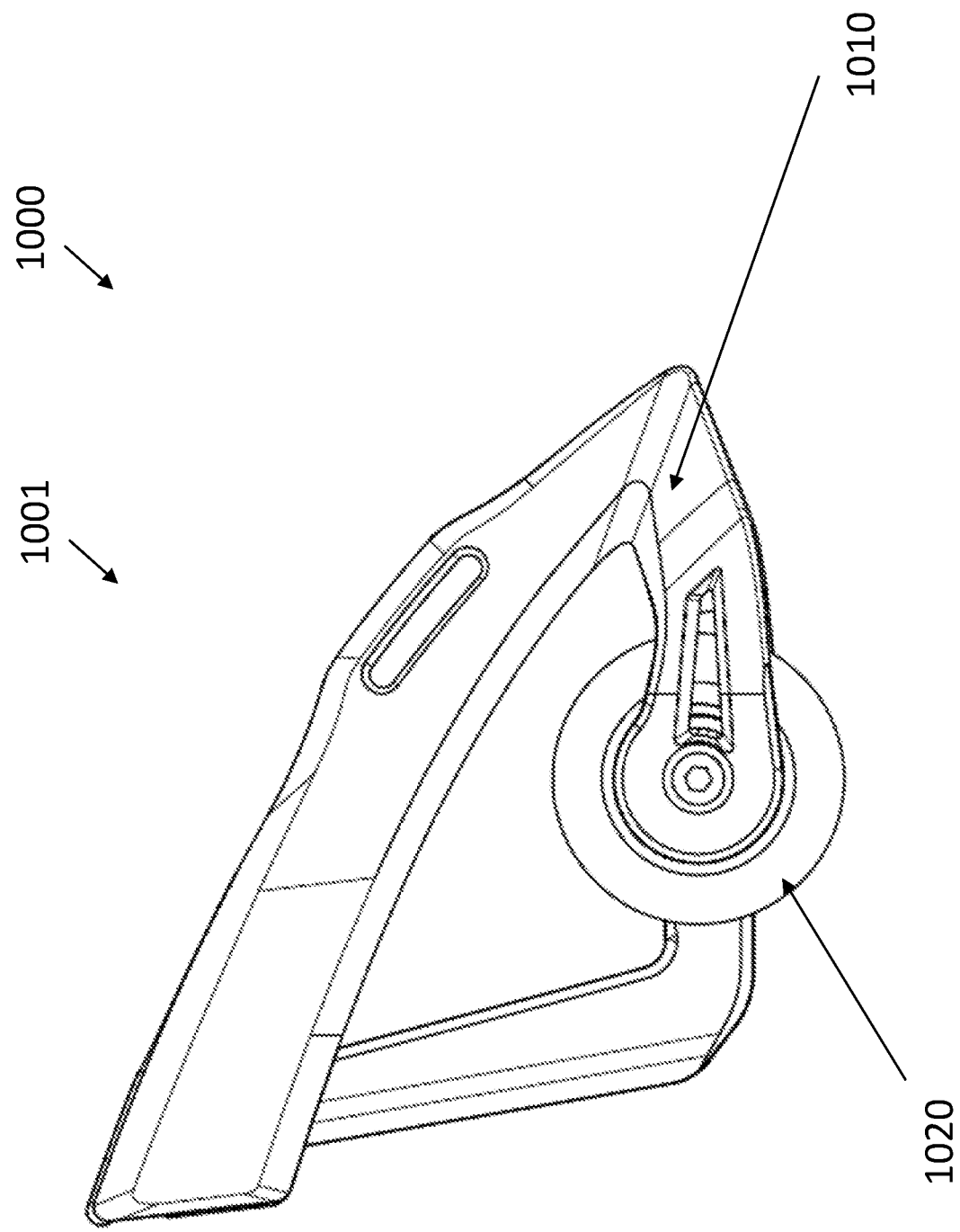
FIG. 10C illustrates a side view of the powered mobility system of FIG. 10A.
Figure 10D:
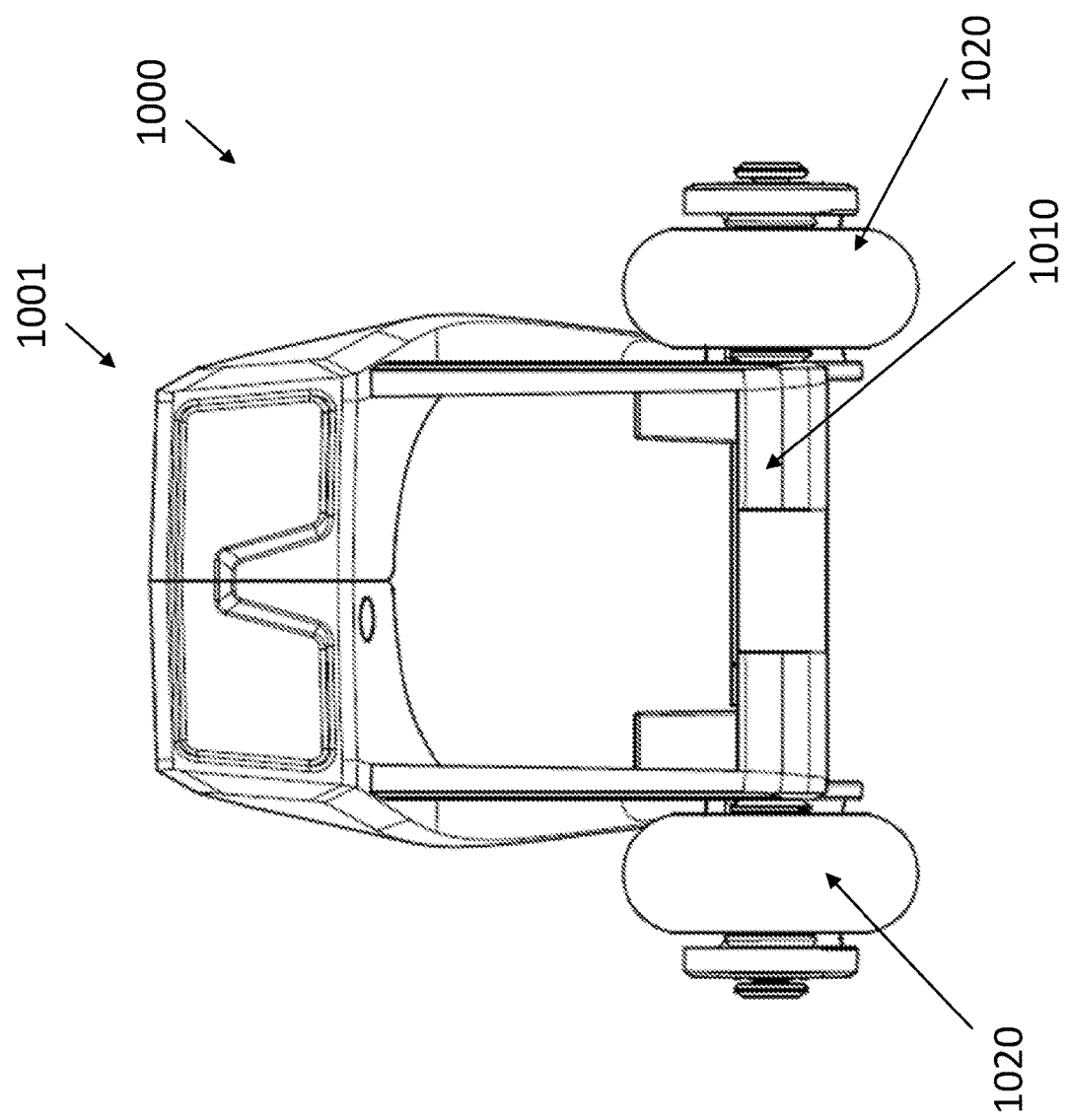
FIG. 10D illustrates a rear view of the powered mobility system of FIG. 10A.

As shown in FIGS. 9D and 9E, the motor assembly 930 can include a motor 932 and a drive shaft 962. The drive shaft 962 can extend outwardly from a side of the motor. The drive shaft 962 can be coupled to a transmission assembly 970. The transmission assembly 970 can include a gear transmission configured to transmit power from the motor 932 to the drive wheel 922. In some embodiments, the transmission assembly 970 can include a plurality of gears. The plurality of gears can include a driving gear 972 and at least one driven gear 974. Preferably, the plurality of gears can include at least three driven gears 974. In some embodiments, the plurality of gears can include one, two, three, four, five, six, seven, and/or eight or more driven gears. The plurality of gears can include various types of gear arrangements. For example, the plurality of gears can include spur gears, double spur gears and/or worm gears, among other gear arrangements. In certain implementations, the transmission assembly 970 comprises and/or acts as a gear reduction. This can allow the motor to drive the driving wheel 922 at a slower speed than the speed of the motor 932. As discussed above, the drive shaft 962 can engage with the driving gear 972 while the motor 932 is operated.

The plurality of gears can be at least partially surrounded by and/or enclosed within the transmission assembly housing 978. The transmission assembly housing 978 can protect the transmission assembly from dirt, rocks, and/or other potentially harmful substances that can disrupt the transmission assembly during operation. In some embodiments, the transmission assembly housing 978 at least partially surrounds the rear driving wheel 922. The transmission assembly housing 978 can include a recess and/or a slot 979 to receive the transmission assembly 970. As previously mentioned, the transmission assembly housing 978 can include a first housing portion 978A and a second housing portion 978B (see FIG. 9B). In some embodiments, the first housing portion 978A includes the recess and/or a slot 979 to receive the transmission assembly 970. The second housing portion 978B can connect to the first transmission assembly portion 978A to enclose the transmission assembly 970.

In some embodiments, the drive shaft 962 can be engaged and/or in axial alignment with the driving gear 972. In some embodiments, the drive shaft 962 is offset from the driving gear 972. In some embodiments, the motor 932 can spin the drive shaft 962. In some embodiments, this causes the driving gear 972 to spin at about the same speed as the drive shaft 962. Through the gear reduction, the driving gear 972 can cause at least one driven gear 974 to rotate a driving wheel shaft 976, which in turn causes the driving wheel 922 to spin. In various embodiments, the driving gear 972 is offset from the motor 932 and the diameter of the driving gear 972 can be smaller than at least one of the driven gears 974 of the transmission assembly 970. In some variants, the motor 932 can drive the driving wheel 922 at higher speeds and/or using less power (e.g., compared to certain variants without the gears). In some implementations, the driving gear 972, having a smaller diameter than at least one of the driven gears 974, causes the driving wheel 922 to rotate slower than the driving gear 972 and/or the drive shaft 962 of the motor assembly 930. The transmission of power from the motor assembly 930 to the driving wheel 922 can convert higher motor speeds to a slower driving wheel speed and/or can increase torque. The increase in torque applied by the motor 930 can allow the driving wheel 922 to be driven more efficiently, to facilitate gripping the ground, etc. In some embodiments, the ratio of the outside diameter of the driving gear 972 (e.g., a gear connected to the drive shaft 962) to the diameter of at least one of the driven gears 974

(e.g., a gear connected to the driving wheel shaft 976) is at least about: 2.0, 2.5, 3.0, 3.5, 4.0, 4.5, 5.0, 5.5, 6.0, 6.5, 7.0, 7.5, 8.0, ratios between the aforementioned ratios, or other ratios.

As shown in the illustrated embodiment, the motor assembly 930 can include a motor housing 960. The motor housing 960 can surround at least a portion of the motor 932 and can be positioned above at least a portion of the driving wheel 922. For example, the motor 932 can slide into and/or be secured within the motor housing 960. In some embodiments, the motor housing 960 includes a cap 964 that can connect to the motor housing 960 to enclose the motor 930. The cap 964 can be connected to the motor housing 960 by a snap-fit, screw-fit, and/or a press-fit arrangement.

In some embodiments, the motor housing 960 can connect to the platform 910. For example, as shown in FIG. 9C, the motor housing 960 can connect to a slot 968 formed within a rear side of the platform 910. In some embodiments, the powered skate 902 includes a motor assembly connector 980 to connect the motor assembly and/or the transmission assembly to the platform 910. In some embodiments, the connector 980 comprises a shield (e.g., a plate), which can be configured to protect at least a portion of a bottom of the platform 910 and/or the motor assembly 930. As shown, in some variants, the connector 980 is received in the slot 968 in the platform 910. In some embodiments, the connector 980 can be integrally formed with the platform 910 and/or the motor assembly 930. In some embodiments, the connector 980 is fastened to the platform 910 and/or the motor housing 960 by a mechanical fastener, such as a screw. In some embodiments, the connector 980 is coupled with the platform 910 by a snap-fit, press-fit, or other arrangement. In some embodiments, the connector 980 is coupled with the motor housing 960 at one end and the platform 910 at the other end. In some embodiments, the connector 980 is coupled with the motor housing 960 via a motor housing connector 961. The motor housing connector 961 can be integrated with the motor housing 960. In some embodiments, the motor housing connector 961 is coupled with the motor housing 960 via a mechanical fastener. In some embodiments, the motor housing connector 961 is integrated with and/or mechanically fastened to the connector 980.

In some embodiments, the connector 980 acts as a swing arm (as described above) that can support the motor assembly 930 and/or the rear driving wheel 922 rearwardly and outwardly from the platform 910. In some embodiments, the connector 980 comprises a resilient member, such as a plate. The connector 980 can have a free end (e.g., a free rear end). In some embodiments, the connector 980 slidably receives a spring arrangement of the housing 960. The spring arrangement can include a spring, such as a leaf spring, among other springs. The spring arrangement can provide flexible support to the connector 980. The spring arrangement can allow the connector 980 to flex while the user is using the skate 902. In some embodiments, the connector 980 can allow the motor assembly 930 and/or driving wheel 922 to move with respect to the platform 910 and/or the platform 910 to move relative to the motor assembly 930 and/or driving wheel 922. In some embodiments, the connector 980 includes a spring, such as a leaf spring, among other springs. In some embodiments, the connector 980 is the spring. In some embodiments, at least a portion of the motor assembly 930, such as the motor 932 can be supported (e.g., cantilevered) by the spring. In some embodiments, the motor assembly 930 and/or the driving wheel 922 can be supported rearwardly and outwardly from the platform 910. In some embodiments, the spring can allow the motor assembly 930 and/or the driving wheel 922 to pivot relative to the platform 910. In some embodiments, the spring can allow the motor assembly 930 and/or the driving wheel 922 to move relative to the platform 910.

In some embodiments, the connector 980 acts as a shock absorber. This can help to provide a smoother experience to the user. The connector 980 can help to account for bumps or non-flat riding surfaces. The connector 980 can flex as the skate 902 rolls over the bumps or non-flat riding surfaces to aid in maintaining contact between the driving wheel 922 and the riding surface. In some embodiments, the connector 980 can help to reduce and/or absorb shock impulses from the riding surface as the skate contacts the riding surface. The connector 980 can help to maintain contact between the driving wheel 922 and the ground when the user is using the skate 902. In some embodiments, the connector 980 can aid in maintaining contact between the driving wheel 922 and the riding surface when the user lands after performing tricks and/or jumps, which cause the driving wheel 922 to temporarily disengage from the riding surface. In some embodiments, the connector 980 is biased. For example, in some embodiments, the connector 980 can be biased in a direction towards the surface that the skate 902 is riding over. This can help to maintain contact between the driving wheel 922 and the surface when the user is using the skate 922. In some embodiments, the contact between the driving wheel 922 and the surface can cause the motor 932 to continue to spin.

In certain implementations, the skate 902 operates in response to a body position of the user. For example, in some embodiments, the user can engage the motor assembly 930 by leaning on the heel end of the powered skate 902. When the user leans on the heel end of the powered skate 902, the powered skate can pivot about an attachment region between the connector 980 and the platform 910. In some implementations, the movement of the connector 980 actuates a switch or other actuation feature. The actuation feature can signal for the skate to begin operating (e.g., driving the wheel 922). In some embodiments, the actuation feature causes a signal to be sent to the controller and/or the motor 932. In some variations, pivoting of the connector 980 causes the battery 936 to supply power to the motor assembly 930. When the battery 936 supplies power to the motor assembly, the motor 932 can spin, causing the transmission assembly 970 to drive the driving wheel 922. Accordingly, the motor 932 can be activated by leaning on the heel end of the powered skate 902. In some embodiments, the motor 932 is activated when the connector 980 is rotated by at least 5°, such as 10° or more.

In some embodiments, the rotation of the wheel 922 and/or motor 932 is a function of another portion of the powered skate 902 and/or the body position of the user. For example, as the user presses on the heel end of the powered skate 902 (e.g., thereby changing the position of the connector 980), the motor 932 spins faster. Thus, the speed of the motor 932 and/or overall speed of the powered skate 902 can depend on a pressure exerted on the heel end of the powered skate 902 by the user.

In some embodiments, the system includes a pressure sensor, such as on or otherwise integrated with the platform 910 the connector 980, and/or the motor assembly 930, among other regions of the skate 902. The pressure sensor can be used instead of and/or in combination with the connector 980. A signal from the pressure sensor can be used to control how much power is supplied to the driving wheel 922 from the battery 936. In some embodiments, signals from the pressure sensor can be used (e.g., by the controller)

to detect shifts of the user. For example, the signals can indicate how far a user is pushing and/or leaning forward backward, and/or sideways on various portions of the powered skate 902. Accordingly, depending on the portion of the powered skate 902 on which the user is pushing, the controller can adjust the motor speed of the motor 932. This can, for example, allow some embodiments to aid the user in balancing, can compensate for weight shifts by the user, or otherwise aid in safely riding the skate.

FIGS. 10A-10D

FIGS. 10A-10D illustrates another embodiment of a mobility system 1000, such as a non-powered skate 1001. The non-powered skate 1001 can include many of the same and/or similar features and components as the embodiments of the powered skate 102, 202, 302, 402, 502, 602, 702, 802, 902 described herein. In some embodiments, the non-powered skate 1001 can be laterally adjustable to accommodate a user's foot of various sizes and shapes. For example, the non-powered skate 1001 can include a platform 1010 that is at least laterally adjustable. In some embodiments, the non-powered skate 1001 houses a battery, such as a spare battery for the powered skate. This can extend operable range and/or reduce a weight disparity between the non-powered and powered skates. In some embodiments, the non-powered skate 1001 can have a plurality of wheels 1020. For example, the non-powered skate 1001 can have one, two, three, four, five, and/or six or more wheels 1020. In some embodiments, the non-powered slate 1001 can have a plurality of wheels 1020 disposed near the toe end 1010A and/or the heel end 1010B of the non-powered skate 1001. Such configurations can increase comfort, stability, and/or support for the user. In some implementations, the skate 1001 can include one or more wheels 1020 (e.g., non-powered wheels) located at or near a front portion of the skate 1001, such as laterally next or under the user's toes, forefoot, central foot portion and/or heel. As described above, in some embodiments, a user can lift the front of the non-powered skate 1001 and/or the user's toes of the foot wearing the skate 1001 off the ground during locomotion. In some variants, the non-powered skate 1001 includes wheels 1020 at or near the front of the skate, which can allow the user to keep the front of the non-powered skate on the ground during locomotion, thereby increasing user comfort. Some systems include the combination of a powered and non-powered skate, such as the skate 902 and the skate 1001.

Certain Terminology

Certain terminology may be used in the description for the purpose of reference only, and thus is not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes, or tends toward, a particular value, amount, or characteristic. For example, as the context may dictate, the term "generally parallel" can mean something that departs from exactly parallel by less than or equal to 15°.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

CONCLUSION

Various powered mobility systems have been disclosed in the context of certain embodiments and examples above. However, this disclosure extends beyond the specifically disclosed embodiments to other alternative embodiments and/or uses and obvious modifications and equivalents thereof. In particular, while the powered mobility systems have been described in the context of illustrative embodiments, certain advantages, features, and aspects of the powered mobility systems may be realized in a variety of other applications. Various features and aspects of the disclosed embodiments can be combined with or substituted for one another in order to form varying modes of the improvements. The scope of this disclosure should not be limited by the particular disclosed embodiments described herein.

Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Some embodiments have been described in connection with the accompanying drawings. The figures are drawn to scale, but such scale should not be interpreted as limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of powered mobility systems have been disclosed. Although the improvements have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

The following is claimed:

1. A powered mobility system, comprising:
   a powered skate comprising:
   a frame comprising a platform configured to receive a user's foot and secure the user's foot within the platform;
   a plurality of wheels comprising a driving wheel disposed rearwardly from a heel end of the powered skate and a side wheel;
   a motor assembly comprising a motor and a drive shaft;
   a transmission assembly comprising a gear transmission, the gear transmission comprising at least a driving gear connected to the drive shaft and a driven gear configured to spin the driving wheel;
   a connector that couples the motor assembly to the frame, the connector being configured to flex when the powered skate rolls over non-flat riding surfaces, wherein the connector is biased in a direction towards a riding surface;
   a power supply configured to power the motor assembly and to cause the motor to spin the driving wheel; and
   a non-powered skate.

2. The powered mobility system of claim 1, wherein the powered skate further comprises a heel end, the heel end comprising a pressure sensor configured to detect a pressure applied to the heel end by the user.

3. The powered mobility system of claim 1, wherein the powered skate further comprises a controller configured to detect shifts in the user's position and adjust a speed of the motor.

4. The powered mobility system of claim 1, wherein the platform comprises at least one strap for securing the user's foot within the platform.

5. The powered mobility system of claim 1, wherein the non-powered skate comprises a plurality of wheels disposed near a toe end and a heel end of the platform.

6. The powered mobility system of claim 1, wherein the driving wheel is supported at one end of the connector and wherein the motor assembly is disposed rearwardly from the platform and above the driving wheel such that when the user leans on the end of a swing arm assembly, the motor drives the driving wheel.

7. The powered mobility system of claim 6, wherein a speed of the motor increases when the motor assembly pivots in an upward direction.

8. The powered mobility system of claim 6, wherein a speed of the motor increases when the motor assembly pivots towards the platform and the platform pivots towards the motor assembly.

9. The powered mobility system of claim 8, wherein the driving wheel is configured to contact the riding surface when the motor assembly pivots towards the platform and the platform pivots towards the motor assembly.

10. The powered mobility system of claim 6, wherein the driving wheel and motor assembly are disposed at one end of the connector and wherein the power supply is disposed rearwardly from the platform and above the motor assembly such that when the user leans on the end of the swing arm assembly, the power supply supplies power to the motor to drive the driving wheel.

11. The powered mobility system of claim 1, wherein a portion of the side wheel extends above the platform when the side wheel is in contact with the riding surface.

12. The powered mobility system of claim 1, wherein the entire side wheel is disposed to a lateral side of the platform.

13. A powered skate, comprising:
- a frame comprising a platform configured to receive a portion of a user's foot and secure the portion of the user's foot within the platform such that the user's toes protrude forward of the platform;
- a plurality of wheels comprising a driving wheel disposed rearwardly from a heel end of the powered skate and a side wheel;
- a motor assembly comprising a motor and a drive shaft;
- a transmission assembly comprising a gear transmission, the gear transmission comprising at least a driving gear connected to the drive shaft and a driven gear configured to spin the driving wheel;
- a connector that couples the motor assembly to the frame, the connector being configured to flex when the powered skate rolls over non-flat riding surfaces, wherein the connector is biased in a direction towards a riding surface; and
- a power supply configured to power the motor assembly and to cause the motor to spin the driving wheel.

14. The powered skate of claim 13, wherein the powered skate further comprises a heel end, the heel end comprising a pressure sensor configured to detect a pressure applied to the heel end by the user.

15. The powered skate of claim 13, wherein the powered skate further comprises a controller configured to detect shifts in the user's position and adjust a speed of the motor.

16. The powered skate of claim 13, wherein the driving wheel is supported at one end of the connector and wherein the motor assembly is disposed rearwardly from the platform and above the driving wheel such that when the user leans on the end of a swing arm assembly, the motor drives the driving wheel.

17. The powered skate of claim 16, wherein a speed of the motor increases when the motor assembly pivots in an upward direction.

18. The powered skate of claim 16, wherein a speed of the motor increases when the motor assembly pivots towards the platform and the platform pivots towards the motor assembly.

19. The powered skate of claim 18, wherein the driving wheel is configured to contact the riding surface when the motor assembly pivots towards the platform and the platform pivots towards the motor assembly.

20. The powered skate of claim 16, wherein the driving wheel and motor assembly are disposed at one end of the connector and wherein the power supply is disposed rearwardly from the platform and above the motor assembly such that when the user leans on the end of the swing arm assembly, the power supply supplies power to the motor to drive the driving wheel.

21. The powered skate of claim 13, wherein a portion of the side wheel extends above the platform when the side wheel is in contact with the riding surface.

22. The powered skate of claim 13, wherein the entire side wheel is disposed to a lateral side of the platform.

* * * * *